United States Patent
Venetianer et al.

(10) Patent No.: US 9,892,606 B2
(45) Date of Patent: Feb. 13, 2018

(54) VIDEO SURVEILLANCE SYSTEM EMPLOYING VIDEO PRIMITIVES

(75) Inventors: Peter L. Venetianer, McLean, VA (US); Alan J. Lipton, Herndon, VA (US); Andrew J. Chosak, Arlington, VA (US); Matthew F. Frazier, Arlington, VA (US); Niels Haering, Reston, VA (US); Gary W. Myers, Ashburn, VA (US); Weihong Yin, Herndon, VA (US); Zhong Zhang, Herndon, VA (US); Robert Cutting, Ashburn, VA (US)

(73) Assignee: AVIGILON FORTRESS CORPORATION, Vancouver, British Columbia (CA)

( * ) Notice: Subject to any disclaimer, the term of this patent is extended or adjusted under 35 U.S.C. 154(b) by 2315 days.

(21) Appl. No.: 11/167,218

(22) Filed: Jun. 28, 2005

(65) Prior Publication Data
US 2007/0013776 A1 Jan. 18, 2007

Related U.S. Application Data

(63) Continuation-in-part of application No. 11/098,385, filed on Apr. 5, 2005, now Pat. No. 7,868,912, which
(Continued)

(51) Int. Cl.
*H04N 7/18* (2006.01)
*G08B 13/196* (2006.01)
(Continued)

(52) U.S. Cl.
CPC ..... *G08B 13/1968* (2013.01); *G06K 9/00771* (2013.01); *G08B 13/1961* (2013.01);
(Continued)

(58) Field of Classification Search
CPC ........ G08B 13/19602; G08B 13/19606; G08B 13/1961; G08B 13/19615; G08B 13/19652; H04N 7/181; H04N 7/188
USPC .... 348/158–160, 14.02, 155, 143, 148, 150, 348/149, 166, 169, 170; 382/103, 115; 375/240.02, 240.08
See application file for complete search history.

(56) References Cited

U.S. PATENT DOCUMENTS

| | | |
|---|---|---|
| 3,812,278 A | 5/1974 | Aker |
| 3,812,287 A | 5/1974 | Lemelson |

(Continued)

FOREIGN PATENT DOCUMENTS

| | | |
|---|---|---|
| DE | 4430016 A1 | 2/1996 |
| DE | 19848490 A1 | 4/2000 |

(Continued)

OTHER PUBLICATIONS

International Search Report for International Application No. PCT/US08/09073, dated Nov. 3, 2008.
(Continued)

*Primary Examiner* — Tung Vo
(74) *Attorney, Agent, or Firm* — Muir Patent Law, PLLC

(57) ABSTRACT

A video surveillance system extracts video primitives and extracts event occurrences from the video primitives using event discriminators. The system can undertake a response, such as an alarm, based on extracted event occurrences.

34 Claims, 22 Drawing Sheets

Related U.S. Application Data is a continuation-in-part of application No. 11/057,154, filed on Feb. 15, 2005, now abandoned, which is a continuation-in-part of application No. 09/987,707, filed on Nov. 15, 2001, now abandoned.

(51) Int. Cl.
  *G06K 9/00* (2006.01)
  *H04N 5/76* (2006.01)

(52) U.S. Cl.
  CPC . *G08B 13/19602* (2013.01); *G08B 13/19606* (2013.01); *G08B 13/19615* (2013.01); *G08B 13/19652* (2013.01); *H04N 5/76* (2013.01); *H04N 7/181* (2013.01); *H04N 7/188* (2013.01)

(56) References Cited

U.S. PATENT DOCUMENTS

| | | |
|---|---|---|
| 3,988,533 A | 10/1976 | Mick et al. |
| 4,160,998 A | 7/1979 | Kamin |
| 4,198,653 A | 4/1980 | Kamin |
| 4,249,207 A | 2/1981 | Harman et al. |
| 4,257,063 A | 3/1981 | Loughry et al. |
| 4,458,266 A | 7/1984 | Mahoney |
| 4,539,590 A * | 9/1985 | Gage .............. G01S 3/7864 348/141 |
| 4,593,274 A | 6/1986 | Rizzo |
| 4,737,847 A * | 4/1988 | Araki .............. G08B 13/19602 348/161 |
| 4,764,971 A | 8/1988 | Sullivan |
| 4,857,912 A | 8/1989 | Everett, Jr. et al. |
| 4,908,704 A | 3/1990 | Fujioka et al. |
| 4,941,182 A | 7/1990 | Patel |
| 4,943,854 A | 7/1990 | Shiota et al. |
| 4,949,389 A | 8/1990 | Allebach et al. |
| 5,048,095 A | 9/1991 | Bhanu et al. |
| 5,091,780 A | 2/1992 | Pomerleau |
| 5,099,322 A | 3/1992 | Gove |
| 5,099,324 A * | 3/1992 | Abe .............. G06K 9/00369 348/155 |
| 5,159,647 A | 10/1992 | Burt |
| 5,161,107 A | 11/1992 | Mayeaux et al. |
| 5,164,827 A * | 11/1992 | Paff .............. G08B 13/19608 348/143 |
| 5,229,850 A | 7/1993 | Toyoshima |
| 5,243,418 A * | 9/1993 | Kuno .............. G08B 13/19602 348/155 |
| 5,296,852 A | 6/1994 | Rathi |
| 5,321,396 A | 6/1994 | Lamming et al. |
| 5,448,315 A | 9/1995 | Soohoo |
| 5,448,651 A | 9/1995 | Sakou et al. |
| 5,465,115 A | 11/1995 | Conrad et al. |
| 5,485,611 A | 1/1996 | Astle |
| 5,491,511 A | 2/1996 | Odle |
| 5,515,453 A | 5/1996 | Hennessey et al. |
| 5,519,789 A | 5/1996 | Etoh |
| 5,521,634 A * | 5/1996 | McGary .............. G01S 3/7864 348/143 |
| 5,526,133 A | 6/1996 | Paff |
| 5,576,972 A | 11/1996 | Harrison |
| 5,586,200 A | 12/1996 | Devaney et al. |
| 5,602,585 A | 2/1997 | Dickinson et al. |
| 5,610,653 A | 3/1997 | Abecassis |
| 5,621,889 A | 4/1997 | Lermuzeaux et al. |
| 5,623,249 A | 4/1997 | Camire |
| 5,666,157 A | 9/1997 | Aviv |
| 5,671,294 A | 9/1997 | Rogers et al. |
| 5,684,715 A | 11/1997 | Palmer |
| 5,696,503 A | 12/1997 | Nasburg |
| 5,696,551 A | 12/1997 | Katto |
| 5,708,767 A | 1/1998 | Yeo et al. |
| 5,721,692 A | 2/1998 | Nagaya et al. |
| 5,724,456 A | 3/1998 | Boyack et al. |
| 5,751,346 A | 5/1998 | Dozier et al. |
| 5,764,306 A | 6/1998 | Steffano |
| 5,768,413 A | 6/1998 | Levin et al. |
| 5,774,569 A | 6/1998 | Waldenmaier |
| 5,798,787 A | 8/1998 | Yamaguchi et al. |
| 5,801,943 A | 9/1998 | Nasburg |
| 5,802,203 A | 9/1998 | Black et al. |
| 5,802,361 A | 9/1998 | Wang et al. |
| 5,844,603 A | 12/1998 | Ogata |
| 5,850,352 A | 12/1998 | Moezzi et al. |
| 5,860,086 A | 1/1999 | Crump et al. |
| 5,872,865 A | 2/1999 | Normile et al. |
| 5,875,304 A | 2/1999 | Winter et al. |
| 5,875,305 A | 2/1999 | Winter et al. |
| 5,886,701 A | 3/1999 | Chauvin et al. |
| 5,912,980 A * | 6/1999 | Hunke .......................... 382/103 |
| 5,923,365 A | 7/1999 | Tamir et al. |
| 5,926,210 A | 7/1999 | Hackett et al. |
| 5,937,092 A | 8/1999 | Wootton et al. |
| 5,956,081 A | 9/1999 | Katz et al. |
| 5,959,690 A | 9/1999 | Toebes, VIII et al. |
| 5,963,202 A | 10/1999 | Polish |
| 5,963,203 A | 10/1999 | Goldberg et al. |
| 5,969,755 A * | 10/1999 | Courtney .............. G06F 17/3079 348/135 |
| 5,974,235 A * | 10/1999 | Nunally .............. G06F 17/30017 348/E5.099 |
| 5,983,147 A | 11/1999 | Krumm |
| 5,983,251 A | 11/1999 | Martens et al. |
| 5,987,211 A | 11/1999 | Abecassis |
| 5,990,955 A | 11/1999 | Koz |
| 5,999,189 A | 12/1999 | Kajiya et al. |
| 5,999,877 A | 12/1999 | Takahashi et al. |
| 6,008,865 A | 12/1999 | Fogel |
| 6,014,461 A | 1/2000 | Hennessey et al. |
| 6,025,877 A * | 2/2000 | Chang et al. ............ 375/240.01 |
| 6,031,573 A | 2/2000 | MacCormack et al. |
| 6,035,341 A * | 3/2000 | Nunally .............. G08B 13/19645 348/E5.099 |
| 6,044,166 A | 3/2000 | Bassman et al. |
| 6,049,363 A | 4/2000 | Courtney et al. |
| 6,058,210 A | 5/2000 | de Queiroz et al. |
| 6,067,112 A | 5/2000 | Wellner et al. |
| 6,069,653 A | 5/2000 | Hudson |
| 6,069,655 A | 5/2000 | Seeley et al. |
| 6,069,918 A * | 5/2000 | Meyer .............. G06K 9/52 348/699 |
| 6,075,560 A | 6/2000 | Katz |
| 6,078,619 A | 6/2000 | Monro et al. |
| 6,084,912 A | 7/2000 | Reitmier et al. |
| 6,088,484 A | 7/2000 | Mead |
| 6,091,771 A | 7/2000 | Seeley et al. |
| 6,091,846 A | 7/2000 | Lin et al. |
| 6,097,429 A * | 8/2000 | Seeley et al. .............. 348/154 |
| 6,108,033 A | 8/2000 | Ito et al. |
| 6,123,123 A | 9/2000 | Carder et al. |
| 6,128,396 A * | 10/2000 | Hasegawa .............. G08B 13/19602 348/143 |
| 6,144,375 A | 11/2000 | Jain et al. |
| 6,151,413 A | 11/2000 | Jang |
| 6,166,744 A | 12/2000 | Jaszlics et al. |
| 6,167,143 A | 12/2000 | Badique |
| 6,177,886 B1 | 1/2001 | Billington et al. |
| 6,182,022 B1 | 1/2001 | Mayle et al. |
| 6,188,381 B1 | 2/2001 | van der Wal et al. |
| 6,188,777 B1 | 2/2001 | Darrell et al. |
| 6,195,458 B1 | 2/2001 | Warnick et al. |
| 6,201,473 B1 | 3/2001 | Schaffer |
| 6,201,476 B1 | 3/2001 | Depeursinge et al. |
| 6,205,239 B1 | 3/2001 | Lin et al. |
| 6,211,907 B1 | 4/2001 | Scaman et al. |
| 6,226,388 B1 | 5/2001 | Qian et al. |
| 6,249,613 B1 | 6/2001 | Crinon et al. |
| 6,253,064 B1* | 6/2001 | Monroe .............. G08G 5/0082 455/430 |
| 6,271,752 B1* | 8/2001 | Vaios .............. G08B 13/19608 340/525 |
| 6,278,466 B1 | 8/2001 | Chen |
| 6,297,844 B1 | 10/2001 | Schatz et al. |
| 6,304,669 B1 | 10/2001 | Kaneko et al. |

(56) References Cited

U.S. PATENT DOCUMENTS

| | | |
|---|---|---|
| 6,307,885 B1 | 10/2001 | Moon et al. |
| 6,310,916 B1 | 10/2001 | Han |
| 6,326,964 B1 | 12/2001 | Snyder et al. |
| 6,337,917 B1 | 1/2002 | Onural et al. |
| 6,349,113 B1 | 2/2002 | Mech et al. |
| 6,351,265 B1 | 2/2002 | Bulman |
| 6,351,492 B1 | 2/2002 | Kim |
| 6,360,234 B2* | 3/2002 | Jain et al. ............ 715/201 |
| 6,385,772 B1 | 5/2002 | Courtney |
| 6,393,054 B1 | 5/2002 | Altunbasak et al. |
| 6,393,056 B1* | 5/2002 | Talluri ............ H04N 5/23293 348/E5.047 |
| 6,396,535 B1 | 5/2002 | Waters |
| 6,396,876 B1 | 5/2002 | Babonneau et al. |
| 6,396,961 B1 | 5/2002 | Wixson et al. |
| 6,404,455 B1 | 6/2002 | Ito et al. |
| 6,404,925 B1 | 6/2002 | Foote et al. |
| 6,408,293 B1 | 6/2002 | Aggarwal et al. |
| 6,411,209 B1 | 6/2002 | Lyons et al. |
| 6,411,724 B1 | 6/2002 | Vaithilingam et al. |
| 6,424,370 B1* | 7/2002 | Courtney ............ G06F 17/3079 348/135 |
| 6,437,819 B1 | 8/2002 | Loveland |
| 6,441,734 B1 | 8/2002 | Gutta et al. |
| 6,456,320 B2 | 9/2002 | Kuwano et al. |
| 6,469,734 B1 | 10/2002 | Nichani et al. |
| 6,490,370 B1 | 12/2002 | Krasinski et al. |
| 6,504,479 B1 | 1/2003 | Lemons et al. |
| 6,509,926 B1 | 1/2003 | Mills et al. |
| 6,515,615 B2 | 2/2003 | Burchett et al. |
| 6,525,658 B2 | 2/2003 | Streetman et al. |
| 6,525,663 B2 | 2/2003 | Colmenarez et al. |
| 6,535,620 B2 | 3/2003 | Wildes et al. |
| 6,539,396 B1 | 3/2003 | Bowman-Amuah |
| 6,542,840 B2 | 4/2003 | Shusaku |
| 6,545,706 B1 | 4/2003 | Edwards et al. |
| 6,546,115 B1 | 4/2003 | Ito et al. |
| 6,546,135 B1 | 4/2003 | Lin et al. |
| 6,552,826 B2 | 4/2003 | Adler et al. |
| 6,570,496 B2 | 5/2003 | Britton |
| 6,570,608 B1* | 5/2003 | Tserng ............ H04N 7/188 348/143 |
| 6,570,610 B1 | 5/2003 | Kipust |
| 6,573,907 B1 | 6/2003 | Madrane et al. |
| 6,584,211 B1 | 6/2003 | Amemiya et al. |
| 6,597,800 B1 | 7/2003 | Murray et al. |
| 6,625,310 B2 | 9/2003 | Lipton et al. |
| 6,628,323 B1 | 9/2003 | Wegmann |
| 6,628,835 B1* | 9/2003 | Brill ............ G06K 9/00335 348/155 |
| 6,646,676 B1 | 11/2003 | DaGraca et al. |
| 6,658,136 B1 | 12/2003 | Brumitt |
| 6,696,945 B1 | 2/2004 | Venetianer et al. |
| 6,697,103 B1 | 2/2004 | Fernandez et al. |
| 6,697,104 B1 | 2/2004 | Yakobi et al. |
| 6,698,021 B1 | 2/2004 | Amini et al. |
| 6,707,486 B1 | 3/2004 | Millet et al. |
| 6,707,852 B1 | 3/2004 | Wang |
| 6,721,452 B2* | 4/2004 | Confer ............ G06K 9/222 382/197 |
| 6,721,454 B1 | 4/2004 | Qian et al. |
| 6,724,915 B1 | 4/2004 | Toklu et al. |
| 6,727,938 B1 | 4/2004 | Randall |
| 6,738,424 B1 | 5/2004 | Allmen et al. |
| 6,741,977 B1* | 5/2004 | Nagaya ............ H04N 5/765 |
| 6,754,367 B1 | 6/2004 | Ito et al. |
| 6,757,328 B1 | 6/2004 | Huang et al. |
| 6,792,319 B1 | 9/2004 | Bilger |
| 6,801,662 B1 | 10/2004 | Owechko et al. |
| 6,807,361 B1 | 10/2004 | Girgensohn et al. |
| 6,812,835 B2* | 11/2004 | Ito ............ G08B 13/19604 340/541 |
| 6,816,184 B1 | 11/2004 | Brill et al. |
| 6,816,186 B2 | 11/2004 | Luke et al. |
| 6,829,371 B1 | 12/2004 | Nichani et al. |
| 6,844,818 B2 | 1/2005 | Grech-Cini |
| 6,859,803 B2 | 2/2005 | Dagtas et al. |
| 6,865,580 B1 | 3/2005 | Bush |
| 6,924,801 B1 | 8/2005 | Dorbie |
| 6,930,689 B1 | 8/2005 | Giacalone et al. |
| 6,940,397 B1 | 9/2005 | Le Mire |
| 6,940,998 B2 | 9/2005 | Garoutte |
| 6,954,498 B1 | 10/2005 | Lipton |
| 6,954,859 B1 | 10/2005 | Simerly et al. |
| 6,963,658 B2 | 11/2005 | Hagihara et al. |
| 6,970,083 B2 | 11/2005 | Venetianer et al. |
| 6,975,220 B1 | 12/2005 | Foodman et al. |
| 6,975,346 B2 | 12/2005 | Kumhyr |
| 6,985,620 B2 | 1/2006 | Sawhney et al. |
| 6,987,451 B2 | 1/2006 | McKeown et al. |
| 6,987,528 B1 | 1/2006 | Nagahisa |
| 6,987,883 B2 | 1/2006 | Lipton et al. |
| 7,023,469 B1 | 4/2006 | Olson |
| 7,035,430 B2 | 4/2006 | Ito et al. |
| 7,082,209 B2 | 7/2006 | Ito et al. |
| 7,110,569 B2 | 9/2006 | Brodsky et al. |
| 7,146,286 B2 | 12/2006 | Takeda et al. |
| 7,167,519 B2 | 1/2007 | Comaniciu et al. |
| 7,167,575 B1 | 1/2007 | Nichani et al. |
| 7,181,757 B1* | 2/2007 | Kim ............ G11B 27/105 725/40 |
| 7,184,777 B2 | 2/2007 | Diener et al. |
| 7,197,072 B1* | 3/2007 | Hsu et al. ............ 375/240.02 |
| 7,218,756 B2 | 5/2007 | Garoutte |
| 7,224,852 B2 | 5/2007 | Lipton et al. |
| 7,227,893 B1* | 6/2007 | Srinivasa et al. ........ 375/240.08 |
| 7,283,034 B2 | 10/2007 | Nakamura et al. |
| 7,308,443 B1 | 12/2007 | Lee et al. |
| 7,356,830 B1* | 4/2008 | Dimitrova ............ 725/51 |
| 7,358,976 B2 | 4/2008 | Hampshire, II et al. |
| 7,373,395 B2 | 5/2008 | Brailean et al. |
| 7,382,895 B2* | 6/2008 | Bramblet ............ G07C 9/00 382/103 |
| 7,400,344 B2 | 7/2008 | Ito et al. |
| 7,423,666 B2 | 9/2008 | Sakakibara et al. |
| 7,424,167 B1 | 9/2008 | Chosak et al. |
| 7,436,887 B2 | 10/2008 | Yeredor et al. |
| 7,440,589 B2 | 10/2008 | Garoutte |
| 7,447,331 B2* | 11/2008 | Brown et al. ............ 382/103 |
| 7,468,662 B2 | 12/2008 | Velipasalar et al. |
| 7,487,072 B2 | 2/2009 | Semple et al. |
| 7,522,745 B2 | 4/2009 | Grasso et al. |
| 7,595,815 B2 | 9/2009 | Donovan et al. |
| 7,602,413 B2 | 10/2009 | Kondo et al. |
| 7,613,324 B2 | 11/2009 | Venetianer et al. |
| 7,623,677 B2 | 11/2009 | Girgensohn et al. |
| 7,633,520 B2 | 12/2009 | Samarasekera et al. |
| 7,643,653 B2 | 1/2010 | Garoutte |
| 7,650,058 B1 | 1/2010 | Garoutte |
| 7,653,635 B1 | 1/2010 | Paek et al. |
| 7,657,914 B2 | 1/2010 | Whelan et al. |
| 7,660,439 B1 | 2/2010 | Lu et al. |
| 7,671,728 B2* | 3/2010 | Buehler ............ G08B 13/19615 340/506 |
| 7,683,929 B2* | 3/2010 | Elazar ............ G01S 3/7864 348/169 |
| 7,702,014 B1* | 4/2010 | Kellock ............ G11B 27/034 375/240.01 |
| 7,733,369 B2 | 6/2010 | Yin et al. |
| 7,734,724 B2 | 6/2010 | Rezvani et al. |
| 7,737,837 B2 | 6/2010 | Donovan et al. |
| 7,768,549 B2 | 8/2010 | Cofer et al. |
| 7,774,326 B2 | 8/2010 | Arrouye et al. |
| 7,796,780 B2 | 9/2010 | Lipton et al. |
| 7,822,224 B2 | 10/2010 | Garoutte et al. |
| 7,825,954 B2 | 11/2010 | Zhang et al. |
| 7,826,066 B2 | 11/2010 | Primot et al. |
| 7,868,912 B2 | 1/2011 | Venetianer et al. |
| 7,884,849 B2 | 2/2011 | Yin et al. |
| 7,932,923 B2 | 4/2011 | Lipton et al. |
| 7,956,735 B2 | 6/2011 | Jackson et al. |
| 8,184,154 B2* | 5/2012 | Estevez ............ G06K 9/00369 342/28 |

(56) References Cited

U.S. PATENT DOCUMENTS

| | | | | |
|---|---|---|---|---|
| 8,316,407 B2* | 11/2012 | Lee | ........................ | H04N 7/163 348/143 |
| 8,547,437 B2* | 10/2013 | Buehler | ............ | G06K 9/00335 348/143 |
| 9,052,386 B2* | 6/2015 | Yeredor | ................ | G01S 3/7864 |
| 9,108,033 B2* | 8/2015 | Christensen | ....... | A61B 17/3415 |
| 2001/0004739 A1 | 6/2001 | Sekiguchi et al. | | |
| 2001/0010542 A1 | 8/2001 | Takagi et al. | | |
| 2001/0019357 A1 | 9/2001 | Ito et al. | | |
| 2001/0033330 A1* | 10/2001 | Garoutte | ............ | G06K 9/00771 348/153 |
| 2001/0035907 A1 | 11/2001 | Broemmelsiek | | |
| 2002/0008758 A1* | 1/2002 | Broemmelsiek | ...... | G01S 3/7864 348/143 |
| 2002/0024446 A1 | 2/2002 | Grech-Cini | | |
| 2002/0048388 A1 | 4/2002 | Hagihara et al. | | |
| 2002/0051058 A1 | 5/2002 | Ito et al. | | |
| 2002/0063154 A1 | 5/2002 | Hoyos et al. | | |
| 2002/0075307 A1* | 6/2002 | Alexander | ............ | H04L 29/06 715/760 |
| 2002/0082769 A1 | 6/2002 | Church et al. | | |
| 2002/0095490 A1* | 7/2002 | Barker | ................... | H04L 29/06 709/224 |
| 2002/0104094 A1* | 8/2002 | Alexander | ............ | G06T 7/2053 725/105 |
| 2002/0135483 A1 | 9/2002 | Merheim et al. | | |
| 2002/0143934 A1* | 10/2002 | Barker | ................ | H04L 12/2602 709/224 |
| 2002/0150308 A1 | 10/2002 | Nakamura | | |
| 2002/0157116 A1* | 10/2002 | Jasinschi | ........... | G06F 17/30784 725/136 |
| 2002/0159634 A1 | 10/2002 | Lipton et al. | | |
| 2002/0163521 A1 | 11/2002 | Ellenby et al. | | |
| 2002/0163577 A1 | 11/2002 | Myers | | |
| 2002/0171546 A1 | 11/2002 | Evans et al. | | |
| 2002/0191851 A1 | 12/2002 | Keinan | | |
| 2003/0010345 A1 | 1/2003 | Koblasz et al. | | |
| 2003/0020808 A1 | 1/2003 | Luke et al. | | |
| 2003/0023974 A1* | 1/2003 | Dagtas | ............... | H04N 7/17318 725/47 |
| 2003/0025599 A1 | 2/2003 | Monroe | | |
| 2003/0043160 A1 | 3/2003 | Elfving et al. | | |
| 2003/0051255 A1 | 3/2003 | Bulman et al. | | |
| 2003/0053659 A1 | 3/2003 | Pavlidis et al. | | |
| 2003/0058111 A1 | 3/2003 | Lee et al. | | |
| 2003/0058340 A1 | 3/2003 | Lin et al. | | |
| 2003/0058341 A1 | 3/2003 | Brodsky et al. | | |
| 2003/0085992 A1 | 5/2003 | Arpa et al. | | |
| 2003/0093260 A1 | 5/2003 | Dagtas et al. | | |
| 2003/0126622 A1 | 7/2003 | Cohen et al. | | |
| 2003/0163289 A1 | 8/2003 | Whelan et al. | | |
| 2003/0231769 A1* | 12/2003 | Bolle et al. | ................... | 380/210 |
| 2004/0006424 A1* | 1/2004 | Joyce | ................... | G01S 5/0027 701/408 |
| 2004/0113933 A1 | 6/2004 | Guler | | |
| 2004/0130620 A1* | 7/2004 | Buehler et al. | ............... | 348/143 |
| 2004/0137915 A1 | 7/2004 | Diener et al. | | |
| 2004/0143602 A1 | 7/2004 | Ruiz et al. | | |
| 2004/0151374 A1 | 8/2004 | Lipton et al. | | |
| 2004/0161133 A1* | 8/2004 | Elazar | ................ | G01S 3/7864 382/115 |
| 2004/0164858 A1* | 8/2004 | Lin | ................... | G08B 13/19608 340/522 |
| 2004/0225681 A1 | 11/2004 | Chaney et al. | | |
| 2004/0240542 A1* | 12/2004 | Yeredor | ............. | G06K 9/00771 375/240.01 |
| 2004/0240546 A1 | 12/2004 | Wells | | |
| 2005/0002561 A1 | 1/2005 | Monachino et al. | | |
| 2005/0015624 A1* | 1/2005 | Ginter | ................... | G06F 21/55 726/4 |
| 2005/0073585 A1* | 4/2005 | Ettinger | ................... | H04N 7/18 348/155 |
| 2005/0146605 A1 | 7/2005 | Lipton et al. | | |
| 2005/0157169 A1 | 7/2005 | Brodsky et al. | | |
| 2005/0162515 A1 | 7/2005 | Venetianer et al. | | |
| 2005/0168574 A1 | 8/2005 | Lipton et al. | | |
| 2005/0169367 A1 | 8/2005 | Venetianer et al. | | |
| 2005/0198063 A1* | 9/2005 | Thomas et al. | ................ | 707/102 |
| 2005/0275549 A1 | 12/2005 | Barclay et al. | | |
| 2006/0066722 A1 | 3/2006 | Yin et al. | | |
| 2006/0072014 A1* | 4/2006 | Geng | ............... | G08B 13/19606 348/159 |
| 2006/0117356 A1 | 6/2006 | Jojic et al. | | |
| 2006/0170769 A1* | 8/2006 | Zhou | ................... | G06K 9/00362 348/143 |
| 2006/0200842 A1 | 9/2006 | Chapman et al. | | |
| 2006/0203090 A1* | 9/2006 | Wang | ..................... | G06K 9/209 348/143 |
| 2006/0222206 A1* | 10/2006 | Garoutte | ................... | H04N 7/18 382/103 |
| 2006/0222209 A1 | 10/2006 | Zhang et al. | | |
| 2006/0232673 A1 | 10/2006 | Lipton et al. | | |
| 2006/0238616 A1* | 10/2006 | Curtner | ............ | G08B 13/19606 348/143 |
| 2006/0268111 A1 | 11/2006 | Zhang et al. | | |
| 2006/0279630 A1* | 12/2006 | Aggarwal et al. | ............ | 348/143 |
| 2007/0002141 A1 | 1/2007 | Lipton et al. | | |
| 2007/0019865 A1* | 1/2007 | Owechko | ........... | G06K 9/00369 382/224 |
| 2007/0035623 A1 | 2/2007 | Garoutte et al. | | |
| 2007/0052803 A1 | 3/2007 | Chosak et al. | | |
| 2007/0122000 A1 | 5/2007 | Venetianer et al. | | |
| 2007/0127774 A1 | 6/2007 | Zhang et al. | | |
| 2007/0182818 A1* | 8/2007 | Buehler | ........... | G08B 13/19602 348/143 |
| 2007/0201694 A1* | 8/2007 | Bolle | ..................... | G06T 1/0021 380/205 |
| 2007/0210694 A1* | 9/2007 | Kim | ................... | G02F 1/133608 313/493 |
| 2007/0226616 A1* | 9/2007 | Gagvani | ........... | G08B 13/19682 715/700 |
| 2007/0283004 A1* | 12/2007 | Buehler | ................... | G06Q 30/02 709/224 |
| 2008/0100704 A1 | 5/2008 | Venetianer et al. | | |
| 2008/0243774 A1* | 10/2008 | Jaspers | ............... | G06F 17/3079 |
| 2008/0292140 A1 | 11/2008 | Morris et al. | | |
| 2008/0317286 A1 | 12/2008 | Thorpe et al. | | |
| 2009/0244291 A1 | 10/2009 | Saptharishi et al. | | |
| 2010/0002082 A1* | 1/2010 | Buehler | ........... | G08B 13/19693 348/159 |
| 2010/0020172 A1 | 1/2010 | Mariadoss et al. | | |
| 2010/0161133 A1* | 6/2010 | Morrison | ............... | F25J 3/0219 700/269 |

FOREIGN PATENT DOCUMENTS

| | | |
|---|---|---|
| DE | 10153484 A1 | 5/2003 |
| DE | 10252731 A1 | 5/2004 |
| EP | 0293189 B1 | 7/1994 |
| EP | 0893823 A1 | 1/1999 |
| EP | 0893923 A1 | 1/1999 |
| EP | 0913799 A2 | 5/1999 |
| EP | 0 967 584 A2 | 12/1999 |
| EP | 0967584 A2 | 12/1999 |
| EP | 1024666 A2 | 8/2000 |
| EP | 1120746 A2 | 8/2001 |
| EP | 1333682 A1 | 8/2003 |
| EP | 1345420 A2 | 9/2003 |
| EP | 1916618 A1 | 4/2008 |
| FR | 2944934 A1 | 10/2010 |
| GB | 2337146 A | 10/1999 |
| GB | 2379354 A | 3/2003 |
| JP | 01-244598 | 9/1989 |
| JP | 03-242592 | 2/1990 |
| JP | 1991-035399 | 2/1991 |
| JP | 05-014891 | 1/1993 |
| JP | 1993-284501 | 10/1993 |
| JP | 1994-52311 | 2/1994 |
| JP | 1994-76047 | 3/1994 |
| JP | 07-160891 | 6/1995 |
| JP | 1995-302328 | 11/1995 |

(56) References Cited

FOREIGN PATENT DOCUMENTS

| | | |
|---|---|---|
| JP | 1996-171681 | 2/1996 |
| JP | 1996-63599 | 3/1996 |
| JP | 08-123935 | 5/1996 |
| JP | 08-136251 | 5/1996 |
| JP | 1996-136251 | 5/1996 |
| JP | 08-272926 | 10/1996 |
| JP | 09-050585 | 2/1997 |
| JP | 09-130783 | 5/1997 |
| JP | 09-247654 A | 9/1997 |
| JP | 09-252467 | 9/1997 |
| JP | 1997-265539 | 10/1997 |
| JP | 09-330415 | 12/1997 |
| JP | 10-048008 | 2/1998 |
| JP | 1-177195 | 5/1998 |
| JP | 10-116359 | 5/1998 |
| JP | 1998-116359 | 5/1998 |
| JP | 10-283584 | 10/1998 |
| JP | 10290449 A | 10/1998 |
| JP | 1999-15982 | 1/1999 |
| JP | 11-177973 | 7/1999 |
| JP | 11-203568 | 7/1999 |
| JP | 1999-355759 | 12/1999 |
| JP | 2000-175174 | 6/2000 |
| JP | 11-009618 | 7/2000 |
| JP | 11-009619 | 7/2000 |
| JP | 2000-207664 | 7/2000 |
| JP | 2000-207665 | 7/2000 |
| JP | 2000-339923 | 8/2000 |
| JP | 11-48585 | 9/2000 |
| JP | 2000-253382 | 9/2000 |
| JP | 11-88337 | 10/2000 |
| JP | 2000-285223 | 10/2000 |
| JP | 2000-287173 | 10/2000 |
| JP | 2000-295600 | 10/2000 |
| JP | 2000-224542 | 11/2000 |
| JP | 2001-045465 | 2/2001 |
| JP | 2001-145092 | 5/2001 |
| JP | 2001-175868 | 6/2001 |
| JP | 2001-189925 | 7/2001 |
| JP | 2001-204007 | 7/2001 |
| JP | 2001-266131 | 9/2001 |
| JP | 2001-285681 | 10/2001 |
| JP | 2001-292439 A | 10/2001 |
| JP | 2004-23487 | 1/2004 |
| KR | 1999-0042072 | 5/1998 |
| KR | 100248374 | 12/1999 |
| KR | 1020000026757 | 5/2000 |
| WO | WO 1994/003014 A1 | 2/1994 |
| WO | WO 98/19450 | 5/1998 |
| WO | WO 00/28498 | 5/2000 |
| WO | WO 01/33503 | 5/2001 |
| WO | WO 01/62005 | 8/2001 |
| WO | WO 03/044727 | 5/2003 |
| WO | WO 2003/044727 | 5/2003 |
| WO | WO 03/047258 | 6/2003 |
| WO | WO 2004/006184 A2 | 1/2004 |
| WO | WO 2004/047039 A1 | 6/2004 |
| WO | WO 2008/054489 A2 | 5/2008 |
| WO | WO 2009/120616 A1 | 10/2009 |
| WO | WO 2010/076261 A1 | 7/2010 |
| WO | WO 2011/036661 A1 | 3/2011 |

OTHER PUBLICATIONS

Written Opinion for International Patent Application No. PCT/US08/09073, dated Nov. 3, 2008.
International Search Report issued for PCT Application No. PCT/US06/25196, dated Jan. 16, 2008.
Written Opinion issued for PCT Application No. PCT/US06/25196, dated Jan. 16, 2008.
Shio et al., "Segmentation of People in Motion", IEEE 1991, p. 325-332.
International Search Report issued in PCT Application No. PCT/US2006/012556, dated Feb. 12, 2008.
Written Opinion issued in PCT Application No. PCT/US2006/012556, dated Feb. 12, 2008.
Notification for IL App. No. 161777 dated Feb. 21, 2008 and English translation thereof.
CN Office Action for CN 02822772.7 dated Oct. 14, 2005 in English.
International Search Report issued for PCT Application No. PCT/US01/32614 dated May 6, 2002.
International Search Report issued for PCT Application No. PCT/US02/22688 dated Dec. 11, 2002.
H. Fujiyoshi and A. J. Lipton, "Real-time Human Motion Analysis by Image Skeletonization," *Proceedings of IEEE WACV'98*, Princeton, NJ, 1998, pp. 15-21.
A. J. Lipton, H. Fujiyoshi and R. S. Patil, "Moving Target Classification and Tracking from Real-time Video," *Proceedings of IEEE WACV'98*, Princeton, NJ, 1998, pp. 8-14.
A. J. Lipton, "Local Application of Optic Flow to Analyse Rigid Versus Non-Rigid Motion," *International Conference on Computer Vision*, Corfu, Greece, Sep. 1999.
R. T. Collins, Y. Tsin, J. R. Miller, and A. J. Lipton "Using a DEM to Determine Geospatial Object Trajectories," CMU-RI-TR-98-19, 1998.
A. Selinger and L. Wixson, "Classifying Moving Objects as Rigid or Non-Rigid Without Correspondences," *Proceedings of DARPA Image Understanding Workshop*, 1, Nov. 1998, pp. 341-347.
Jemez Technology Corp., Variant iD Web-Site, www.variantid.com, printed Aug. 25, 2003.
Alan J. Lipton "Virtual Postman—An Illustrative Example of Virtual Video," International Journal of Robotics and Automation, vol. 15, No. 1, Jan. 2000, pp. 9-16.
Alan J. Lipton, "Virtual Postman—Real-Time, Interactive Virtual Video," IASTED Conference on Computer Graphics and Imaging (CGIM '99), Palm Springs, Oct. 25-27, 1999.
Robert T. Collins et al., "A System for Video Surveillance and Monitoring," Technical Report CMU-RI-TR-00-12, Robotics Institute, Carnegie Mellon University, May 2000.
International Search Report and Written Opinion in PCT/US06/02700.
JP Office Action issued in PCT/US02/22688, along with an English translation.
L. Wixson et al., "Detecting Salient Motion by Accumulating Directionally-Consistent Flow," IEEE, 1999.
W.E.L. Grimson et al., "Using Adaptive Tracking to Classify and Monitor Activities in a Site," CVPR, pp. 22-29, Jun. 1998.
A.J. Lipton et al., "Moving Target Classification and Tracking from Real-time Video," IUW, pp. 129-136, 1998.
T.J. Olsen et al., "Moving Object Detection and Event Recognition Algorithm for Smart Cameras," IUW, pp. 159-175, May 1997.
A. J. Lipton, "Local Application of Optical Flow to Analyse Rigid Versus Non-Rigid Motion," International Conference on Computer Vision Frame Rate Workshop, Corfu, Greece, Sep. 1999.
F. Bartolini et al., "Counting people getting in and out of a bus by real-time image-sequence processing," IVC, 12(1):36-41, Jan. 1994.
M. Rossi et al., "Tracking and counting moving people," ICIP94, pp. 212-216, 1994.
C.R. Wren et al., "Pfinder: Real-time tracking of the human body," Vismod, 1995.
L. Khoudour et al., "Real-Time Pedestrian Counting by Active Linear Cameras," JEI, 5(4):452-459, Oct. 1996.
S. Ioffe et al., "Probabilistic Methods for Finding People," IJCV, 43(1):45-68, Jun. 2001.
M. Isard et al., "BraMBLe: A Bayesian Multiple-Blob Tracker," ICCV, 2001.
D.M. Gavrila, "The Visual Analysis of Human Movement: A Survey," CVIU, 73(1):82-98, Jan. 1999.
N. Haering et al., "Visual Event Detection," Video Computing Series, Editor Mubarak Shah, 2001.
Collins et al., "A System for Video Surveillance and Monitoring: VSAM Final Report," Technical Report CMU-RI-TR-00-12, Robotics Institute, Carnegie Mellon University, May 2000.

(56) References Cited

OTHER PUBLICATIONS

J.P. Deparis et al., "A Device for Counting Passengers Making Use of Two Active Linear Cameras: Comparison of Algorithms," IEEE, pp. 1629-1634, 1996.
C.R. Wren et al.. "Pfinder: Real-Time Tracking of the Human Body," PAMI, vol. 19, pp. 780-784, 1997.
M. Allmen et al., "Long-Range Spatiotemporal Motion Understanding Using Spatiotemporal Flow Curves," Proc. IEEE CVPR, Lahaina, Maui, Hawaii, pp. 303-309, 1991.
L. Wixson, "Detecting Salient Motion by Accumulating Directionally Consistent Flow", IEEE Trans. Pattern Anal. Mach. Intell., vol. 22, pp. 774-781, Aug. 2000.
Ivanov Y et al., "Video Surveillance of Interactions," Visual Surveillance, 1999. Second IEEE Workshop on, (VS '99) Fort Collins, CO, USA, Jun. 26, 1999, Los Alamitos CA, USA, IEEE Computer Society US.
Computer & Information Systems Abstracts, Keeping an Eye Out, 2005.
Computer & Information Systems Abstracts, ObjectVideo Extends its Capabilities for Border Applications as Part of Multi-Million Dollar Homeland Security Advanced Research Project Agency Grant, 2006.
Computer & Information Systems Abstracts, QA: Security Grants Up for Grabs, 2004.
CSA, Veni, Vidi, Vici Analytics: But Who Will Really Conquer?, 2007.
Dialog, Ex FCC Chief Makes Cisco Board an Even Dozen, Mar. 26, 2007.
Dialog, Iridium Names VP for Data Business, Jul. 9, 2001.
Diamond Back, (2) Digest, Jan. 27, 2000.
Elsevier Eng. Info. Inc., Threat Detection Expands Role, Jul. 20, 2006.
Gale/ Cengage, Airport Selects ObjectVideo for Intrusion Detection, Jun. 29, 2005.
Gale/ Cengage, Appian Names Novak Biddle and MapQuest Exec to Its Board, Oct. 23, 2008.
Gale/ Cengage, Avinor Selects ESP Group and ObjectVideo for Surveillance at Norwegian Airports, May 5, 2008.
Gale/ Cengage, Bosch Security Systems Utilizes ObjectVideo's Intelligent Video Surveillance Software, Apr. 6, 2005.
Gale/ Cengage, Chubb Security Taps ObjectVideo as Approved Supplier, Jul. 8, 2005.
Gale/ Cengage, Companies in the News Today: About Chubb Security, Jul. 8, 2005.
Gale/ Cengage, Companies in the News Today: About ObjectVideo Inc., Jul. 8, 2005.
Gale/ Cengage, comScore Names Kenneth Tarpey as CFO, Apr. 26, 2009.
Gale/ Cengage, Cornet Offers iVDO SmartEdge Video Analytics for Its Ruggedized iVDO IP Encoders, May 4, 2008.
Gale/ Cengage, CoVi Technologies Adds Digital Video Analytics to Analog Video Surveillance Camera, Sep. 30, 2007.
Gale/ Cengage, Digiop Inks OEM Partnership with ObjectVideo, Apr. 30, 2008.
Gale/ Cengage, Does the eye spy? Around-the-clock video surveillance is the Holy Grail of K-12 safety efforts. But it raises many questions, including whether or not the cameras are a wholly benign presence., Nov. 1, 2007.
Gale/ Cengage, Fibridge's New HD, IP Camera Leverages Reference Design from TI and ZOT, Dec. 13, 2008.
Gale/ Cengage, Former FCC Chairman Powell Joins ObjectVideo Board of Directors, Sep. 9, 2005.
Gale/ Cengage, Intelligent IP Camera Features Onboard Analytics, Apr. 13, 2007.
Gale/ Cengage, Intelligent Video Server Promotes OEM Camera Development, Apr. 30, 2007.
Gale/ Cengage, Lanaccess' Encoders to Include ObjectVideo's Analytics, Sep. 21, 2005.
Gale/ Cengage, MangoDSP and ObjectVideo to Provide Integrated Intelligent Video Surveillance Platforms, Apr. 10, 2005.
Gale/ Cengage, MangoDSP, ObjectVideo Join Forces on Surveillance Solutions, Apr. 7, 2005.
Gale/ Cengage, Next Steps for Technology: How U.S. R&D Efforts Have Pushed Development Forward, Sep. 11, 2006.
Gale/ Cengage, ObjectVideo and TI Get Win with Hangzhou Hikvision Digital Technology, Apr. 1, 2007.
Gale/ Cengage, ObjectVideo Develops New Scanning Camera Technology to Protect U.S. Borders, Jul. 19, 2006.
Gale/ Cengage, ObjectVideo Gets $3.2 Million Pacts from Homeland Security Advanced Research Project Agency (HSARPA), May 13, 2005.
Gale/ Cengage, ObjectVideo Gets DARPA Contract to Support Next Generation Surveillance System, Jan. 28, 2008.
Gale/ Cengage, ObjectVideo Named 2005 "Technology Pioneer," Dec. 6, 2004.
Gale/ Cengage, ObjectVideo Named a Red Herring 100 Company for Second Year in a Row, May 13, 2005.
Gale/ Cengage, ObjectVideo Offers Intelligent Video Network Protocol for Standardized Analytics Communication and Integration, Sep. 25, 2007.
Gale/ Cengage, ObjectVideo Provides Intelligent Video Software to Port, Jul. 13, 2005.
Gale/ Cengage, ObjectVideo Releases OnBoard Analytics on ARM Processors, Apr. 5, 2011.
Gale/ Cengage, ObjectVideo Releases Software for Intel Architecture Systems, Apr. 21, 2008.
Gale/ Cengage, ObjectVideo Signs Distributor for Asia, Dec. 14, 2005.
Gale/ Cengage, ObjectVideo Software Part of Security System at Memphis/Shelby County Airport, Jun. 21, 2005.
Gale/ Cengage, ObjectVideo to Showcase the Latest Intelligent Solutions at ASIS, Sep. 23, 2007.
Gale/ Cengage, ObjectVideo to Spotlight Intelligent Solutions at ISC West 2007, Mar. 26, 2007.
Gale/ Cengage, ObjectVideo Touts Early Adoption of its Protocol, Mar. 31, 2008.
Gale/ Cengage, ObjectVideo, Security Services & Technologies Announce Integration Partnership, Apr. 6, 2005.
Gale/ Cengage, People in Wireless News: Peter Currie Joins Critical Path Board, Feb. 2, 2004.
Gale/ Cengage, Phoenix IVS, ObjectVideo and MangoDSP to Launch Intelligent Video Module, Aug. 10, 2005.
Gale/ Cengage, Proximex Upgrades Surveillint, Dec. 21, 2008.
Gale/ Cengage, Puerto Rico Public Housing Beefs Up Security Via Intelligent Surveillance System from Avant Technologies and ObjectVideo, Sep. 19, 2007.
Gale/ Cengage, Software Creates Intelligent Devices for Video Systems, Mar. 31, 2006.
Gale/ Cengage, Software Delivers Industry-Specific Intelligent Video, May 10, 2006.
Gale/ Cengage, Synectic Systems Group and ObjectVideo Ink OEM Pact, Feb. 28, 2008.
Gale/ Cengage, Video—DSPs Focus on Vision Systems, May 21, 2007.
Gale/ Cengage, VidSys Partners with Security Companies for PSIM Thought Leadership Site, Oct. 23, 2008.
Gale/ Cengage, Wireless Channel: Chubb Security to Resell ObjectVideo Technology, Jul. 9, 2005.
Information Week, Curtis Joins CMGI, May 8, 2000.
Lipton, Stationary Target Detection Using the ObjectVideo Surveillance System, 2007.
Lipton, The Intelligent Vision Sensor: Turning Video into Information, 2007.
Lipton, Video Verification of Point of Sale Transactions, 2007.
Abstract and documents related to the contract for Department of Defense Award No. 81276, A Unified Framework for False Alarm Reduction Using Scene Context from Airborne Sensors, Identification No. 075B2-0308, W31P4Q-08-C-0108, 2007.
Abstract and documents related to the contract for Department of Defense Award No. 63547, Automated Video Surveillance at Night, Identification No. 03ST1-004, DAAH0103CR276, 2003.

(56) References Cited

OTHER PUBLICATIONS

Abstract and documents related to the contract for Department of Defense Award No. 82715, Context-Sensitive Content Extraction and Scene Understanding, Identification No. N071-085-0199, N00014-08-C-0639, 2007.
Abstract and documents related to the contract for Department of Defense Award No. 65022, Human Activity Recognition, Identification No. N031-1723, N00014-03-M-0256, 2003.
Abstract and documents related to the contract for Department of Defense Award No. 76719, Identify and Track Important Assets, Identification No. S052-007-0063, H92222-06-P-0012, 2005.
Abstract and documents related to the contract for Department of Defense Award No. 78523, Intelligent Retrieval of Surveillance Imagery, Identification No. N062-147-0567, N00014-08-C0110, 2006.
Abstract and documents related to the contract for Department of Defense Award No. 59579, Mast-Mounted In-Port Video Surveillance System, Identification No. N021-1610; N00014-03-C-0232, 2002.
Abstract and documents related to the contract for Department of Defense Award No. 83229, Robust Multiple Target Tracking, Identification No. A074-007-0091, W911NF-08-C-0068, 2007.
Abstract and documents related to the contract for National Science Foundation Award No. 69404, SBIR Phase I: Learning Context, Identification No. 0340175, 0340175, 2004.
Abstract and documents related to the contract for Department of Defense Award No. 58472, Streaming Multimedia for the Warfighter, Identification No. 99SB1-0357, DAAH01-02-C-R193, 2002.
Abstract and documents related to the contract for Department of Defense Award No. 55489, Video Detection, Tracking and Classification, Identification No. 99ST1-004, 2001-2002.
Abstract and documents related to the contract for Department of Defense Award No. 85007, Wide Area Video Motion Blur Elimination, Identification No. 08ST1-0147, W31P4Q-08-C-0470, 2008.
ObjectVideo, Amtrak Lags in Implementing Security Technologies: Madrid Attacks Refocus Attention on Passenger Rail System's Vulnerability, Lack of DHS Funding, Mar. 22, 2004.
ObjectVideo, Homeland Security Getting Tough on Borders, 2003.
ObjectVideo, Security Grants Up for Grabs, Mar. 8, 2004.
The Institution of Engineering and Technology, Automatic Visual Analysis for Transportation Security, 2007.
The Thomson Corp., I2T: Image Parsing to Text Description, 2010.
The Thomson Corp., Video Compression Using Spatiotemporal Regularity Flow, 2006.
Balluck, Northern Virginia Web Warners Battle for Charity, Washtech.com, Jan. 25, 2001, http://www.tvworldwide.com/media_012501_washtec.asp.
Diamond Back, Curtis Joins CMGI, May 8, 2000.
Jackson, Video AI Tool Watches Border Crossings, Aug. 25, 2003.
New Media, (2) Digest, Jan. 27, 2000.
Allmen et al., Long-Range Spatiotemporal Motion Understanding Using Spatiotemporal Flow Curves, Dec. 1990, pp. 1-29.
Braggins, Computer Vision for Industry, European Optical Society Proceedings, Jun. 24, 1993, pp. 226-239.
Rota et al., Activity Recognition from Video Sequences Using Declarative Models, 2005. 5 pages.
Velipasalar et al., Specifying, Interpreting and Detecting High-Level, Spatio-Temporal Composite Events in Single and Multi-Camera Systems, pp. 1-8.
Wang et al., "Experiential Sampling for Video Surveillance," In Proc. 1 st ACM Int. Workshop on Video Surveillance, Nov. 7, 2003, pp. 77-86.
Ghanem et al., Representation and Recognition of Events in Surveillance Video Using Petri Nets, pp. 1-9.
Cheng et al., A Smart Camera Application: DSP-Based People Detection and Tracking, J. Electron. Imaging, vol. 9, Jul. 2000, pp. 336-346.

Grimson, et al., "Using adaptive tracking to classify and monitor activities in a site," Proceedings of IEEE Conference on Computer Vision and Pattern Recognition, pp. 246-252, 1999.
Lipton et al., Moving Target Classification and Tracking from Real-Time Video, 1998, pp. 8-14.
Makris, Visual Learning in Surveillance System, May 2001, pp. 1-27.
Jain, Dynamic Scene Analysis, Jan. 1, 1984, pp. 1-36.
Yogameena et al., RVM-Based Human Action Classification in Crowd through Projection and Star Skeletonization, EURASIP Journal on Image and Video Processing vol. 2009, Aug. 26, 2009, 12 pages.
Marcenaro et al., Distributed Architectures and Logical-Task Decomposition in Multimedia Surveillance Systems, Oct. 2001, pp. 1419-1440.
Moellman, Automated Video Surveillance with Unattended Ground Sensors, 1997, pp. 68-75.
Chleq et al., Realtime Image Sequence Interpretation for Video-Surveillance Applications, 1996 Proceedings, International Conference on Image Processing, vol. 2, pp. 801-804.
Örten, Moving Object Identification and Event Recognition in Video Surveillance Systems (Thesis), Jul. 2005, pp. 1-73.
Atick et al., FaceIt: Face Recognition from Static and Live Video for Law Enforcement, Mar. 1997, pp. 176-187.
Ivanov et al., Recognition of Visual Activities and Interactions by Stochastic Parsing, Aug. 2000, pp. 1-21.
Michon, Integrating Motion Video into Computational Environments, Oct. 1989, pp. 80-82.
Vaswani et al., Statistical Shape Theory for Activity Modeling, 4 pages.
Stricker et al., Video Assist: A Customizable Tool for Analyzing Video Data, 1997, pp. 209-218.
Liu et al., A New Network-Based Intelligent Surveillance System, 2000, pp. 1187-1192.
Dimitrova et al., Motion Recovery for Video Content Classification, Oct. 1995, pp. 408-439.
Wang et al., "A Video Analysis Framework for Soft Biometry Security Surveillance," Applications of Computer Vision (WACV), 2005 Workshop on, Nov. 11, 2005, pp. 71-78.
Xiang et al., Activity Based Surveillance Video Content Modelling, Nov. 24, 1997, pp. 2309-2326.
Brémond et al., Issues of Representing Context Illustrated by Video-Surveillance Applications, International Journal of Human-Computer Studies—Special issue: using context in applications, vol. 48 Issue 3, Mar. 1998, pp. 375-391.
Tian et al., IBM Smart Surveillance System (S3): Event Based Video Surveillance System with an Open and Extensible Framework, 30 pages.
Cheyer et al., MVIEWS: Multimodal Tools for the Video Analyst, 1998, pp. 55-62, available at http://www.iuiconf.org/98pdf/1998-001-0009.pdf.
Setchell, Applications of Computer Vision to Road-Traffic Monitoring, Sep. 1997, pp. 1-170.
Business Wire, Ivex Appoints Richard Kramer Vice President, Engineering, Jun. 27, 2000.
The Jerusalem Report, Smile, You're on Surveillance Camera, Jun. 16, 2003.
Business Wire, Vidient Systems Debuts with Powerful New Video Surveillance Software, Features Sophisticated Behavior Analysis Capabilities, Sep. 27, 2004.
Aimetis Corp., Aira Hardware Requirements, Apr. 20, 2006.
Business Wire, Ivex's ViewOps Expands Beyond Security, Sep. 11, 2000.
Leininger et al., Autonomous Real-Time Ground Ubiquitous Surveillance—Imaging System (ARGUS-IS), 2008, pp. 1-11.
Lipton et al., ObjectVideo Forensics: Activity-Based Video Indexing and Retrieval for Physical Security Applications, 2004, pp. 56-60.
Taylor et al., OVVV: Using Virtual Worlds to Design and Evaluate Surveillance Systems, 2007, 8 pages.
NexWatch, ProWatch 3 Release 6 Integral DVXi Digital Video Recorder Integration, pp. 1-13.

(56) References Cited

OTHER PUBLICATIONS

Lipton et al., ComMode: An Algorithm for Video Background Modeling and Object Segmentation, Dec. 2002, pp. 1603-1608.
Security Magazine, GE Security (Corporate Profiles) (Brief Article), Aug. 1, 2004.
UBM, LLC, A Vote for I.T.—The Message from Both Candidates is Clear: IT Matters in Business, the Economy, and the Upcoming Election, Jul. 19, 2004.
UBM, LLC, Case Study: Artificial Intelligence—On the Border of Technology's Reach, Jun. 7, 2004.
UBM, LLC, Let's Get Physical, Mar. 22, 2004.
UBM, LLC, Texas Instruments and ObjectVideo—Video Content Analysis Algorithms for Digital Media Processors, Nov. 29, 2004.
Bruno, DiamondBack Changes Name, Business, Aug. 3, 2001.
Bruno, DiamondBack Confirms $8.5M Financing, Jan. 12, 2001.
Bruno, DiamondBack to Close on $8.5MIL Friday, Jan. 11, 2001.
Hardesty, Video Objectification: New Tools Have Computers Seeing Things, Apr. 2002.
Haering et al., The Evolution of Video Surveillance: An Overview, Jun. 19, 2008, pp. 279-290.
GE Interlogix, VideoIQ™ Product Data Sheet, Jan. 2004, pp. 1-4.
Collins et al., Algorithms for Cooperative Multisensor Surveillance, Oct. 2001, pp. 1456-1477.
Kanade et al., Cooperative Multi-Sensor Video Surveillance, May 1997, pp. 3-10.
Lv, et al., "Self-Calibration of a Camera from Video of a Walking Human," 2002 Proceedings, 16th International Conference on Pattern Recognition, vol. 1, pp. 562-567.
Sony Electronics Inc., Sony IP Video Monitoring, High Performance Digital Security Solution, 2005, 8 pages.
Business Wire, Ivex Launches ViewOps Internet Video Service, Jun. 28, 2000.
Cernium Website, Cernium News & Events—Access Control & Security Systems—Cernium Signs Optiwise Solutions, Mar. 1, 2005.
Cernium Website, Perceptrak—Powerful, Information-Driven Video Surveillance, 2010.
ShopperTrak, ShopperTrak RCT Corporation: Fact Sheet, pp. 1-12.
Zhai et al., Composite Spatio-Temporal Event Detection in Multi-Camera Surveillance Networks, White Paper, IBM Thomas J. Watson Center, Hawthorne, NY, pp. 1-12.
PR Newswire, Cyntergy Provides Help Desk Services to ShopperTrak to Support Installation of its Orbit™ System, Jun. 7, 1999.
Security Management, The Secrets of CCTV, Aug. 1, 1993.
Security Distributing & Marketing Magazine, We Know It's Human. VideoIQ™ Delivers Where Motion Detection Comes Up Short, Oct. 1, 2003.
Ivex, User Manual: PC/PPC Viewer, pp. 1-13.
M2 Presswire, Analog Devices: Analog Introduces First Wavelet Video Codecs Optimized for Surveillance & CCTV Apps., Sep. 15, 1998.
ShopperTrak, Orbit 5 Technology: The Future in Traffic Counting.
Cernium Website, Cernium News & Events—Cernium's Perceptrak Intelligent Video Management Systems Utilized in Johns Hopkins University Security Upgrade, May 24, 2005.
Business Wire, GVI Security Solutions Signs Agreement with Safeguards Video, LLC for Intelligent Video Threat Detection, Jan. 12, 2005.
Chicago Sun-Times, Tech Briefs, Aug. 27, 2002.
Security Distributing & Marketing Magazine, Advanced Video Surveillance System: Product Achievement Award for CCTV—ISC West (Top Products of 2003), Dec. 1, 2003.
Vidient, SmartCatch Analytics 3.0—Product Sheet, 2007, pp. 1-4.
VideoIQ Website, VideoIQ iCVR Cameras and Encoders—Introducing the Only Intelligent, Decentralized Surveillance Systems Contained Entirely Inside State-of-the-Art IP Cameras and Encoders, 2010, 4 pages.
Senior et al., Visual Person Searches for Retail Loss Detection: Application and Evaluation, 10 pages.
Ivex Launches First Programmable Streaming Multimedia Network Appliance (News Release), Apr. 5, 2001.
Cernium Website, Cernium News & Events—Securityinfowatch. com—ExitSentry Installed at Tulsa International Airport, Apr. 27, 2005.
GE Security, User Manual: DVMRe Simplex, May 2004, pp. 1-91.
Haritaoglu, Ghost3D: Detecting Body Posture and Parts Using Stereo, Feb. 28, 2003, pp. 1-35.
ioIMAGE Press Release, IoIMAGE to Showcase Performance-Breaking Intelligent Video Solutions at the Texas Instruments Developer Conference, Feb. 28, 2006.
Moin, High Tech Meets High Fashion, Jul. 9, 2003.
Business Wire, Ivex Launches First Programmable Streaming Multimedia Network Appliance, Apr. 5, 2001.
VideoIQ Website, VideoIQ View Video Management System, 2010, 2 pages.
Ivex, VSA1201: Wireless Video Streaming Appliance.
M2 Presswire, MRT: MRT Micro Launches Intelligent Observation Products for Business and Personal Applications, Feb. 11, 1999.
Ivex, User Manual: ViewOps Professional Software Plug-In for Intelligent Security Applications, 2000, pp. 1-38.
VisioWave Motion Sensor, pp. 1-4.
ioimage Website, ioi cam mmp100dn—Intelligent-Video 3 Megapixel IP PIP/Dual-View Color Day/Night Camera, pp. 1-5.
Ivex, Ivex Smart Video: Value Proposition, Jul. 6, 2001, pp. 1-10.
PR Newswire, NICE Systems Launches NiceVision, Dec. 10, 1998.
Magee, "Tracking Multiple Vehicles using Foreground, Background, and Motion Models," European Conference on Computer Vision, May 2002.
Huang, et al., "Image segmentation using temporal-spatial information in dynamic scenes," Proceedings of the Second International Conference on Machine Learning and Cybernetics, Xi'an, Nov. 2-5, 2003.
McAllister, et al., "Towards a Non-Contact Driver-Vehicle Interface," 2000 IEEE Intelligent Transportation Systems Conference Proceedings, Oct. 2000, pp. 58-63.
McAllister, et al., "Tracking a Driver's Hands Using Computer Vision," 2000 IEEE, pp. 1388-1393.
Stauffer, et al., "Learning patterns of activity using real-time tracking," IEEE Transactions on Pattern Analysis and Machine Intelligence, vol. 22, No. 8, Aug. 2000.
Tian, et al., "Robust and Efficient Foreground Analysis for Real-time Video Surveillance," Proceedings of the 2005 IEEE CVPR'05.
Hampapur et al., "Smart Video Surveillance," IEEE Signal Processing Magazine, pp. 38-51 (2005).
Connell et al., "Detection and Tracking in the IBM PeopleVision System," 2004 IEEE Conference on Multimedia and Expo, pp. 1403-1406 (2004).
Gong et al. A Generic Video Parsing System with a Scene Description Language (SDL), 1996, pp. 45-59.
Allmen, et al., "Long-Range Spatiotemporal Motion Understanding Using Spatiotemporal Flow Curves," Proceedings of IEEE International Conference on Computer Vision and Pattern Recognition, pp. 303-309, 1991.
McLeod, Alastair, "Automated Video Surveillance: Teaching an Old Dog New Tricks," Proc. SPIE 1989, 228 (1993).
Coifman et al., A Real-Time Computer Vision System for Vehicle Tracking and Traffic Surveillance, Dec. 3, 1998, pp. 271-288.
Collins et al., A System for Video Surveillance and Monitoring, May 2000, pp. 1-68.
Gavrila, The Visual Analysis of Human Movement: A Survey, Jan. 1999, pp. 82-98.
Haritaoglu, A Real Time System for Detection and Tracking of People and Recognizing Their Activities, 1999, pp. 1-35.
Khan et al., Human Tracking in Multiple Cameras, 2001, pp. 331-336.
Kim, et al., "Real-time foreground-background segmentation using codebook model," Real-time Imaging, vol. 11, issue 3, Jun. 2005.
Kuo et al., Design of Networked Visual Monitoring Systems, 1999, pp. 149-161.
Martins et al., A 3D Model Based Visual Surveillance System, Sep. 5-8, 2000, 6 pages.

(56) References Cited

OTHER PUBLICATIONS

Meguerdichian et al., Coverage Problems in Wireless Ad-Hoc Sensor Networks, 2001, pp. 1380-1387.
Olson et al., Moving Object Detection and Event Recognition Algorithms for Smart Cameras, 1997, pp. 159-175.
Stauffer, et al., "Adaptive background mixture models for real-time tracking," Proceedings of IEEE Conf. on Computer Vision and Pattern Recognition, pp. 246-252, 1999.
Toyama, et al., "Wallflower: Principles and practice of background maintenance," Proceedings of IEEE International Conference on Computer Vision, vol. 1, pp. 255-261, 1999.
Wren et al., "Pfinder: Real-Time Tracking of the Human Body," IEEE Transactions on Pattern Analysis and Machine Intelligence Jul. 1997, pp. 780-785.
Grant et al., "Collection of Vehicle Activity Data by Video Detection for Use in Transportation Planning," ITS Journal, May 2000, vol. 5, pp. 343-361.
ioimage Website, ioimage—ioibox—Intelligent Video Encoder Series.
Advanced Traffic Analysis Center Upper Great Plains Transportation Institute, "Autoscope Intersection Volume Reader," Oct. 2007, pp. 1-8.
Econolite, "Autoscope Image Sensor—AIS-IV," pp. 1-2.
Flow Traffic Limited, "Autoscope Video Vehicle Detection System Achievement List," p. 1-69.
Klein, et al., Traffic Detector Handbook: Third Edition—vol. II, Chapter 5, pp. 1-31, Oct. 2006.
Kyte, et al., "Video-Based Traffic Data Collection," Oct. 2000, pp. 1-42.
Lo et al., "Automatic Congestion Detection System for Underground Platforms," Proceedings of 2001 International Symposium on Intelligent Multimedia, Video and Speech Processing, (Hong Kong, May 2001).
Panda, "An Integrated Video Sensor Design for Traffic Management and Control," pp. 1-13, Jul. 1999.
Panda, et al., "Technology for Improved Operation and Maintenance of Video-Based Automated Incident Detection Sensors," Jun. 2000, pp. 1-6.
Rehg et al., Ambiguities in Visual Tracking of Articulated Objects Using Two- and Three-Dimensional Models, Jun. 2003, pp. 393-418.
Reynhout, et al., "Acitvation of the 1-394 Laboratory for its Operational Testing: Phase I," Dec. 1997, pp. 1-90.
Rossi et al., "Tracking and counting moving people," Image Processing, 1994 Proceedings, ICIP-94, IEEE International Conference, vol. 3 (Nov. 1994).
Smith, et al., "Camera Positioning and Calibration Techniques for Integrating Traffic Surveillance Video Systems with Machine-Vision Vehicle Detection Devices," Dec. 2002, pp. 1-20.
SRF Consulting Group, Inc., "Portable Traffic Management System Smart Work Zone Application," May 1997, pp. 1-117.
Zhou et al., A Master-Slave System to Acquire Biometric Imagery of Humans at Distance, ACM International.
Workshop on Video Surveillance, Nov. 2003.
Marchesotti et al., A video Surveillance Architecture for Alarm Generation and Video Sequences Retrieval, 2002.
Bosch Respondent's Notice of Prior Art, Dec. 9, 2011.
secureRus, Impaq IDVR 16E/AV Tech AV777 DVR, 2 pages.
VideoIQ, Search Results from HighBeam Research—16 Matching Articles, 2010.
Abstract and documents related to the contract for DoD Award, Mast-mounted In-port Video Surveillance System, Identification No. N02-073-03, N00014-02-M-0108.
Amer, "Object and Event Extraction for Video Processing and Representation in On-Line Video Applications" Doctorate Thesis, INRS University (2001).
Autoscope 2004 Supervisor User Guide, Autoscope User Manuals Ver. 1.0A (Oct. 1999) at ISO001211—ISO001608—.

Azarbayejani et al., "Real-time Self-Calibrating Stereo Person Tracking using 3-D Shape Estimation from Blob Features," in ICPR '96, vol. 3, pp. 627-632, Vienna, Austria, 1996.
Black et al., "Wide Area Surveillance with a Multi Camera Network," Intelligent Distributed Surveillance Systems (IDSS-04), pp. 21-25 (2004).
Brodsky et al., "Visual Surveillance in Retail Stores and in the Home," Video-Based Surveillance Systems Computer Vision and Distributed Processing, pp. 51-61 (2002).
Collins et al., "Calibration of an outdoor active camera system," IEEE Computer Society Conference on Computer Vision and Pattern Recognition, vol. 1, 1999 528-34.
Courtney, "Automatic Video Indexing Via Object Motion Analysis," Pattern Recognition, pp. 607-625 (1997).
Criminisi et al., "A New Approach to Obtain Height Measurements from Video," Proc. of SPIE vol. 3576, Investigation and Forensic Science Technologies, S. 227-238, 1998.
Cucchiara et al., "Image Analysis and Rule-Based Reasoning for a Traffic Monitoring System," IEEE Transactions on Intelligent Transportation Systems, pp. 119-130 (2000).
Cucchiara et al., "Probabilistic Posture Classification for Human-Behavior Analysis," IEEE Transactions on Systems, Man, and Cybernetics, vol. 35, No. 1, pp. 42-54 (2005).
Cucchiara et al., "Using Computer Vision Techniques for Dangerous Situation Detection in Domotic Applications," Intelligent Distributed Surveillance Systems, IEE, pp. 1-5 (2004).
Dagtas et al., "Models for Motion-Based Video Indexing and Retrieval," IEEE Transactions on Image Processing, pp. 88-101 (2000).
Datta et al., "Person-on-Person Violence Detection in Video Data," Proceedings of the 16th International Conference on Pattern Recognition, pp. 433-38 (2002).
Flinchbaugh, "Robust Video Motion Detection and Event Recognition," Proceedings of the 1997 Image Understanding Workshop, New Orleans, May 1997, vol. 1, Thomas M. Strat Ed.
Fujiyoshi et al., Real-Time Human Motion Analysis by Image Skeletonization, Oct. 1998.
Fujiyoshi et al., "Real-Time Human Motion Analysis by Image Skeletonization," IEICE Transf. Inf. & Syst., vol. E87-D, No. 1, pp. 113-20 (2004).
Greenhill et al., "VIGILANT," Video-Based Surveillance Systems Computer Vision and Distributed Processing, pp. 193-204 (2002).
Haritaoglu et al., "W4: Real-Time Surveillance of People and Their Activities," IEEE Transactions on Pattern Analysis and Machine Intelligence, pp. 809-830 (2000).
Haritaoglu et al., "Ghost: A Human Body Part Labeling System Using Silhouettes," 14th International Conference on Pattern Recognition, pp. 1-6 (1998).
Haritaoglu, W4 A Real-Time System for Detection and Tracking of People and Monitoring Their Activities (Thesis), 1999, pp. 1-113.
Hartmann, et al. "Assessing Vehicle Detection Utilizing Video Image Processing Technology," Sep. 1996, pp. 1-174.
Image Sensing Systems, Inc., "Autoscope Supervisor Toolkit Getting Started Guide," Mar. 1998.
Image Sensing Systems, Inc., "Autoscope," Mar. 1, 2000, pp. 1-2.
Image Sensing Systems, Inc., "Image Sensing Systems, Inc. Announces Autoscope 2004 Achieves Excellent Results in Recent Test by Swedish National Road Administration," Mar. 6, 1998, pp. 1-2.
Image Sensing Systems, Inc., "Supervisor User Guide Wide Area Vehicle Detection System," Mar. 1998.
Isard et al., "BraMBLe: a Bayesian multiple-blob tracker," Computer Vision, 2001. ICCV 2001. Proceedings. Eighth IEEE International Conference on, vol. 2 (2001).
Kanade et al., "Image Understanding Research at CMU," Proceedings of the 1997 Image Understanding Workshop, New Orleans, May 1997, vol. 1, Thomas M. Strat Ed.
Kanade et al., Advances in Cooperative Multi-Sensor Video Surveillance, Nov. 1998, pp. 3-24.
Lipton et al., Video Surveillance System Employing Video Primitives, 2011.
Lipton, Automated Video Protection, Monitoring & Detection, 2003.

(56) References Cited

OTHER PUBLICATIONS

Lipton, Virtual Postman—Real-Time, Interactive Virtual Video, 1999.
Luo, et al., "Statistical model based video segmentation and its application to very low bit rate video coding," pp. 438-442, 1998.
Mackintosh, Sentinel—A Technology for Practical Automatic Monitoring of Busy and Complex Scenes, Security Technology, 1992. Crime Countermeasures, Proceedings. Institute of Electrical and Electronics Engineers 1992 International Carnahan Conference on (Oct. 1992).
Mendelsohn et al., "Constrained self-calibration," Computer Vision and Pattern Recognition, 1999, IEEE Computer Society Conference, vol. 2, 1999.
Meyer et al., "A New System for Video-Based Detection of Moving Objects and its Integration into Digital Networks," 30th Annual International Carnahan Conference Security Technology, pp. 105-110 (1996).
Michalopoulos, "Vehicle Detection Video Through Image Processing: The Autoscope System", IEEE Transactions on Vehicular Technology, vol. 40, No. 1, Feb. 1991.
Moeslund et al., "A Survey of Computer Vision-Based Human Motion Capture," Computer Vision and Image Understanding, vol. 81, pp. 231-268 (2001).
Oberti et al., "A Comparison Between Continuous and Burst, Recognition Driven Transmission Policies in Distributed 3GSS," Video-Based Surveillance Systems Computer Vision and Distributed Processing, pp. 267-278 (2002).
Ozer et al., "Real-Time Posture and Activity Recognition," Proceedings of the Workshop on Motion and Video Computing, pp. 133-138 (2002).
Pentland et al., "Real-Time 3-D Tracking and Classification of Human Behavior," Proceedings of the 1997 Image Understanding Workshop, New Orleans, May 1997, vol. 1, Thomas M. Strat Ed. 193-200.
Qian et al., "A Computational Approach to Semantic Event Detection," IEEE Computer Society Conference on Computer Vision and Pattern Recognition (1999).
Regazzoni et al., "Intelligence Distribution of a Third Generation People Counting System Transmitting Information over an Urban Digital Radio Link," Video-Based Surveillance Systems Computer Vision and Distributed Processing, pp. 251-265 (2002).
Sayles et al., "CaML: Camera Markup Language for Network Interaction," Proceedings of SPIE, pp. 248-256 (2003).
Shotton et al., "Object Tracking and Event Recognition in Biological Microscopy Videos," Fifth International Conference on Pattern Recognition, pp. 226-229 (2000).
Siebel et al., "On the Use of Colour Filtering in an Integrated Real-Time People Tracking System," in Video-Based Surveillance Systems: Computer Vision and Distributed Processing, pp. 167-175 (Remagninoet al. eds., 2002).
Soldatini et al., "Network Management Within an Architecture for Distributed Hierarchial Digital Surveillance Systems," Multimedia Video-Based Surveillance Systems, pp. 143-157 (2000).
Zhang, "A Flexible New Technique for Camera Calibration," IEEE Transactions on Pattern Analysis and Machine Intelligence, vol. 22, No. 11, Nov. 2000.
Zhang, "A Flexible New Technique for Camera Calibration," Technical Report MSR-TR-98-71, Microsoft Research, Microsoft Corp., Dec. 2, 1998.
Zhao et al., "Segmentation and tracking of multiple humans in complex situations," Computer Vision and Pattern Recognition, 2001. Proceedings of the 2001 IEEE Computer Society Conference on, vol. 2, pp. II-194-II-201, 2001.
Hotter et al., Detection of Moving Objects in Natural Scenes by a Stochastic Multi-Feature Analysis of Video Sequences (Robert Bosch GmbH, Advanced Development Communications).
Megerdichian et al., "Coverage Problems in Wireless Ad-hoc Sensor Networks".
Marcenaro et al., Distributed Architectures and Logical-Task Decomposition in Multimedia Surveillance Systems, pp. 1419-1440.
Appendix A, Information Disclosure Statement Transmittal of Mar. 21, 2012.
Office Action dated Nov. 25, 2011 in related EPO Application No. 06 749 276.9-1232.
Econolite, "Autoscope Image Sensor—AIS-IV," pp. 1-2, 2011.
Ghanem et al., Representation and Recognition of Events in Surveillance Video Using Petri Nets, Proceedings of the 2004 IEEE Computer Society Conference on Computer Vision and Pattern Recognition Workshops, pp. 1-9, 2004.
Jain et al. "Metadata in Video Databases," SIGMOD Record, vol. 23, No. 4, Dec. 1994, pp. 27-33.
Feb. 2, 2013 Communication from European Patent Office in connection with related Application No. 12 151 067.1-2218.
Day et al., "Object Oriented Conceptual Modeling of Video Data" IEEE, 1995, pp. 401-408.
Day et al., "Spatio-Temporal Modeling of Video Data for On-Line Object-Oriented Query Processing," IEEE, 1995, pp. 98-105.
May 9, 2013 Chinese Office Action issued in related Chinese Application No. 200680019911.2.
European Third Party Observation Report issued in European Application No. 06749276.9-1232/1872583 dated Apr. 10, 2012.
Examination Report (EPO Form 2906 01.91TRI) issued in European Application No. 02 752 397.6 dated May 30, 2012.
Communication (Reference Y18124/RW) re extended European search report issued in European Application No. 12151069.7-2218 dated May 23, 2012.
Communication (Reference Y18125/RW) re extended European search report issued in European Application No. 12151067.1-2218 dated May 23, 2012.
First Office Action issued in Chinese Application No. 200680019911.2 dated Oct. 23, 2009.
Second Office Action issued in Chinese Application No. 200680019911.2 dated Dec. 23, 2011.
Office Action from the European Patent Office dated Jan. 14, 2014.
Didier et al., "Time-scale change detection applied to real-time abnormal stationarity monitoring." Real-Time Imaging, vol. 10, Issue 1, Feb. 2004, pp. 9-22.
Stringa et al., "Content-based retrieval and real time detection from video sequences acquired by surveillance systems." Image Processing, 1998. ICIP 98. Proceedings. 1998 International Conference on, pp. 138-142 vol. 3, Oct. 4-7, 1998. dot: 10-1109/ICIP.1998.727153.
Young et al. "PETS metrics: on-line performance evaluation service." Visual Surveillance and Performance Evaluation of Tracking and Surveillance, 2005. $2^{nd}$ joint IEEE International Workshop on, pp. 317-324, Oct. 15-16, 2005.
Desurmont et al., "A Seamless Modular Approach for Real-Time Video Analysis for Surveillance." Image Analysis for Multimedia Interactive Services, Workshop on, 2004.
Fuentes et al., "Tracking People for Automatic Surveillance Applications." Part of Lecture Notes in Computer Science, Pattern Recognition and Image Analysis, 2003.
Opposition Proceeding from the EPO for EP 1872583.
Lipton et al.: "Objectvideo Forensics: Activity-Based Video Indexing and Retrieval for Physical Security Applications", IEE Intelligent Distributed Surveillance Systems, Feb. 23, 2004.
Heartwell et al: "Critical Asset Protection, Perimeter Monitoring and Threat Detection using Automated Video Surveillance—A Technology Overview with Case Studies", Proceedings 36th Annual 2002 International Carnahan Conference on Security Technology, 2002.
Proposal No. N021-1610 "Mast-mounted In-Port Video Surveillance System", Topic No. N02-073, Abstract, publication date unknown—see Transmittal.
Proposal No. N031-1723, "Human Activity Recognition", Topic No. N03-129, Abstract, publication date unknown—see Transmittal.
Ellen McCarthy "A Firm That Lets Guards Keep an Electronic Eye Open", Oct. 21, 2002.
Collins, et al. "A System for Video Surveillance and Monitoring". Carnegie Mellon University, 2000.

(56) References Cited

OTHER PUBLICATIONS

Kanade, et al. "Advances in Cooperative Multi-Sensor Video Surveillance". Robotics Institute, Carnegie Mellon University.
Lipton, et al. "Automated Video Protection, Monitoring & Detection". IEEE AESS Systems Magazine, May 2003.
Cao, et al. "Automatic Geo-Registration for Port Surveillance". International Journal of Pattern Recognition and Artificial Intelligence, Nov. 19, 2008.
Haering, et al. "A Semantic Event-Detection Approach and Its Application to Detecting Hunts in Wildlife Video". IEEE Transactions on Circuits and Systems for Video Technology, vol. 10, No. 6, Sep. 2000.
Cao, et al. "Automatic Geo-Registration of Maritime Video Feeds". IEEE, 2008.
Haering, et al. "Content-Based Access of Image and Video Libraries". Proceedings on IEEE Workshop, pp. 15-25, Jun. 20, 1997.
Baker, et al. "Autonomous Vehicle Video Aided Navigation—Coupling INS and Video Approaches".
Lipton, Alan. "Keynote: Intelligent Video as a Force Multiplier for Crime Detection and Prevention".
Ali, et al. "Interactive Retrieval of Targets for Wide Area Surveillance". MM'10, Firenze, Italy, Oct. 2010.
Rice, et al."Maritime Surveillance in the Intracoastal Waterway using Networked Underwater Acoustic Sensors integrated with a Regional Command Center". 2nd International Conference on Waterside Security, Marina di Carrara, Italy, Nov. 2010.
Heartwell, et al. "Critical Asset Protection, Perimeter Monitoring and Threat Detection using Automated Video Surveillance—A Technology Overview with Case Studies". IEEE, 2002.
Choe, et al. "Image Transformation for Object Tracking in High-Resolution Video". IEEE, 2008.
Deng, et al. "Fast Forensic Video Event Retrieval Using Geospatial Computing".
Venetianer, et al. "Performance evaluation of an intelligent video surveillance system—A case study". Computer Vision and Image Understanding 114, pp. 1292-1302, 2010.
Hakeem, et al. "Semantic Video Search using Natural Language Queries" MM'09, Beijing, China, Oct. 2009.
Rasheed, et al. "Rapidly Deployable Video Analysis Sensor Units for Wide Area Surveillance".
Haering, Niels. "What Would You Pay for Automated Video Analysis?". 2009 Advanced Video and Signal Based Surveillance. IEEE, 2009.
International Search Report issued for PCT Application No. PCT/US06/45625, dated Sep. 24, 2007.
Written Opinion of the International Searching Authority issued for PCT Application No. PCT/US06/45625, dated Sep. 24, 2007.

\* cited by examiner

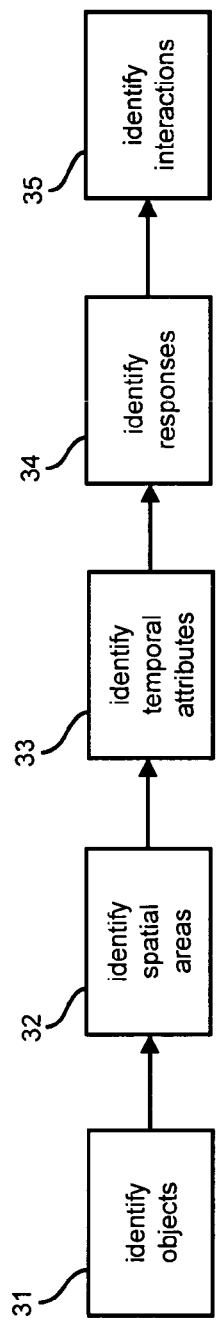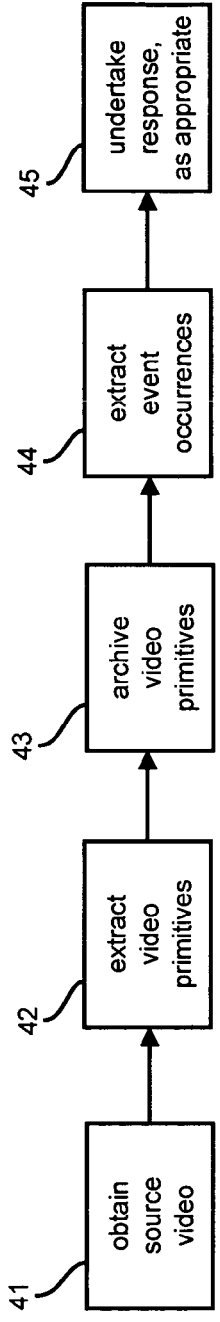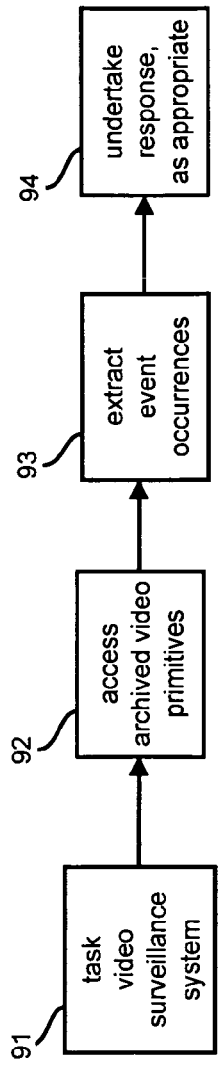

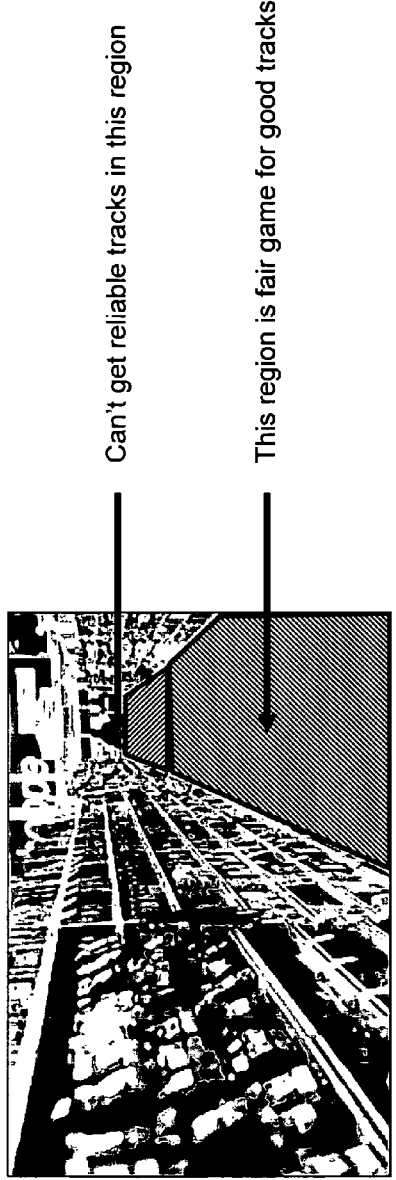
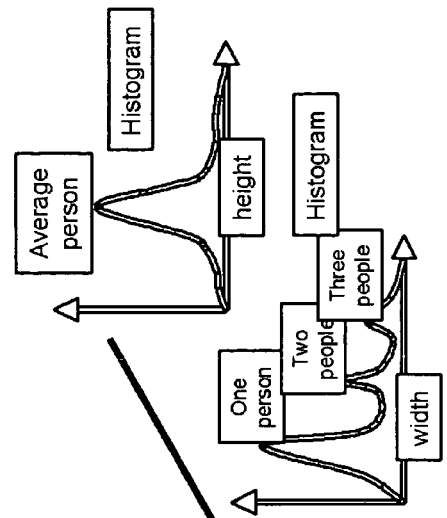
Fig 10
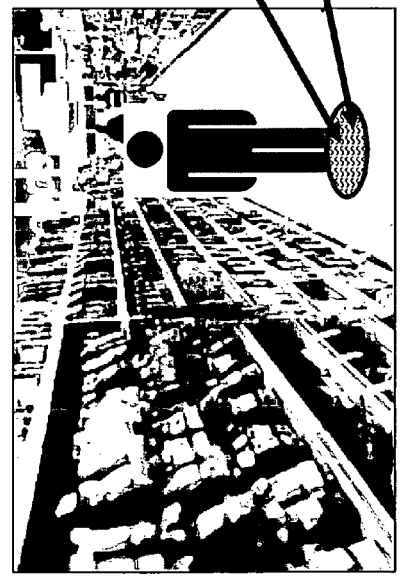
Fig 11

VIDEO SURVEILLANCE SYSTEM EMPLOYING VIDEO PRIMITIVES

CROSS-REFERENCE TO RELATED APPLICATIONS

This application is a continuation-in-part of U.S. patent application Ser. No. 11/098,385, filed on Apr. 5, 2005, which is a continuation-in-part of U.S. patent application Ser. No. 11/057,154, filed on Feb. 15, 2005, which is a continuation-in-part of U.S. patent application Ser. No. 09/987,707, filed Nov. 15, 2001, which is a continuation-in-part of U.S. patent application Ser. No. 09/694,712, filed on Oct. 24, 2000, all of which are incorporated herein by reference.

BACKGROUND OF THE INVENTION

Field of the Invention

The invention relates to a system for automatic video surveillance employing video primitives.

REFERENCES

For the convenience of the reader, the references referred to herein are listed below. In the specification, the numerals within brackets refer to respective references. The listed references are incorporated herein by reference.

The following references describe moving target detection:

{1} A. Lipton, H. Fujiyoshi and R. S. Patil, "Moving Target Detection and Classification from Real-Time Video," *Proceedings of IEEE WACV '98*, Princeton, N.J., 1998, pp. 8-14.

{2} W. E. L. Grimson, et al., "Using Adaptive Tracking to Classify and Monitor Activities in a Site", *CVPR*, pp. 22-29, June 1998.

{3} A. J. Lipton, H. Fujiyoshi, R. S. Patil, "Moving Target Classification and Tracking from Real-time Video," *IUW*, pp. 129-136, 1998.

{4} T. J. Olson and F. Z. Brill, "Moving Object Detection and Event Recognition Algorithm for Smart Cameras," *IUW*, pp. 159-175, May 1997.

The following references describe detecting and tracking humans:

{5} A. J. Lipton, "Local Application of Optical Flow to Analyse Rigid Versus Non-Rigid Motion," *International Conference on Computer Vision*, Corfu, Greece, September 1999.

{6} F. Bartolini, V. Cappellini, and A. Mecocci, "Counting people getting in and out of a bus by real-time image-sequence processing," *IVC*, 12(1):36-41, January 1994.

{7} M. Rossi and A. Bozzoli, "Tracking and counting moving people," *ICIP94*, pp. 212-216, 1994.

{8} C. R. Wren, A. Azarbayejani, T. Darrell, and A. Pentland, "Pfinder: Real-time tracking of the human body," *Vismod*, 1995.

{9} L. Khoudour, L. Duvieubourg, J. P. Deparis, "Real-Time Pedestrian Counting by Active Linear Cameras," *JEI*, 5(4):452-459, October 1996.

{10} S. Ioffe, D. A. Forsyth, "Probabilistic Methods for Finding People," *IJCV*, 43(1):45-68, June 2001.

{11} M. Isard and J. MacCormick, "BraMBLe: A Bayesian Multiple-Blob Tracker," *ICCV*, 2001.

The following references describe blob analysis:

{12} D. M. Gavrila, "The Visual Analysis of Human Movement: A Survey," *CVIU*, 73(1):82-98, January 1999.

{13} Niels Haering and Niels da Vitoria Lobo, "Visual Event Detection," *Video Computing Series*, Editor Mubarak Shah, 2001.

The following references describe blob analysis for trucks, cars, and people:

{14} Collins, Lipton, Kanade, Fujiyoshi, Duggins, Tsin, Tolliver, Enomoto, and Hasegawa, "A System for Video Surveillance and Monitoring: VSAM Final Report," Technical Report CMU-RI-TR-00-12, Robotics Institute, Carnegie Mellon University, May 2000.

{15} Lipton, Fujiyoshi, and Patil, "Moving Target Classification and Tracking from Real-time Video," 98 *Darpa IUW*, Nov. 20-23, 1998.

The following reference describes analyzing a single-person blob and its contours:

{16} C. R. Wren, A. Azarbayejani, T. Darrell, and A. P. Pentland. "Pfinder: Real-Time Tracking of the Human Body," *PAMI*, vol 19, pp. 780-784, 1997.

The following reference describes internal motion of blobs, including any motion-based segmentation:

{17} M. Allmen and C. Dyer, "Long—Range Spatiotemporal Motion Understanding Using Spatiotemporal Flow Curves," *Proc. IEEE CVPR*, Lahaina, Maui, Hi., pp. 303-309, 1991.

{18} L. Wixson, "Detecting Salient Motion by Accumulating Directionally Consistent Flow", IEEE Trans. Pattern Anal. Mach. Intell., vol. 22, pp. 774-781, August, 2000.

BACKGROUND OF THE INVENTION

Video surveillance of public spaces has become extremely widespread and accepted by the general public. Unfortunately, conventional video surveillance systems produce such prodigious volumes of data that an intractable problem results in the analysis of video surveillance data.

A need exists to reduce the amount of video surveillance data so analysis of the video surveillance data can be conducted.

A need exists to filter video surveillance data to identify desired portions of the video surveillance data.

SUMMARY OF THE INVENTION

An object of the invention is to reduce the amount of video surveillance data so analysis of the video surveillance data can be conducted.

An object of the invention is to filter video surveillance data to identify desired portions of the video surveillance data.

An object of the invention is to produce a real time alarm based on an automatic detection of an event from video surveillance data.

An object of the invention is to integrate data from surveillance sensors other than video for improved searching capabilities.

An object of the invention is to integrate data from surveillance sensors other than video for improved event detection capabilities The invention includes an article of manufacture, a method, a system, and an apparatus for video surveillance.

The article of manufacture of the invention includes a computer-readable medium comprising software for a video surveillance system, comprising code segments for operating the video surveillance system based on video primitives.

The article of manufacture of the invention includes a computer-readable medium comprising software for a video surveillance system, comprising code segments for accessing archived video primitives, and code segments for extracting event occurrences from accessed archived video primitives.

The system of the invention includes a computer system including a computer-readable medium having software to operate a computer in accordance with the invention.

The apparatus of the invention includes a computer including a computer-readable medium having software to operate the computer in accordance with the invention.

The article of manufacture of the invention includes a computer-readable medium having software to operate a computer in accordance with the invention.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

Definitions

A "video" refers to motion pictures represented in analog and/or digital form. Examples of video include: television, movies, image sequences from a video camera or other observer, and computer-generated image sequences.

A "frame" refers to a particular image or other discrete unit within a video.

An "object" refers to an item of interest in a video. Examples of an object include: a person, a vehicle, an animal, and a physical subject.

An "activity" refers to one or more actions and/or one or more composites of actions of one or more objects. Examples of an activity include: entering; exiting; stopping; moving; raising; lowering; growing; and shrinking.

A "location" refers to a space where an activity may occur. A location can be, for example, scene-based or image-based. Examples of a scene-based location include: a public space; a store; a retail space; an office; a warehouse; a hotel room; a hotel lobby; a lobby of a building; a casino; a bus station; a train station; an airport; a port; a bus; a train; an airplane; and a ship. Examples of an image-based location include: a video image; a line in a video image; an area in a video image; a rectangular section of a video image; and a polygonal section of a video image.

An "event" refers to one or more objects engaged in an activity. The event may be referenced with respect to a location and/or a time.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

BRIEF DESCRIPTION OF THE DRAWINGS

Embodiments of the invention are explained in greater detail by way of the drawings, where the same reference numerals refer to the same features.

FIG. 3 illustrates a flow diagram for tasking the video surveillance system.

FIG. 4 illustrates a flow diagram for operating the video surveillance system.

FIG. 9 illustrates an additional flow diagram for the video surveillance system of the invention.

FIGS. 10-15 illustrate examples of the video surveillance system of the invention applied to monitoring a grocery store.

DETAILED DESCRIPTION OF THE INVENTION

Figure 1:
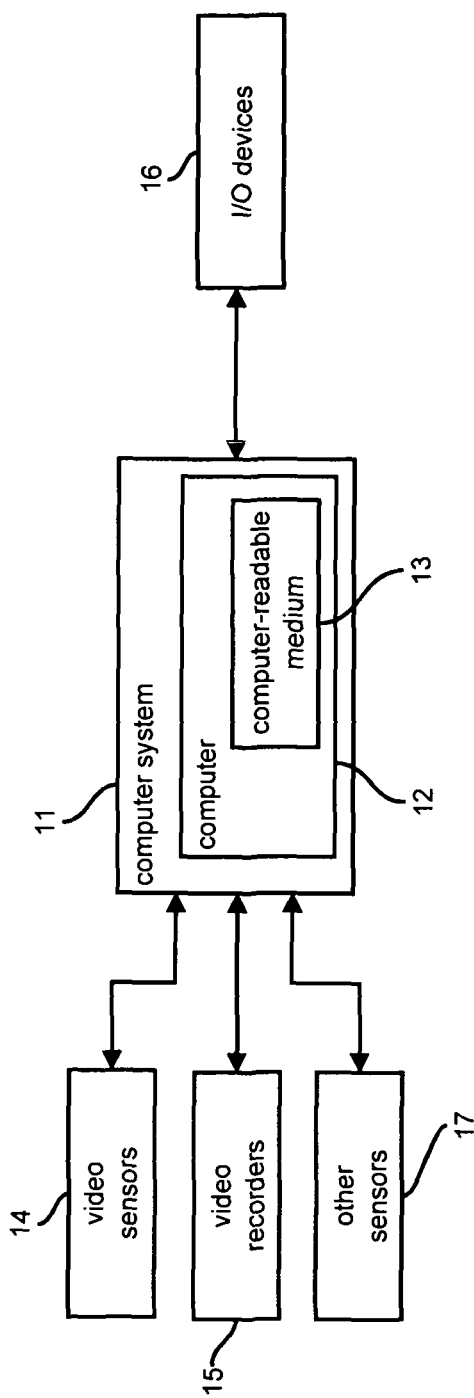
FIG. 1 illustrates a plan view of the video surveillance system of the invention.

The automatic video surveillance system of the invention is for monitoring a location for, for example, market research or security purposes. The system can be a dedicated video surveillance installation with purpose-built surveillance components, or the system can be a retrofit to existing video surveillance equipment that piggybacks off the surveillance video feeds. The system is capable of analyzing video data from live sources or from recorded media. The system is capable of processing the video data in real-time, and storing the extracted video primitives to allow very high speed forensic event detection later. The system can have a prescribed response to the analysis, such as record data, activate an alarm mechanism, or activate another sensor system. The system is also capable of integrating with other surveillance system components. The system may be used to produce, for example, security or market research reports that can be tailored according to the needs of an operator and, as an option, can be presented through an interactive web-based interface, or other reporting mechanism.

An operator is provided with maximum flexibility in configuring the system by using event discriminators. Event discriminators are identified with one or more objects (whose descriptions are based on video primitives), along with one or more optional spatial attributes, and/or one or more optional temporal attributes. For example, an operator can define an event discriminator (called a "loitering" event in this example) as a "person" object in the "automatic teller machine" space for "longer than 15 minutes" and "between 10:00 p.m. and 6:00 a.m." Event discriminators can be combined with modified Boolean operators to form more complex queries.

Although the video surveillance system of the invention draws on well-known computer vision techniques from the public domain, the inventive video surveillance system has several unique and novel features that are not currently available. For example, current video surveillance systems use large volumes of video imagery as the primary commodity of information interchange. The system of the invention uses video primitives as the primary commodity with representative video imagery being used as collateral evidence. The system of the invention can also be calibrated (manually, semi-automatically, or automatically) and thereafter automatically can infer video primitives from video imagery. The system can further analyze previously processed video without needing to reprocess completely the video. By analyzing previously processed video, the system can perform inference analysis based on previously recorded video primitives, which greatly improves the analysis speed of the computer system.

The use of video primitives may also significantly reduce the storage requirements for the video. This is because the event detection and response subsystem uses the video only to illustrate the detections. Consequently, video may be stored or transmitted at a lower quality. In a potential embodiment, the video may be stored or transmitted only when activity is detected, not all the time. In another potential embodiment, the quality of the stored or transmitted video may be dependent on whether activity is detected: video can be stored or transmitted at higher quality (higher frame-rate and/or bit-rate) when activity is detected and at lower quality at other times. In another exemplary embodiment, the video storage and database may be handled separately, e.g., by a digital video recorder (DVR), and the video processing subsystem may just control whether data is stored and with what quality. In another embodiment, the video surveillance system (or components thereof) may be on a processing device (such as general purpose processor, DSP, microcontroller, ASIC, FPGA, or other device) on board a video management device such as a digital video camera, network video server, DVR, or Network Video Recorder (NVR), and the bandwidth of video streamed from the device can be modulated by the system. High quality video (high bit-rate or frame-rate) need only be transmitted through an IP video network only when activities of interest are detected. In this embodiment, primitives from intelligence-enabled devices can be broadcast via a network to multiple activity inference applications at physically different locations to enable a single camera network to provide multi-purpose applications through decentralized processing.

Figure 22:
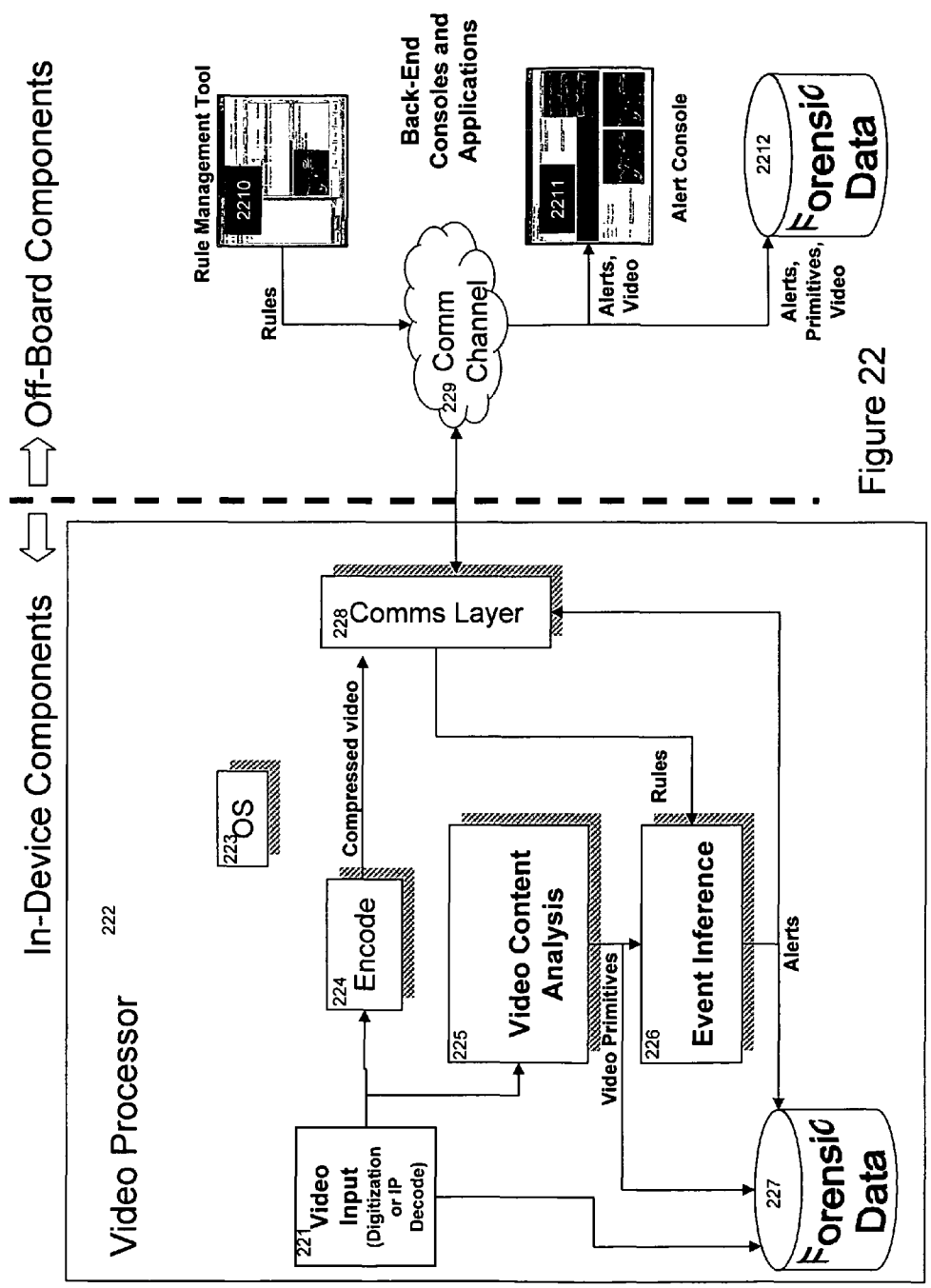
FIG. 22 shows an exemplary configuration of a video surveillance system according to an embodiment of the invention.

FIG. 22 shows one configuration of an implementation of the video surveillance system. Block 221 represents a raw (uncompressed) digital video input. This can be obtained, for example, through analog to digital capture of an analog video signal or decoding of a digital video signal. Block 222 represents a hardware platform housing the main components of the video surveillance system (video content analysis—block 225—and activity inference—block 226). The hardware platform may contain other components such as an operating system (block 223); a video encoder (block 224) that compresses raw digital video for video streaming or storage using any available compression scheme (JPEG, MJPEG, MPEG1, MPEG2, MPEG4, H.263, H.264, Wavelet, or any other); a storage mechanism (block 227) for maintaining data such as video, compressed video, alerts, and video primitives—this storage device may be, for example, a hard-disk, on-board RAM, on-board FLASH memory, or other storage medium; and a communications layer (block 228) which may, for example, packetize and/or digitize data for transmission over a communication channel (block 229).

There may be other software components residing on computational platforms at other nodes of a network to which communications channel 229 connects. Block 2210 shows a rule management tool which is a user interface for creating video surveillance rules. Block 2211 shows an alert console for displaying alerts and reports to a user. Block 2212 shows a storage device (such as DVR, NVR, or PC) for storing alerts, primitives, and video for further after-the-fact processing.

Components on the hardware platform (block 222) may be implemented on any processing hardware (general purpose processor, microcontroller, DSP, ASIC, FPGA, or other processing device) on any video capture, processing, or management device such as a video camera, digital video camera, IP video camera, IP video server, digital video recorder (DVR), network video recorder (NVR), PC, laptop, or other device. There are a number of different possible modes of operation for this configuration.

In one mode, the system is programmed to look for specific events. When those events occur, alerts are transmitted via the communication channel (block 229) to other systems.

In another mode, video is streamed from the video device while it is analyzing the video data. When events occur, alerts are transmitted via the communication channel (block 229).

In another mode, video encoding and streaming is modulated by the content analysis and activity inference. When there is no activity present (no primitives are being generates), no video (or low quality, bit-rate, frame rate, resolution) is being streamed. When some activity is present (primitives are being generated), higher quality, bit-rate, frame rate, resolution video is streamed. When events of interest are detected by the event inference, very high quality, bit-rate, frame rate, resolution video is streamed.

In another mode of operation, information is stored in the on-board storage device (block 227). Stored data may consist of digital video (raw or compressed), video primitives, alerts, or other information. The stored video quality may also be controlled by the presence of primitives or alerts. When there are primitives and alerts, higher quality, bit-rate, frame rate, resolution video may be stored.

Figure 23:
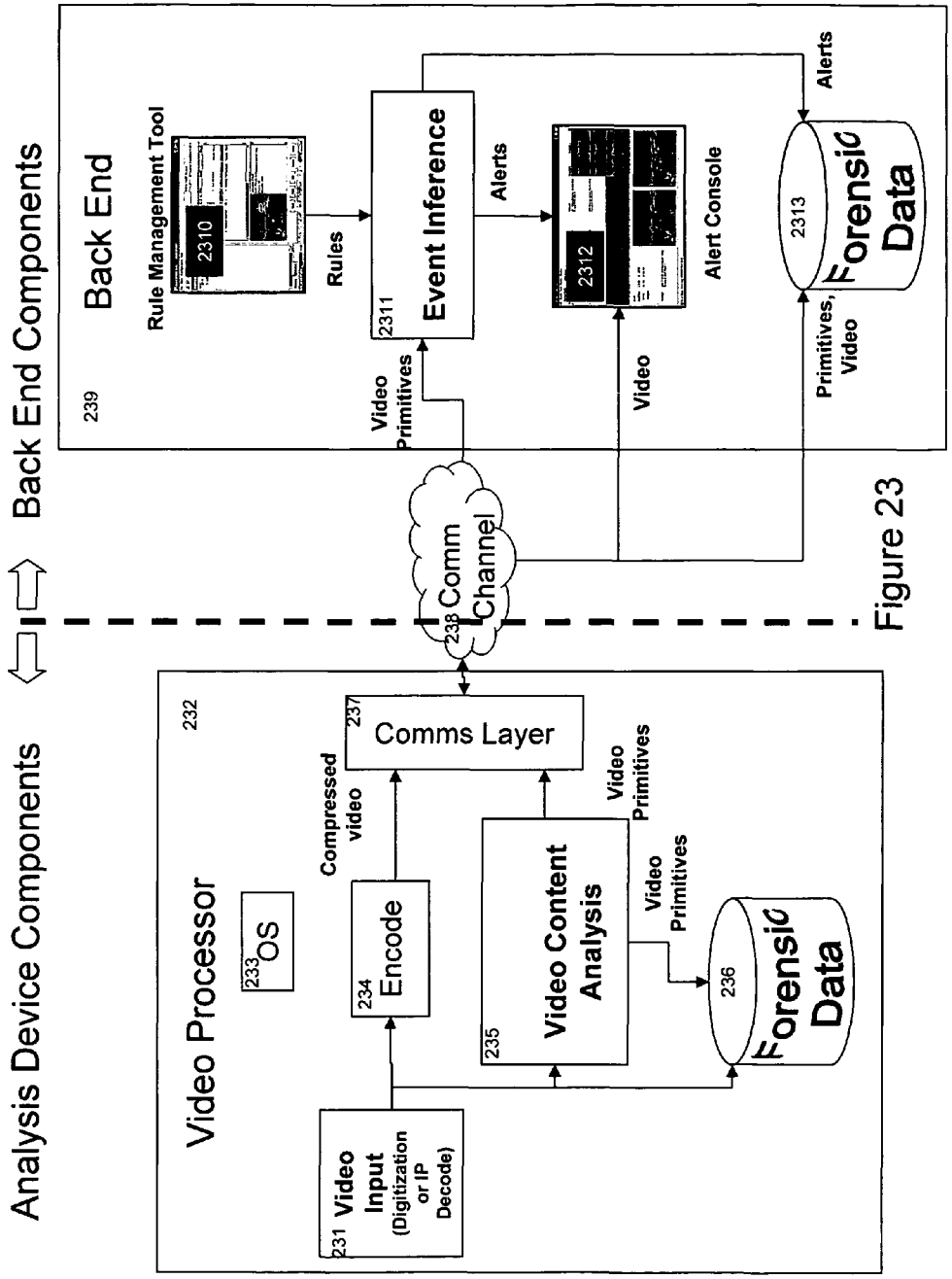
FIG. 23 shows another exemplary configuration of a video surveillance system according to an embodiment of the invention.

FIG. 23 shows another configuration of an implementation of the video surveillance system. Block 231 represents a raw (uncompressed) digital video input. This can be obtained, for example, through analog to digital capture of an analog video signal or decoding of a digital video signal. Block 232 represents a hardware platform housing the analysis component of the video surveillance system (block 235). The hardware platform may contain other components such as an operating system (block 233); a video encoder (block 234) that compresses raw digital video for video streaming or storage using any available compression scheme (JPEG, MJPEG, MPEG1, MPEG2, MPEG4, H.263, H.264, Wavelet, or any other); a storage mechanism (block 236) for maintaining data such as video, compressed video, alerts, and video primitives—this storage device may be, for example, a hard-disk, on-board RAM, on-board FLASH memory, or other storage medium; and a communications layer (block 237) that may, for example, packetize and/or digitize data for transmission over a communication channel (block 238). In the embodiment of the invention shown in FIG. 23, the activity inference component (block 2311) is shown on a separate hardware component (block 239) connected to a network to which communication channel 238 connects.

There may also be other software components residing on computational platforms at other nodes of this network (block 239). Block 2310 shows a rule management tool, which is a user interface for creating video surveillance rules. Block 2312 shows an alert console for displaying alerts and reports to a user. Block 2313 shows a storage device that could be physically located on the same hardware platform (such as a hard disk, floppy disk, other magnetic disk, CD, DVD, other optical disk, MD or other magneto-optical disk, solid state storage device such as RAM or FLASH RAM, or other storage device) or may be a separate storage device (such as external disk drive, PC, laptop, DVR, NVR, or other storage device).

Components on the hardware platform (block 222) may be implemented on any processing platform (general purpose processor, microcontroller, DSP, FPGA, ASIC or any other processing platform) on any video capture, processing, or management device such as a video camera, digital video camera, IP video camera, IP video server, digital video recorder (DVR), network video recorder (NVR), PC, laptop, or other device. Components on the back-end hardware platform (block 239) may be implemented on any processing hardware (general purpose processor, microcontroller, DSP, FPGA, ASIC, or any other device) on any processing device such as PC, laptop, single-board computer, DVR, NVR, video server, network router, hand-held device (such as video phone, pager, or PDA). There are a number of different possible modes of operation for this configuration.

In one mode, the system is programmed on the back-end device (or any other device connected to the back-end device) to look for specific events. The content analysis module (block 235) on the video processing platform (block 232) generates primitives that are transmitted to the back-end processing platform (block 239). The event inference module (block 2311) determines if the rules have been violated and generates alerts that can be displayed on an alert console (block 2312) or stored in a storage device (block 2313) for later analysis.

In another mode, video primitives and video can be stored in a storage device on the back-end platform (2313) for later analysis.

In another mode, stored video quality, bit-rate, frame rate, resolution can be modulated by alerts. When there is an alert, video can be stored at higher quality, bit-rate, frame rate, resolution.

In another mode, video primitives can be stored on the video processing device (block 236 in block 232) for later analysis via the communication channel.

In another mode, the quality of the video stored on the video processing device (in block 236 in block 232) may be modulated by the presence of primitives. When there are primitives (when something is happening) the quality, bit-rate, frame rate, resolution of the stored video can be increased.

In another mode, video can be streamed from the video processor via the encoder (234) to other devices on the network, via communication channel 238.

In another mode, video quality can be modulated by the content analysis module (235). When there are no primitives (nothing is happening), no (or low quality, bit-rate, frame rate, resolution) video is streamed. When there is activity, higher quality, bit-rate, frame rate, resolution video is streamed.

In another mode, streamed video quality, bit-rate, frame rate, resolution can be modulated by the presence of alerts. When the back end event inference module (block 2311) detects an event of interest, it can send a signal or command to the video processing component (block 232) requesting video (or higher quality, bit-rate, frame rate, resolution video). When this request is received, the video compression component (block 234) and communication layer (block 237) can change compression and streaming parameters.

In another mode the quality of video stored on board the video processing device (block 236 in block 232) can be modulated by the presence of alerts. When an alert is generated by the event inference module (block 2311) on the back end processor (block 239) it can send a message via the communication channel (block 238) to the video processor hardware (block 232) to increase the quality, bit-rate, frame rate, resolution of the video stored in the on board storage device (238).

Figure 24:
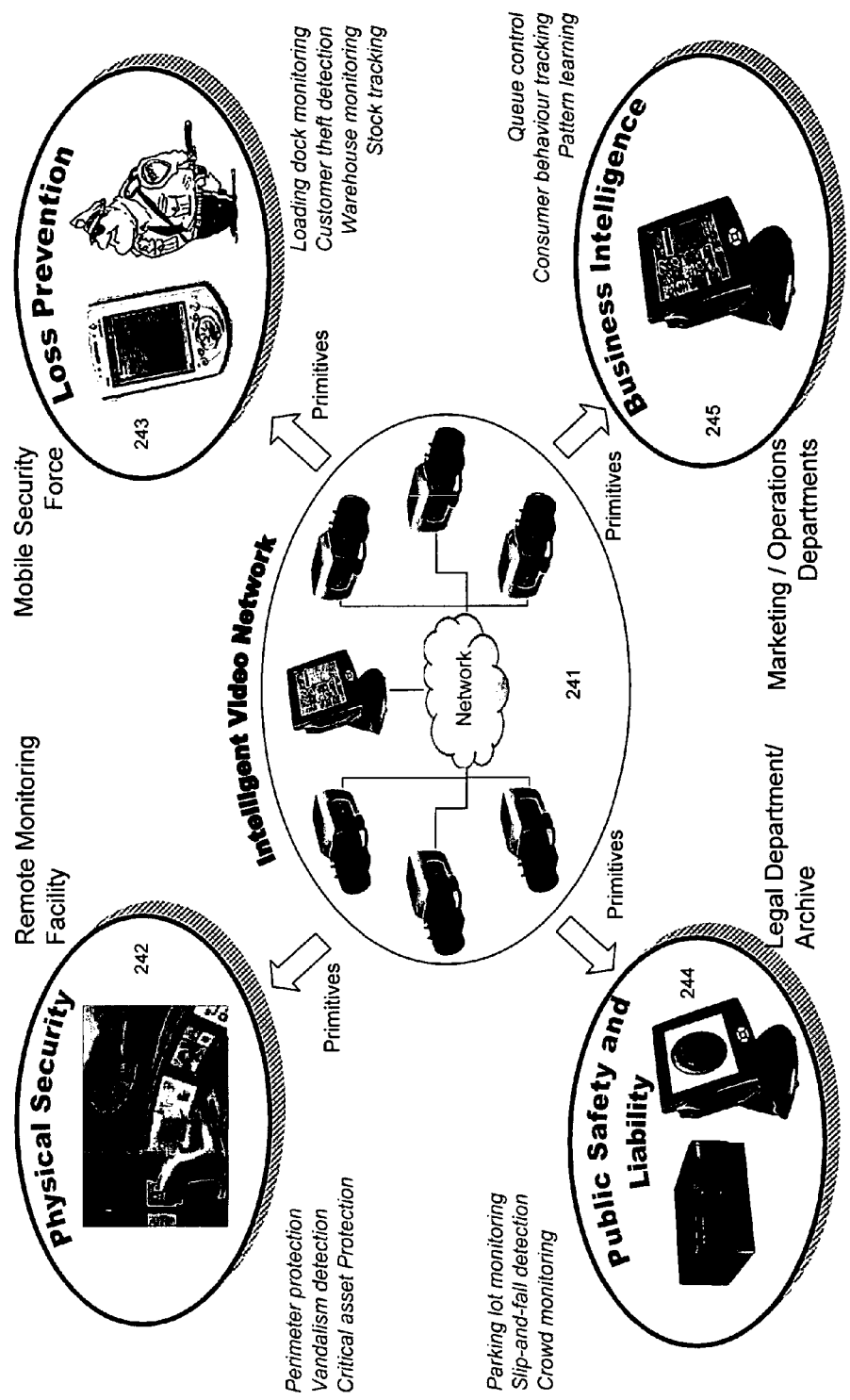
FIG. 24 shows another exemplary configuration of a video surveillance system according to an embodiment of the invention.

FIG. 24 shows an extension of the configuration described in FIG. 23. By separating the functionality of video content analysis and back end activity inference, it is possible to enable a multi-purpose intelligent video surveillance system through the process of late application binding. A single network of intelligence-enabled cameras can broadcast a single stream of video primitives to separate back-end applications in different parts of an organization (at different physical locations) and achieve multiple functions. This is possible because the primitive stream contains information about everything going on in the scene and is not tied to specific application areas. The example depicted in FIG. 24 pertains to a retail environment but is illustrative of the principal in general and is applicable to any other application areas and any other surveillance functionality. Block 241 shows an intelligence-enabled network of one or more video cameras within a facility or across multiple facilities. The content analysis component or components may reside on a processing device inside the cameras, in video servers, in network routers, on DVRs, on NVRs, on PCs, on laptops or any other video processing device connected to the network. From these content analysis components, streams of primitives are broadcast via standard networks to activity inference modules on back end processors (blocks 242-245) residing in physically different areas used for different purposes. The back end processors may be in computers, laptops, DVRs, NVRs, network routers, handheld devices (phones, pagers, PDAs) or other computing devices. One advantage to this decentralization is that there need not be a central processing application that must be programmed to do all the processing for all possible applications. Another advantage is security so that one part of an organization can perform activity inference on rules that are stored locally so that no one else in the network has access to that information.

In block 242 the primitive stream from the intelligent camera network is analyzed for physical security applications: to determine if there has been a perimeter breach, vandalism, and to protect critical assets. Of course, these applications are merely exemplary, and any other application is possible.

In block 243 the primitive stream from the intelligent camera network is analyzed for loss prevention applications: to monitor a loading dock; to watch for customer or employee theft, to monitor a warehouse, and to track stock. Of course, these applications are merely exemplary, and any other application is possible.

In block 244 the primitive stream from the intelligent camera network is analyzed for public safety and liability applications: to monitor for people or vehicle moving too fast in parking lots, to watch for people slipping and falling, and to monitor crowds in and around the facility. Of course, these applications are merely exemplary, and any other application is possible.

In block 245 the primitive stream from the intelligent camera network is analyzed for business intelligence applications: to watch the lengths of queues, to track consumer behavior, to learn patterns of behavior, to perform building management tasks such as controlling lighting and heating when there are no people present. Of course, these applications are merely exemplary, and any other application is possible.

Figure 25:
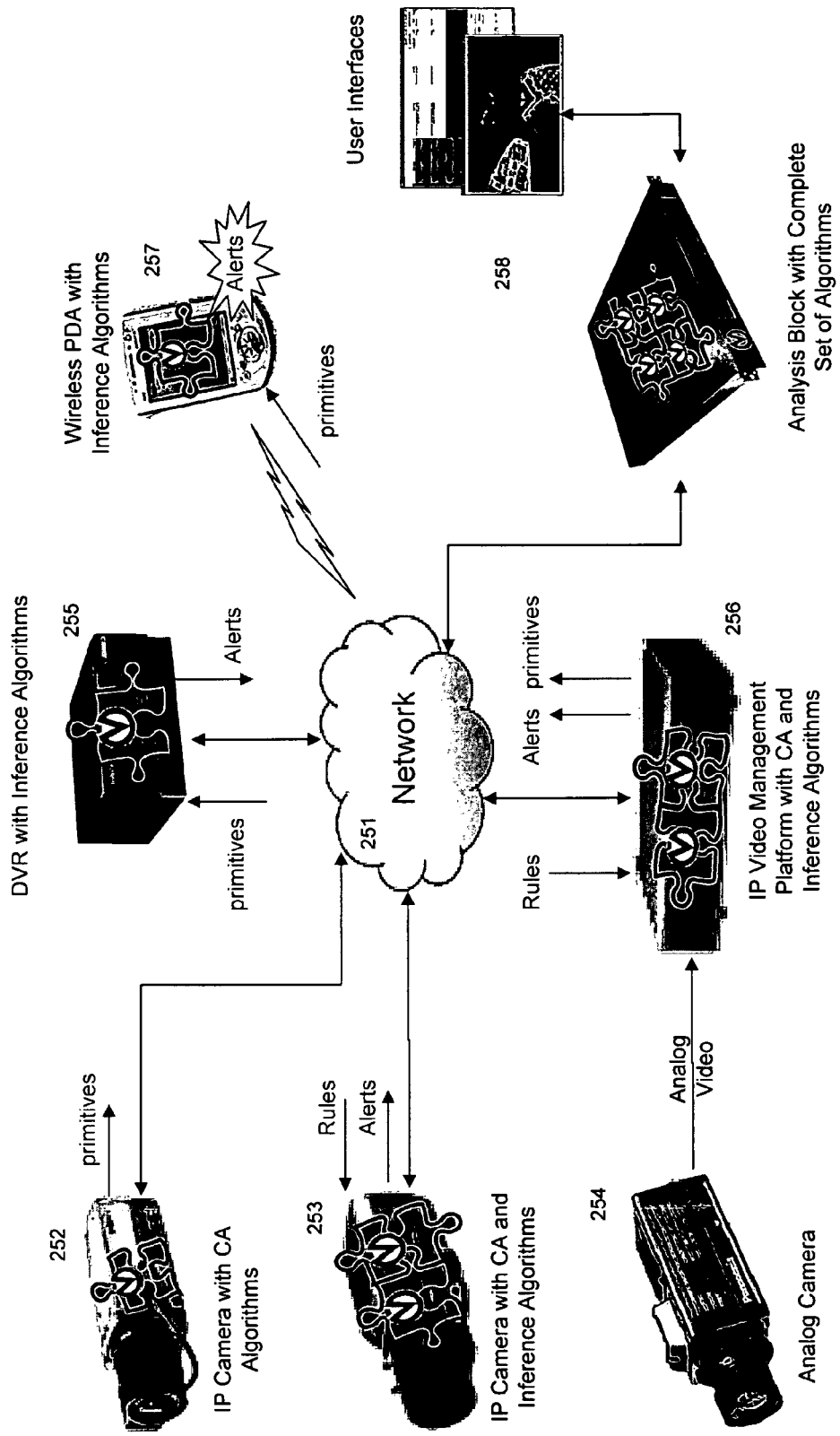
FIG. 25 shows a network that may be used in exemplary configurations of embodiments of the invention.

FIG. 25 shows a network (block 251) with a number of potential intelligence-enabled devices connected to it. Block 252 is an IP camera with content analysis components on board that can stream primitives over a network. Block 253 is an IP camera with both content analysis and activity inference components on board that can be programmed directly with rules and will generate network alerts directly. Block 254 is a standard analog camera with no intelligent components on board; but it is connected to an IP video management platform (block 256) that performs video digitization and compression as well as content analysis and activity inference. It can be programmed with view-specific rules and is capable of transmitting primitive streams and alerts via a network. Block 255 is a DVR with activity inference components that is capable of ingesting primitive streams from other devices and generating alerts. Block 257 is a handheld PDA enabled with wireless network communications that has activity inference algorithms on board and is capable of accepting video primitives from the network and displaying alerts. Block 258 is complete intelligent video analysis system capable of accepting analog or digital video streams, performing content analysis and activity inference and displaying alerts on a series of alert consoles.

Figure 26:
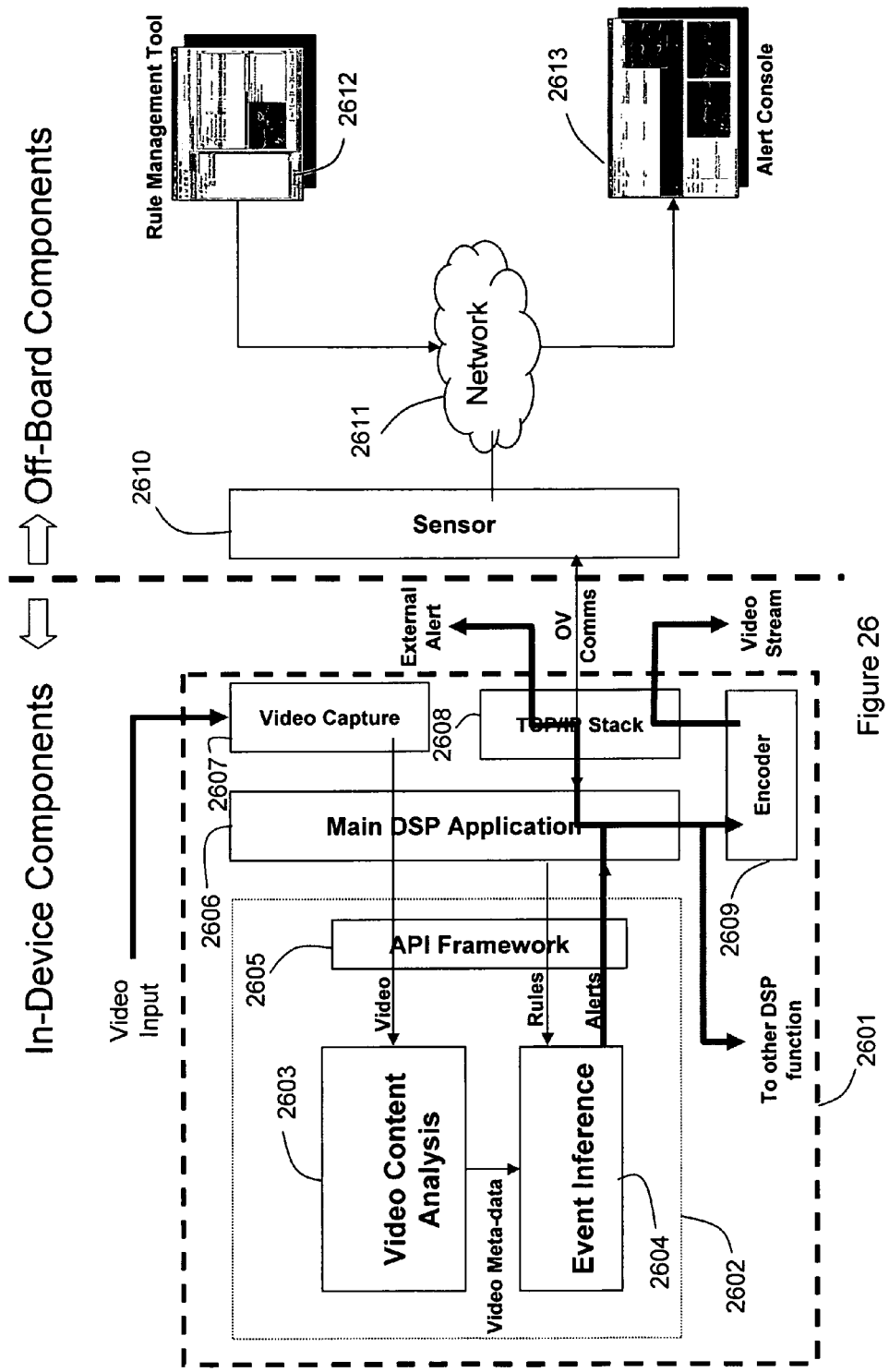
FIG. 26 shows an exemplary configuration of a video surveillance system according to an embodiment of the invention.

FIG. 26 shows another configuration of an implementation of the video surveillance system. Block 2601 represents a hardware platform that may house the main components of the video surveillance system, as well as additional processing and interfacing components. Block 2602 represents a hardware sub-platform housing the main components of the video surveillance system (video content analysis—block 2603—and activity inference—block 2604), and may also include an application programming interface (API), block 2605, for interfacing with these components. Raw (uncompressed) digital video input may be obtained, for example, through analog to digital capture of an analog video signal or decoding of a digital video signal, at block 2607. The hardware platform 2601 may contain other components such as one or more main digital signal processing (DSP) applications (block 2606); a video encoder (block 2609) that may be used to compress raw digital video for video streaming or storage using any available compression scheme (JPEG, MJPEG, MPEG1, MPEG2, MPEG4, H.263, H.264, Wavelet, or any other); a storage mechanism (not shown) for maintaining data such as video, compressed video, alerts, and video primitives—this storage device may be, for example, a hard-disk, on-board RAM, on-board FLASH memory, or other storage medium; and a communications layer, shown in FIG. 26 as TCP/IP stack 2608, which may, for example, packetize and/or digitize data for transmission over a communication channel.

Hardware platform 2601 may be connected to a sensor 2610. Sensor 2610 may be implemented in hardware, firmware, software, or combinations thereof. Sensor 2610 may serve as an interface between hardware platform 2601 and network 2611. Sensor 2610 may include a server layer, or a server layer may be implemented elsewhere, for example, between sensor 2610 and network 2611 or as part of network 2611.

There may be other software components residing on computational platforms at other nodes of network 2611. Block 2612 shows a rule management tool, which, again, is a user interface for creating video surveillance rules. Block 2613 shows an alert console for displaying alerts and reports to a user.

Components on the hardware platform (block 2601) may be implemented on any processing hardware (general purpose processor, microcontroller, DSP, ASIC, FPGA, or other processing device) on any video capture, processing, or management device such as a video camera, digital video camera, IP video camera, IP video server, digital video recorder (DVR), network video recorder (NVR), PC, laptop, or other device. There are a number of different possible modes of operation for this configuration, as discussed above.

In the configuration of FIG. 26, alerts may be handled at the DSP level, and API framework 2605 may include alert API support. This may support use of alerts for various command and control functions within the device.

For example, in some embodiments of the invention, main DSP application 2606 may take an alert and send it to another algorithm running on hardware platform 2601. This may, for example, be a facial recognition algorithm to be executed upon a person-based rule being triggered. In such a case, the handoff may be made if the alert contains an object field that indicates that the object type is a person.

Another example that may implemented in some embodiments of the invention is to use the alert to control video compression and/or streaming. This may, for example, be simple on/off control, control of resolution, etc.; however, the invention is not necessarily limited to these examples. Such control may, for example, be based upon presence of an alert and/or on details of an alert.

In general, alerts may be used for a variety of command and control functions, which may further include, but are not limited to, controlling image enhancement software, controlling pan-tilt-zoom (PTZ) functionality, and controlling other sensors.

Figure 27:
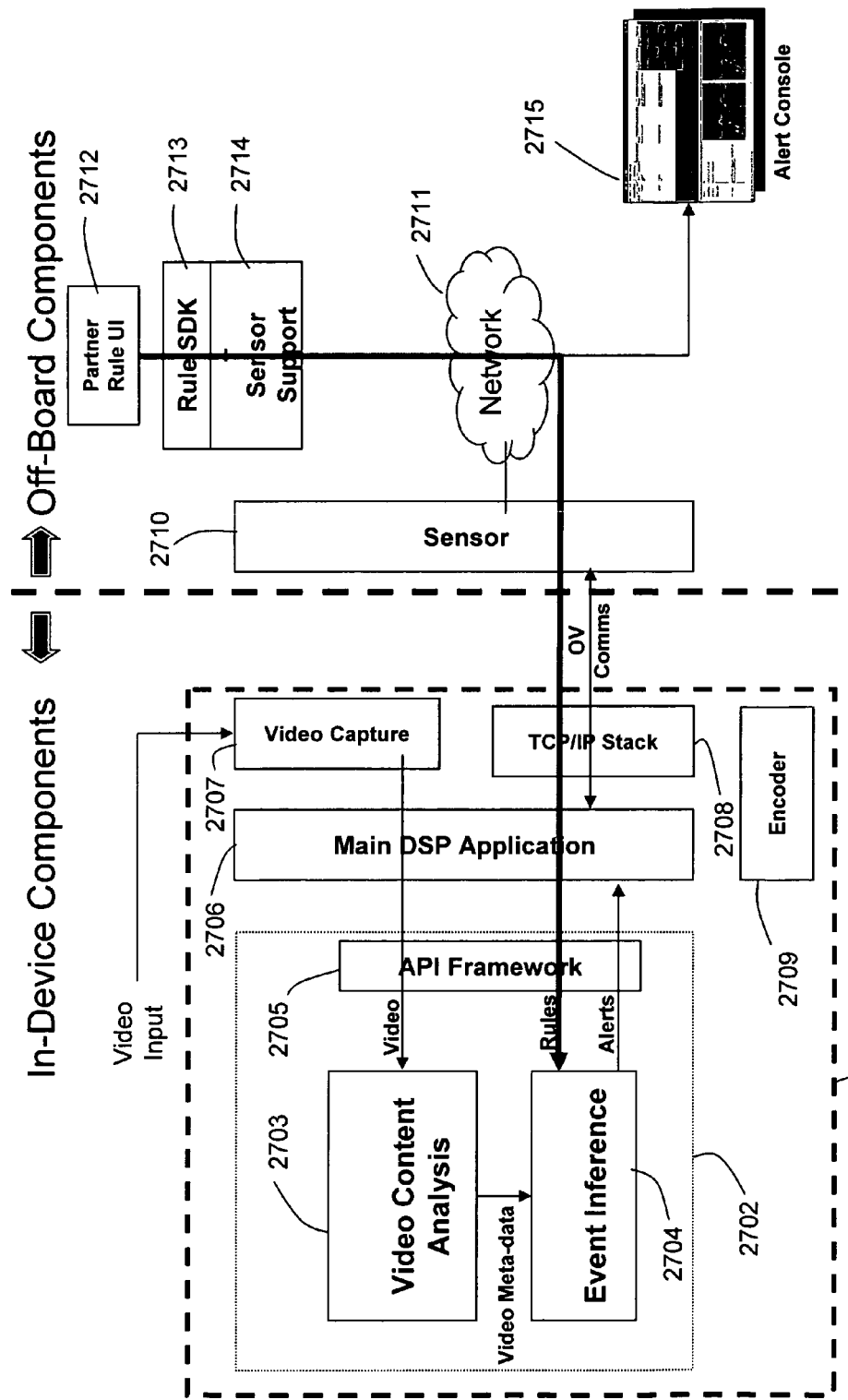
FIG. 27 shows an exemplary configuration of a video surveillance system according to an embodiment of the invention.

FIG. 27 shows yet another configuration of an implementation of the video surveillance system. Block 2701 represents a hardware platform that may house the main components of the video surveillance system, as well as additional processing and interfacing components. Block 2702 represents a hardware sub-platform housing the main components of the video surveillance system (video content analysis—block 2703—and activity inference—block 2704), and may also include an application programming interface (API), block 2705, for interfacing with these components. Raw (uncompressed) digital video input may be obtained, for example, through analog to digital capture of an analog video signal or decoding of a digital video signal, at block 2707. The hardware platform 2701 may contain other components such as one or more main digital signal processing (DSP) applications (block 2706); a video encoder (block 2709) that may be used to compress raw digital video for video streaming or storage using any available compression scheme (JPEG, MJPEG, MPEG1, MPEG2, MPEG4, H.263, H.264, Wavelet, or any other); a storage mechanism (not shown) for maintaining data such as video, compressed video, alerts, and video primitives—this storage device may be, for example, a hard-disk, on-board RAM, on-board FLASH memory, or other storage medium; and a communications layer, shown in FIG. 27 as TCP/IP stack 2708, which may, for example, packetize and/or digitize data for transmission over a communication channel.

Hardware platform 2701 may be connected to a sensor 2710. Sensor 2710 may be implemented in hardware, firmware, software, or combinations thereof. Sensor 2710 may serve as an interface between hardware platform 2701 and network 2711. Sensor 2710 may include a server layer, or a server layer may be implemented elsewhere, for example, between sensor 2610 and network 2711 or as part of network 2711.

As before, there may be other software components residing on computational platforms at other nodes of network 2711. Block 2715 shows an alert console for displaying alerts and reports to a user. Block 2712 shows a partner rule user interface, coupled to a rule software development kit (SDK) 2713 and appropriate sensor support 2714 for the SDK 2713. Sensor support 2714 may remove dependency on a server (as discussed in the immediately preceding paragraph), which may thus permit standalone SDK capability.

The components 2712-2714 may be used to permit users or manufacturers to create rules for the system, which may be communicated to event inference module 2704, as shown. Components 2712-2714 may be hosted, for example, on a remote device, such as a computer, laptop computer, etc.

Rule SDK 2713 may actually take on at least two different forms. In a first form, rule SDK 2713 may expose to a user fully formed rules, for example, "person crosses tripwire." In such a case, a user may need to create a user interface (UI) on top of such rules.

In a second form, SDK 2713 may expose to a user an underlying rule language and/or primitive definitions. In such a case, the user may be able to create his/her own rule elements. For example, such rule language and primitive definitions may be combined to define object classifications (e.g., "truck" or "animal"), new types of video tripwires (video tripwires are discussed further below), or new types of areas of interest.

Components on the hardware platform (block 2701) may be implemented on any processing hardware (general purpose processor, microcontroller, DSP, ASIC, FPGA, or other processing device) on any video capture, processing, or management device such as a video camera, digital video camera, IP video camera, IP video server, digital video recorder (DVR), network video recorder (NVR), PC, laptop, or other device. There are a number of different possible modes of operation for this configuration, as discussed above.

Figure 28:
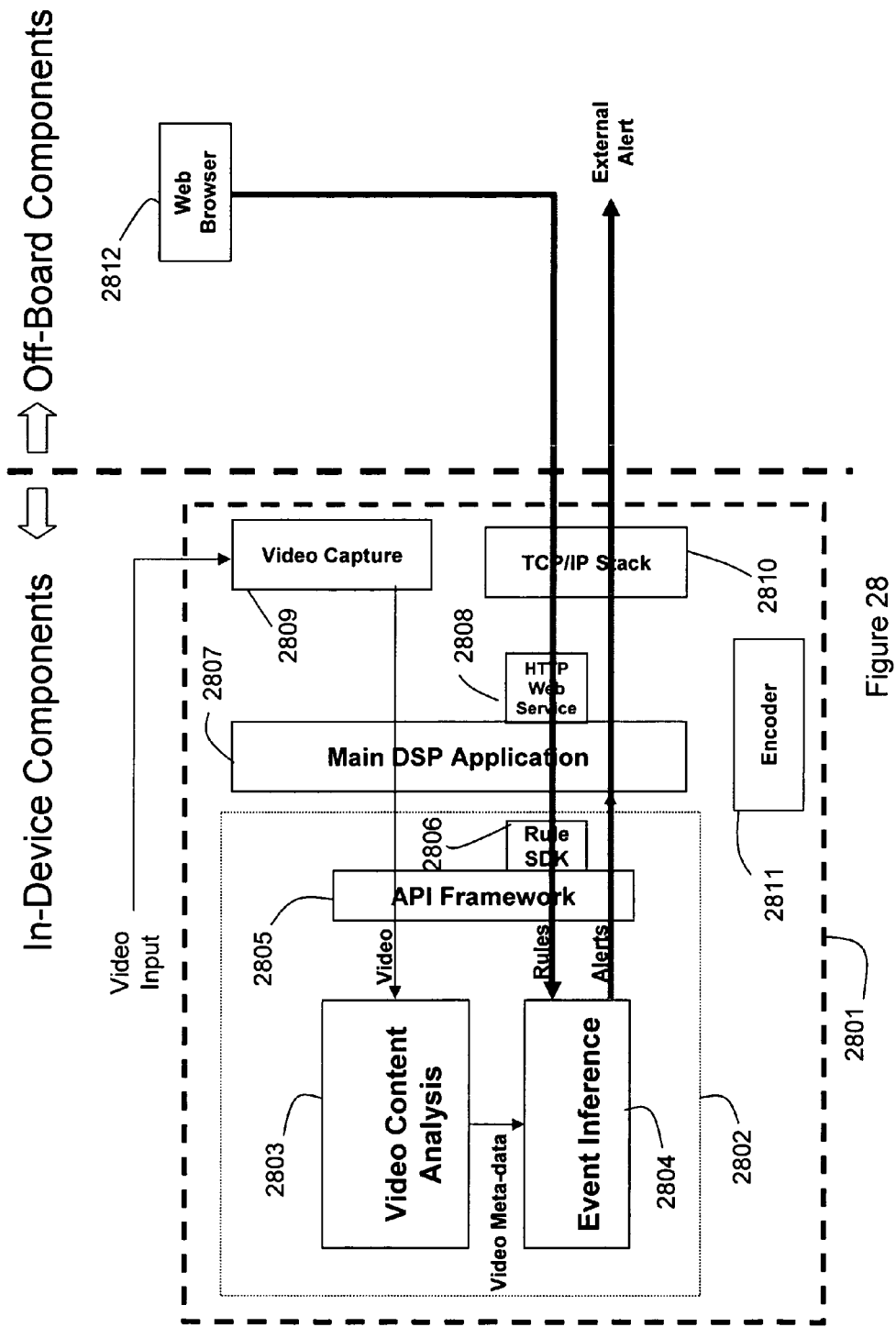
FIG. 28 shows an exemplary configuration of a video surveillance system according to an embodiment of the invention.

FIG. 28 shows still another configuration of an implementation of the video surveillance system. The configuration shown in FIG. 28 may be used to permit the system to interface with a remote device via the Internet. The configuration of FIG. 28 may generally be similar to the previously-discussed configurations, but with some modifications. Block 2801 represents a hardware platform that may house the main components of the video surveillance system, as well as additional processing and interfacing components. Block 2802 represents a hardware sub-platform housing the main components of the video surveillance system (video content analysis—block 2803—and activity inference—block 2804), and may also include an application programming interface (API), block 2805, for interfacing with these components. Block 2802 may further include a rule SDK 2806 to permit creation of new rules for event inference module 2804. Raw (uncompressed) digital video input may be obtained, for example, through analog to digital capture of an analog video signal or decoding of a digital video signal, at block 2809. The hardware platform 2801 may contain other components such as one or more main digital signal processing (DSP) applications (block 2807); a video encoder (block 2811) that may be used to compress raw digital video for video streaming or storage using any available compression scheme (JPEG, MJPEG, MPEG1, MPEG2, MPEG4, H.263, H.264, Wavelet, or any other); a storage mechanism (not shown) for maintaining data such as video, compressed video, alerts, and video primitives—this storage device may be, for example, a hard-disk, on-board RAM, on-board FLASH memory, or other storage medium; and a communications layer, shown in FIG. 28 as TCP/IP stack 2810, which may, for example, packetize and/or digitize data for transmission over a communication channel. In the configuration of FIG. 28, hardware platform 2801 may further include a hypertext transport protocol (HTTP) web service module 2808 that may be used to facilitate communication with an Internet-based device, via TCP/IP stack 2810.

Components on the hardware platform (block 2801) may be implemented on any processing hardware (general purpose processor, microcontroller, DSP, ASIC, FPGA, or other processing device) on any video capture, processing, or management device such as a video camera, digital video camera, IP video camera, IP video server, digital video recorder (DVR), network video recorder (NVR), PC, laptop, or other device. There are a number of different possible modes of operation for this configuration, as discussed above.

As discussed above, the configuration of FIG. 28 is designed to permit interaction of the system with remote devices via the Internet. While such remote devices are not to be thus limited, FIG. 28 shows a web browser 2812, which may be hosted on such a remote device. Via web browser 2812, a user may communicate with the system to create new rules using rule SDK 2806. Alerts may be generated by the system and communicated to one or more external devices (not shown), and this may be done via the Internet and/or via some other communication network or channel.

As another example, the system of the invention provides unique system tasking. Using equipment control directives, current video systems allow a user to position video sensors and, in some sophisticated conventional systems, to mask out regions of interest or disinterest. Equipment control directives are instructions to control the position, orientation, and focus of video cameras. Instead of equipment control directives, the system of the invention uses event discriminators based on video primitives as the primary tasking mechanism. With event discriminators and video primitives, an operator is provided with a much more intuitive approach over conventional systems for extracting useful information from the system. Rather than tasking a system with an equipment control directives, such as "camera A pan 45 degrees to the left," the system of the invention can be tasked in a human-intuitive manner with one or more event discriminators based on video primitives, such as "a person enters restricted area A."

Using the invention for market research, the following are examples of the type of video surveillance that can be performed with the invention: counting people in a store; counting people in a part of a store; counting people who stop in a particular place in a store; measuring how long people spend in a store; measuring how long people spend in a part of a store; and measuring the length of a line in a store.

Using the invention for security, the following are examples of the type of video surveillance that can be performed with the invention: determining when anyone enters a restricted area and storing associated imagery; determining when a person enters an area at unusual times; determining when changes to shelf space and storage space occur that might be unauthorized; determining when passengers aboard an aircraft approach the cockpit; determining when people tailgate through a secure portal; determining if there is an unattended bag in an airport; and determining if there is a theft of an asset.

An exemplary application area may be access control, which may include, for example: detecting if a person climbs over a fence, or enters a prohibited area; detecting if someone moves in the wrong direction (e.g., at an airport, entering a secure area through the exit); determining if a number of objects detected in an area of interest does not match an expected number based on RFID tags or card-swipes for entry, indicating the presence of unauthorized personnel. This may also be useful in a residential application, where the video surveillance system may be able to differentiate between the motion of a person and pet, thus eliminating most false alarms. Note that in many residential applications, privacy may be of concern; for example, a homeowner may not wish to have another person remotely monitoring the home and to be able to see what is in the house and what is happening in the house. Therefore, in some embodiments used in such applications, the video processing may be performed locally, and optional video or snapshots may be sent to one or more remote monitoring stations only when necessary (for example, but not limited to, detection of criminal activity or other dangerous situations).

Another exemplary application area may be asset monitoring. This may mean detecting if an object is taken away from the scene, for example, if an artifact is removed from a museum. In a retail environment asset monitoring can have several aspects to it and may include, for example: detecting if a single person takes a suspiciously large number of a given item; determining if a person exits through the entrance, particularly if doing this while pushing a shopping cart; determining if a person applies a non-matching price tag to an item, for example, filling a bag with the most expensive type of coffee but using a price tag for a less expensive type; or detecting if a person leaves a loading dock with large boxes.

Another exemplary application area may be for safety purposes. This may include, for example: detecting if a person slips and falls, e.g., in a store or in a parking lot; detecting if a car is driving too fast in a parking lot; detecting if a person is too close to the edge of the platform at a train or subway station while there is no train at the station; detecting if a person is on the rails; detecting if a person is caught in the door of a train when it starts moving; or counting the number of people entering and leaving a facility, thus keeping a precise headcount, which can be very important in case of an emergency.

Another exemplary application area may be traffic monitoring. This may include detecting if a vehicle stopped, especially in places like a bridge or a tunnel, or detecting if a vehicle parks in a no parking area.

Another exemplary application area may be terrorism prevention. This may include, in addition to some of the previously-mentioned applications, detecting if an object is left behind in an airport concourse, if an object is thrown over a fence, or if an object is left at a rail track; detecting a person loitering or a vehicle circling around critical infrastructure; or detecting a fast-moving boat approaching a ship in a port or in open waters.

Another exemplary application area may be in care for the sick and elderly, even in the home. This may include, for example, detecting if the person falls; or detecting unusual behavior, like the person not entering the kitchen for an extended period of time.

FIG. 1 illustrates a plan view of the video surveillance system of the invention. A computer system 11 comprises a computer 12 having a computer-readable medium 13 embodying software to operate the computer 12 according to the invention. The computer system 11 is coupled to one or more video sensors 14, one or more video recorders 15, and one or more input/output (I/O) devices 16. The video sensors 14 can also be optionally coupled to the video recorders 15 for direct recording of video surveillance data. The computer system is optionally coupled to other sensors 17.

The video sensors 14 provide source video to the computer system 11. Each video sensor 14 can be coupled to the computer system 11 using, for example, a direct connection (e.g., a firewire digital camera interface) or a network. The video sensors 14 can exist prior to installation of the invention or can be installed as part of the invention. Examples of a video sensor 14 include: a video camera; a digital video camera; a color camera; a monochrome camera; a camera; a camcorder, a PC camera; a webcam; an infra-red video camera; and a CCTV camera.

The video recorders 15 receive video surveillance data from the computer system 11 for recording and/or provide source video to the computer system 11. Each video recorder 15 can be coupled to the computer system 11 using, for example, a direct connection or a network. The video recorders 15 can exist prior to installation of the invention or can be installed as part of the invention. The video surveillance system in the computer system 11 may control when and with what quality setting a video recorder 15 records video. Examples of a video recorder 15 include: a video tape recorder; a digital video recorder; a network video recorder; a video disk; a DVD; and a computer-readable medium. The system may also modulate the bandwidth and quality of video streamed over a network by controlling a video encoder and streaming protocol. When activities of interest are detected, higher bit-rate, frame-rate, or resolution imagery may be encoded and streamed.

The I/O devices 16 provide input to and receive output from the computer system 11. The I/O devices 16 can be used to task the computer system 11 and produce reports from the computer system 11. Examples of I/O devices 16 include: a keyboard; a mouse; a stylus; a monitor; a printer; another computer system; a network; and an alarm.

The other sensors 17 provide additional input to the computer system 11. Each other sensor 17 can be coupled to the computer system 11 using, for example, a direct connection or a network. The other sensors 17 can exit prior to installation of the invention or can be installed as part of the invention. Examples of another sensor 17 include, but are not limited to: a motion sensor; an optical tripwire; a biometric sensor; an RFID sensor; and a card-based or keypad-based authorization system. The outputs of the other sensors 17 can be recorded by the computer system 11, recording devices, and/or recording systems.

Figure 2:
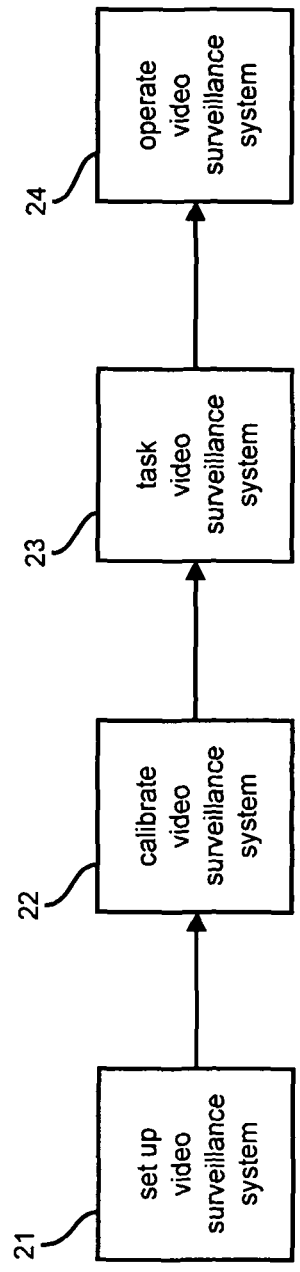
FIG. 2 illustrates a flow diagram for the video surveillance system of the invention.

FIG. 2 illustrates a flow diagram for the video surveillance system of the invention. Various aspects of the invention are exemplified with reference to FIGS. 10-15, which illustrate examples of the video surveillance system of the invention applied to monitoring a grocery store.

In block 21, the video surveillance system is set up as discussed for FIG. 1. Each video sensor 14 is orientated to a location for video surveillance. The computer system 11 is connected to the video feeds from the video equipment 14 and 15. The video surveillance system can be implemented using existing equipment or newly installed equipment for the location.

In block 22, the video surveillance system is calibrated. Once the video surveillance system is in place from block 21, calibration occurs. The result of block 22 is the ability of the video surveillance system to determine an approximate absolute size and speed of a particular object (e.g., a person) at various places in the video image provided by the video sensor. The system can be calibrated using manual calibration, semi-automatic calibration, and automatic calibration. Calibration is further described after the discussion of block 24.

In block 23 of FIG. 2, the video surveillance system is tasked. Tasking occurs after calibration in block 22 and is optional. Tasking the video surveillance system involves specifying one or more event discriminators. Without tasking, the video surveillance system operates by detecting and archiving video primitives and associated video imagery without taking any action, as in block 45 in FIG. 4.

FIG. 3 illustrates a flow diagram for tasking the video surveillance system to determine event discriminators. An event discriminator refers to one or more objects optionally interacting with one or more spatial attributes and/or one or more temporal attributes. An event discriminator is described in terms of video primitives (also called activity description meta-data). Some of the video primitive design criteria include the following: capability of being extracted from the video stream in real-time; inclusion of all relevant information from the video; and conciseness of representation.

Real-time extraction of the video primitives from the video stream is desirable to enable the system to be capable of generating real-time alerts, and to do so, since the video provides a continuous input stream, the system cannot fall behind.

The video primitives should also contain all relevant information from the video, since at the time of extracting the video primitives, the user-defined rules are not known to the system. Therefore, the video primitives should contain information to be able to detect any event specified by the user, without the need for going back to the video and reanalyzing it.

A concise representation is also desirable for multiple reasons. One goal of the proposed invention may be to extend the storage recycle time of a surveillance system. This may be achieved by replacing storing good quality video all the time by storing activity description meta-data and video with quality dependent on the presence of activity, as discussed above. Hence, the more concise the video primitives are, the more data can be stored. In addition, the more concise the video primitive representation, the faster the data access becomes, and this, in turn may speed up forensic searching.

The exact contents of the video primitives may depend on the application and potential events of interest. Some exemplary embodiments are described below An exemplary embodiment of the video primitives may include scene/video descriptors, describing the overall scene and video. In general, this may include a detailed description of the appearance of the scene, e.g., the location of sky, foliage, man-made objects, water, etc; and/or meteorological conditions, e.g., the presence/absence of precipitation, fog, etc. For a video surveillance application, for example, a change in the overall view may be important. Exemplary descriptors may describe sudden lighting changes; they may indicate camera motion, especially the facts that the camera started or stopped moving, and in the latter case, whether it returned to its previous view or at least to a previously known view; they may indicate changes in the quality of the video feed, e.g., if it suddenly became noisier or went dark, potentially indicating tampering with the feed; or they may show a changing waterline along a body of water (for further information on specific approaches to this latter problem, one may consult, for example, co-pending U.S. patent application Ser. No. 10/954,479, filed on Oct. 1, 2004, and incorporated herein by reference).

Another exemplary embodiment of the video primitives may include object descriptors referring to an observable attribute of an object viewed in a video feed. What information is stored about an object may depend on the application area and the available processing capabilities. Exemplary object descriptors may include generic properties including, but not limited to, size, shape, perimeter, position, trajectory, speed and direction of motion, motion salience and its features, color, rigidity, texture, and/or classification. The object descriptor may also contain some more application and type specific information: for humans, this may include the presence and ratio of skin tone, gender and race information, some human body model describing the human shape and pose; or for vehicles, it may include type (e.g., truck, SUV, sedan, bike, etc.), make, model, license plate number. The object descriptor may also contain activities, including, but not limited to, carrying an object, running, walking, standing up, or raising arms. Some activities, such as talking, fighting or colliding, may also refer to other objects. The object descriptor may also contain identification information, including, but not limited to, face or gait.

Another exemplary embodiment of the video primitives may include flow descriptors describing the direction of motion of every area of the video. Such descriptors may, for example, be used to detect passback events, by detecting any motion in a prohibited direction (for further information on specific approaches to this latter problem, one may consult, for example, co-pending U.S. patent application Ser. No. 10/766,949, filed on Jan. 30, 2004, and incorporated herein by reference).

Primitives may also come from non-video sources, such as audio sensors, heat sensors, pressure sensors, card readers, RFID tags, biometric sensors, etc.

A classification refers to an identification of an object as belonging to a particular category or class. Examples of a classification include: a person; a dog; a vehicle; a police car; an individual person; and a specific type of object.

A size refers to a dimensional attribute of an object. Examples of a size include: large; medium; small; flat; taller than 6 feet; shorter than 1 foot; wider than 3 feet; thinner than 4 feet; about human size; bigger than a human; smaller than a human; about the size of a car; a rectangle in an image with approximate dimensions in pixels; and a number of image pixels.

Position refers to a spatial attribute of an object. The position may be, for example, an image position in pixel coordinates, an absolute real-world position in some world coordinate system, or a position relative to a landmark or another object.

A color refers to a chromatic attribute of an object. Examples of a color include: white; black; grey; red; a range of HSV values; a range of YUV values; a range of RGB values; an average RGB value; an average YUV value; and a histogram of RGB values.

Rigidity refers to a shape consistency attribute of an object. The shape of non-rigid objects (e.g., people or animals) may change from frame to frame, while that of rigid objects (e.g., vehicles or houses) may remain largely unchanged from frame to frame (except, perhaps, for slight changes due to turning).

A texture refers to a pattern attribute of an object. Examples of texture features include: self-similarity; spectral power; linearity; and coarseness.

An internal motion refers to a measure of the rigidity of an object. An example of a fairly rigid object is a car, which does not exhibit a great amount of internal motion. An example of a fairly non-rigid object is a person having swinging arms and legs, which exhibits a great amount of internal motion.

A motion refers to any motion that can be automatically detected. Examples of a motion include: appearance of an object; disappearance of an object; a vertical movement of an object; a horizontal movement of an object; and a periodic movement of an object.

A salient motion refers to any motion that can be automatically detected and can be tracked for some period of time. Such a moving object exhibits apparently purposeful motion. Examples of a salient motion include: moving from one place to another; and moving to interact with another object.

A feature of a salient motion refers to a property of a salient motion. Examples of a feature of a salient motion include: a trajectory; a length of a trajectory in image space; an approximate length of a trajectory in a three-dimensional representation of the environment; a position of an object in image space as a function of time; an approximate position of an object in a three-dimensional representation of the environment as a function of time; a duration of a trajectory; a velocity (e.g., speed and direction) in image space; an approximate velocity (e.g., speed and direction) in a three-dimensional representation of the environment; a duration of time at a velocity; a change of velocity in image space; an approximate change of velocity in a three-dimensional representation of the environment; a duration of a change of velocity; cessation of motion; and a duration of cessation of motion. A velocity refers to the speed and direction of an object at a particular time. A trajectory refers a set of (position, velocity) pairs for an object for as long as the object can be tracked or for a time period.

A scene change refers to any region of a scene that can be detected as changing over a period of time. Examples of a scene change include: an stationary object leaving a scene; an object entering a scene and becoming stationary; an object changing position in a scene; and an object changing appearance (e.g. color, shape, or size).

A feature of a scene change refers to a property of a scene change. Examples of a feature of a scene change include: a size of a scene change in image space; an approximate size of a scene change in a three-dimensional representation of the environment; a time at which a scene change occurred; a location of a scene change in image space; and an approximate location of a scene change in a three-dimensional representation of the environment.

A pre-defined model refers to an a priori known model of an object. Examples of a pre-defined model may include: an adult; a child; a vehicle; and a semi-trailer.

In block 31, one or more objects types of interests are identified in terms of video primitives or abstractions thereof. Examples of one or more objects include: an object; a person; a red object; two objects; two persons; and a vehicle.

In block 32, one or more spatial areas of interest are identified. An area refers to one or more portions of an image from a source video or a spatial portion of a scene being viewed by a video sensor. An area also includes a combination of areas from various scenes and/or images. An area can be an image-based space (e.g., a line, a rectangle, a polygon, or a circle in a video image) or a three-dimensional space (e.g., a cube, or an area of floor space in a building).

Figure 12:
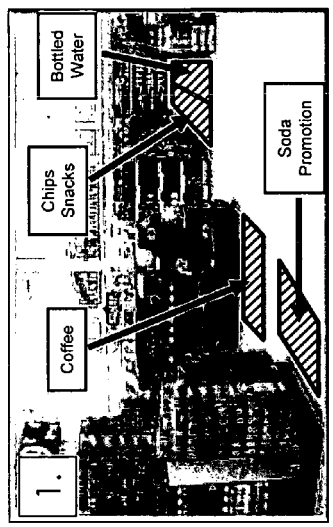

FIG. 12 illustrates identifying areas along an aisle in a grocery store. Four areas are identified: coffee; soda promotion; chips snacks; and bottled water. The areas are identified via a point-and-click interface with the system.

In block 33, one or more temporal attributes of interest are optionally identified. Examples of a temporal attribute include: every 15 minutes; between 9:00 p.m. to 6:30 a.m.; less than 5 minutes; longer than 30 seconds; over the weekend; and within 20 minutes of.

In block 34, a response is optionally identified. Examples of a response includes the following: activating a visual and/or audio alert on a system display; activating a visual and/or audio alarm system at the location; activating a silent alarm; activating a rapid response mechanism; locking a door; contacting a security service; forwarding data (e.g., image data, video data, video primitives; and/or analyzed data) to another computer system via a network, such as the Internet; saving such data to a designated computer-readable medium; activating some other sensor or surveillance system; tasking the computer system 11 and/or another computer system; and directing the computer system 11 and/or another computer system.

In block 35, one or more discriminators are identified by describing interactions between video primitives (or their abstractions), spatial areas of interest, and temporal attributes of interest. An interaction is determined for a combination of one or more objects identified in block 31, one or more spatial areas of interest identified in block 32, and one or more temporal attributes of interest identified in block 33. One or more responses identified in block 34 are optionally associated with each event discriminator.

Figure 16A:
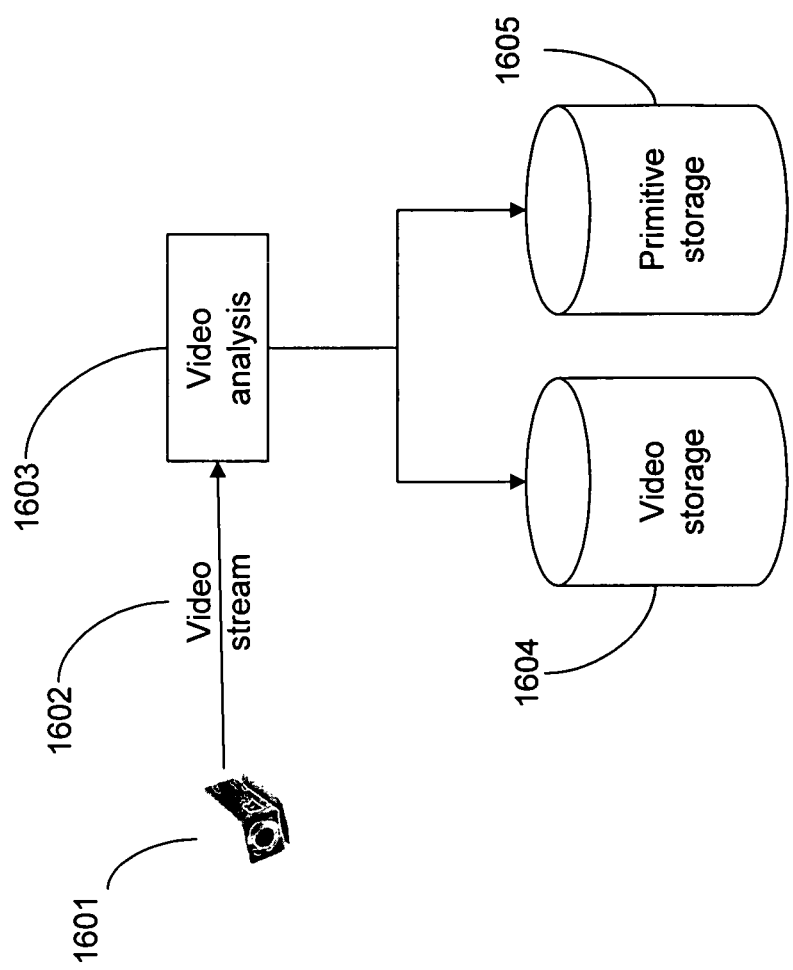
FIG. 16a shows a flow diagram of a video analysis subsystem according to an embodiment of the invention.

FIG. 16a shows an exemplary video analysis portion of a video surveillance system according to an embodiment of the invention. In FIG. 16a, a video sensor (for example, but not limited to, a video camera) 1601 may provide a video stream 1602 to a video analysis subsystem 1603. Video analysis subsystem 1603 may then perform analysis of the video stream 1602 to derive video primitives, which may be stored in primitive storage 1605. Primitive storage 1605 may be used to store non-video primitives, as well. Video analysis subsystem 1603 may further control storage of all or portions of the video stream 1602 in video storage 1604, for example, quality and/or quantity of video, as discussed above.

Figure 16B:
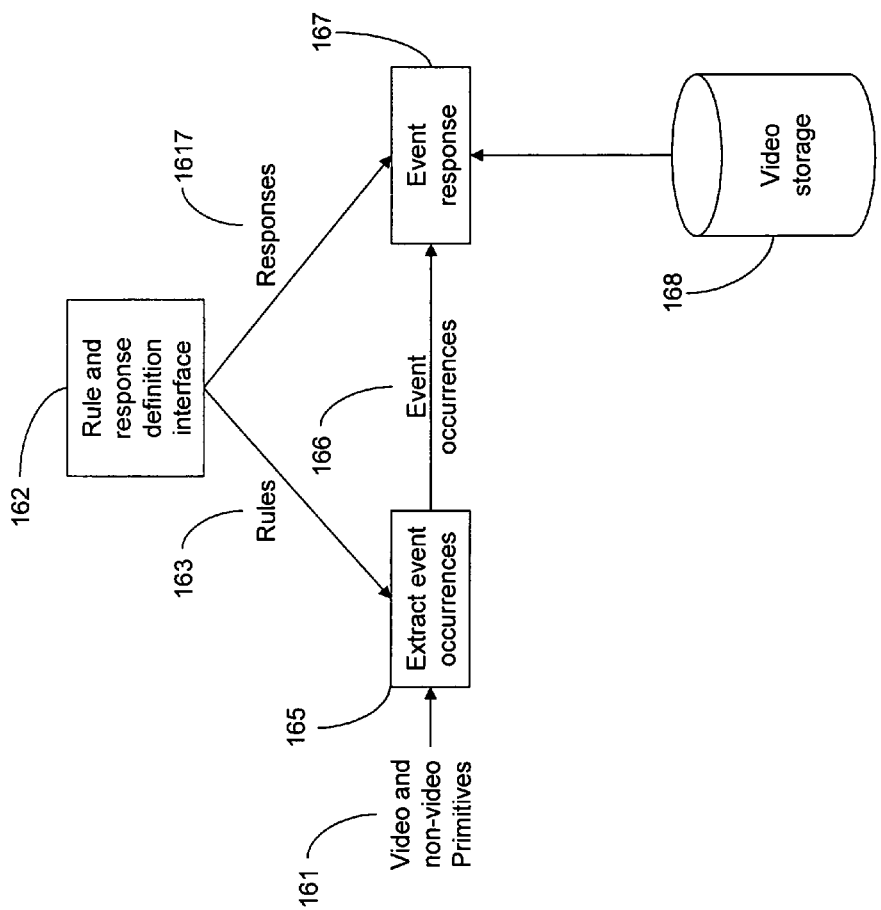
FIG. 16b shows the flow diagram of the event occurrence detection and response subsystem according to an embodiment of the invention.

Referring now to FIG. 16b, once the video, and, if there are other sensors, the non-video primitives 161 are available, the system may detect events. The user tasks the system by defining rules 163 and corresponding responses 164 using the rule and response definition interface 162. The rules are translated into event discriminators, and the system extracts corresponding event occurrences 165. The detected event occurrences 166 trigger user defined responses 167. A response may include a snapshot of a video of the detected event from video storage 168 (which may or may not be the same as video storage 1604 in FIG. 16a). The video storage 168 may be part of the video surveillance system, or it may be a separate recording device 15. Examples of a response may include, but are not necessarily limited to, the following: activating a visual and/or audio alert on a system display; activating a visual and/or audio alarm system at the location; activating a silent alarm; activating a rapid response mechanism; locking a door; contacting a security service; forwarding or streaming data (e.g., image data, video data, video primitives; and/or analyzed data) to another computer system via a network, such as, but not limited to, the Internet; saving such data to a designated computer-readable medium; activating some other sensor or surveillance system; tasking the computer system 11 and/or another computer system; and/or directing the computer system 11 and/or another computer system.

The primitive data can be thought of as data stored in a database. To detect event occurrences in it, an efficient query language is required. Embodiments of the inventive system may include an activity inferencing language, which will be described below.

Traditional relational database querying schemas often follow a Boolean binary tree structure to allow users to create flexible queries on stored data of various types. Leaf nodes are usually of the form "property relationship value," where a property is some key feature of the data (such as time or name); a relationship is usually a numerical operator (">", "<", "=", etc); and a value is a valid state for that property. Branch nodes usually represent unary or binary Boolean logic operators like "and", "or", and "not".

Figures 17A, 17B:
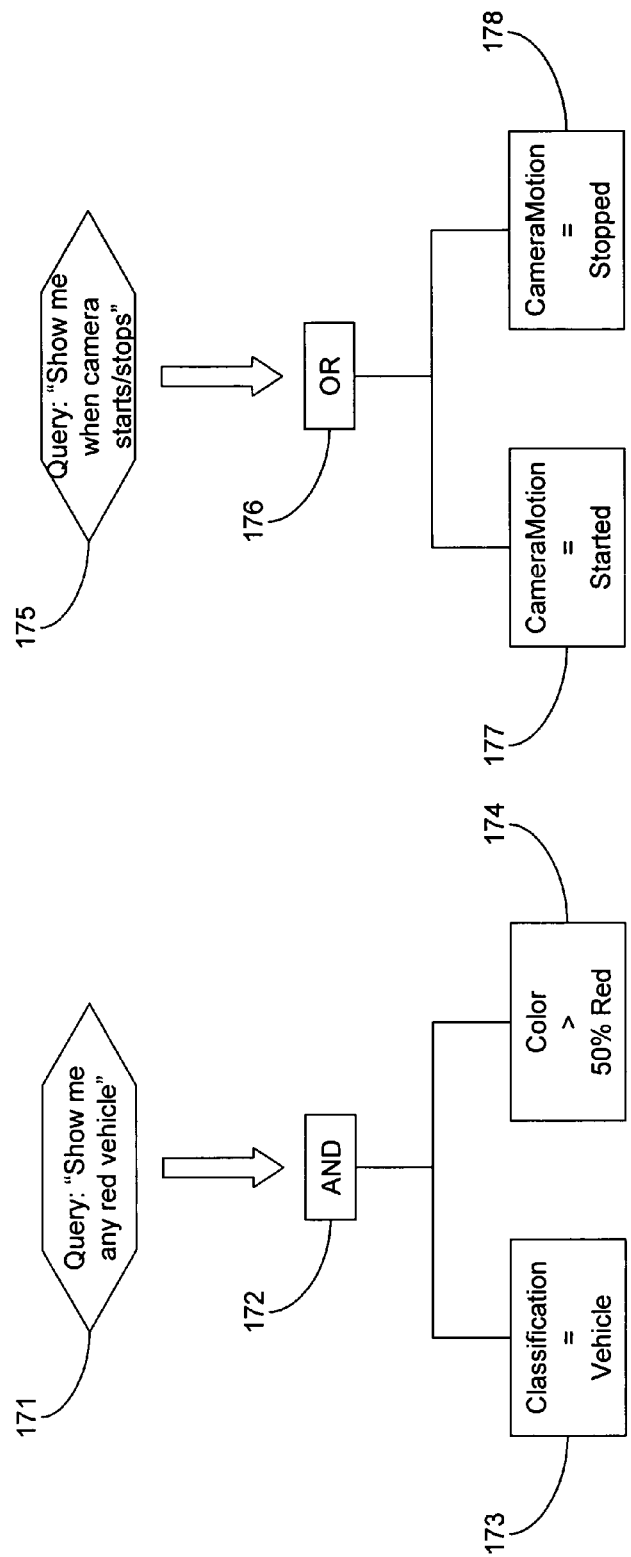
FIG. 17 shows exemplary database queries.

This may form the basis of an activity query formulation schema, as in embodiments of the present invention. In case of a video surveillance application, the properties may be features of the object detected in the video stream, such as size, speed, color, classification (human, vehicle), or the properties may be scene change properties. FIG. 17 gives examples of using such queries. In FIG. 17a, the query, "Show me any red vehicle," 171 is posed. This may be decomposed into two "property relationship value" (or simply "property") queries, testing whether the classification of an object is vehicle 173 and whether its color is predominantly red 174. These two sub-queries can combined with the Boolean operator "and" 172. Similarly, in FIG. 17b, the query, "Show me when a camera starts or stops moving," may be expressed as the Boolean "or" 176 combination of the property sub-queries, "has the camera started moving" 177 and "has the camera stopped moving" 178.

Embodiments of the invention may extend this type of database query schema in two exemplary ways: (1) the basic leaf nodes may be augmented with activity detectors describing spatial activities within a scene; and (2) the Boolean operator branch nodes may be augmented with modifiers specifying spatial, temporal and object interrelationships.

Figure 18C:
FIG. 18 shows three exemplary activity detectors according to various embodiments of the invention: detecting tripwire crossings (FIG. 18a), loitering (FIG. 18b) and theft (FIG. 18c).
Figure 18B:
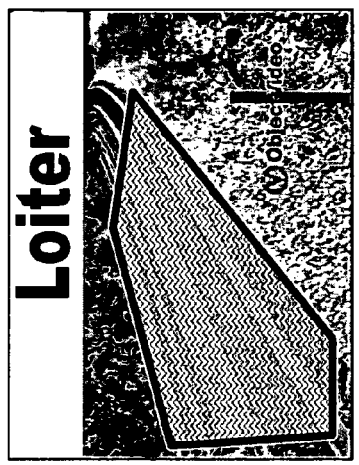
Figure 18A:
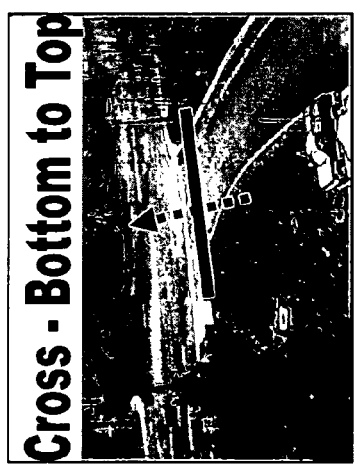

Activity detectors correspond to a behavior related to an area of the video scene. They describe how an object might interact with a location in the scene. FIG. 18 illustrates three exemplary activity detectors. FIG. 18a represents the behavior of crossing a perimeter in a particular direction using a virtual video tripwire (for further information about how such virtual video tripwires may be implemented, one may consult, e.g., U.S. Pat. No. 6,696,945). FIG. 18b represents the behavior of loitering for a period of time on a railway track. FIG. 18c represents the behavior of taking something away from a section of wall (for exemplary approaches to how this may be done, one may consult U.S. patent application Ser. No. 10/331,778, entitled, "Video Scene Background Maintenance—Change Detection & Classification," filed on Jan. 30, 2003). Other exemplary activity detectors may include detecting a person falling, detecting a person changing direction or speed, detecting a person entering an area, or detecting a person going in the wrong direction.

Figure 19:
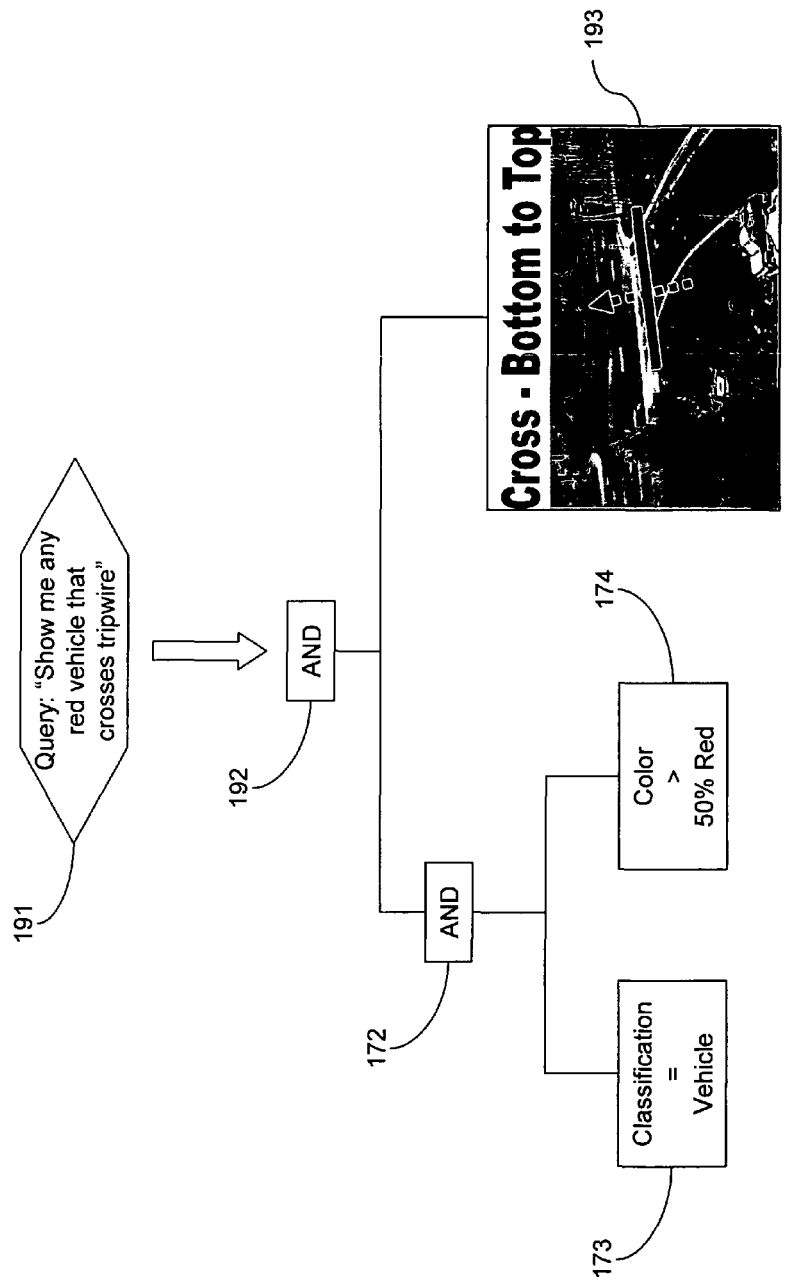
FIG. 19 shows an activity detector query according to an embodiment of the invention.

FIG. 19 illustrates an example of how an activity detector leaf node (here, tripwire crossing) can be combined with simple property queries to detect whether a red vehicle crosses a video tripwire 191. The property queries 172, 173, 174 and the activity detector 193 are combined with a Boolean "and" operator 192.

Combining queries with modified Boolean operators (combinators) may add further flexibility. Exemplary modifiers include spatial, temporal, object, and counter modifiers.

A spatial modifier may cause the Boolean operator to operate only on child activities (i.e., the arguments of the Boolean operator, as shown below a Boolean operator, e.g., in FIG. 19) that are proximate/non-proximate within the scene. For example, "and—within 50 pixels of" may be used to mean that the "and" only applies if the distance between activities is less than 50 pixels.

A temporal modifier may cause the Boolean operator to operate only on child activities that occur within a specified period of time of each other, outside of such a time period, or within a range of times. The time ordering of events may also be specified. For example "and—first within 10 seconds of second" may be used to mean that the "and" only applies if the second child activity occurs not more than 10 seconds after the first child activity.

An object modifier may cause the Boolean operator to operate only on child activities that occur involving the same or different objects. For example "and—involving the same object" may be used to mean that the "and" only applies if the two child activities involve the same specific object.

A counter modifier may cause the Boolean operator to be triggered only if the condition(s) is/are met a prescribed number of times. A counter modifier may generally include a numerical relationship, such as "at least n times," "exactly n times," "at most n times," etc. For example, "or—at least twice" may be used to mean that at least two of the sub-queries of the "or" operator have to be true. Another use of the counter modifier may be to implement a rule like "alert if the same person takes at least five items from a shelf."

Figure 20:
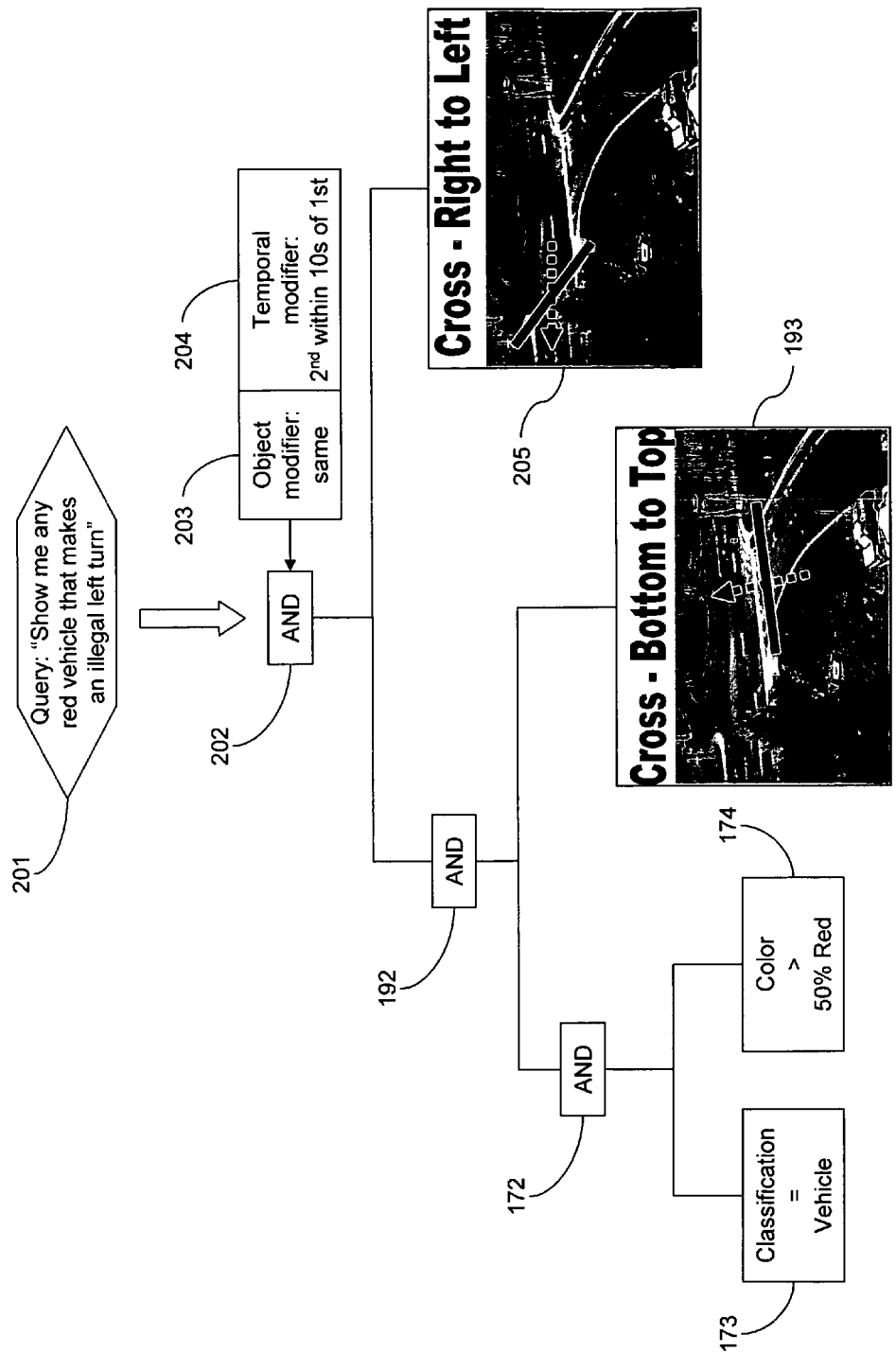
FIG. 20 shows an exemplary query using activity detectors and Boolean operators with modifiers, according to an embodiment of the invention.

FIG. 20 illustrates an example of using combinators. Here, the required activity query is to "find a red vehicle making an illegal left turn" 201. The illegal left turn may be captured through a combination of activity descriptors and modified Boolean operators. One virtual tripwire may be used to detect objects coming out of the side street 193, and another virtual tripwire may be used to detect objects traveling to the left along the road 205. These may be combined by a modified "and" operator 202. The standard Boolean "and" operator guarantees that both activities 193 and 205 have to be detected. The object modifier 203 checks that the same object crossed both tripwires, while the temporal modifier 204 checks that the bottom-to-top tripwire 193 is crossed first, followed by the crossing of the right-to-left tripwire 205 no more than 10 seconds later.

This example also indicates the power of the combinators. Theoretically it is possible to define a separate activity detector for left turn, without relying on simple activity detectors and combinators. However, that detector would be inflexible, making it difficult to accommodate arbitrary turning angles and directions, and it would also be cumbersome to write a separate detector for all potential events. In contrast, using the combinators and simple detectors provides great flexibility.

Other examples of complex activities that can be detected as a combination of simpler ones may include a car parking and a person getting out of the car or multiple people forming a group, tailgating. These combinators can also combine primitives of different types and sources. Examples may include rules such as "show a person inside a room before the lights are turned off;" "show a person entering a door without a preceding card-swipe;" or "show if an area of interest has more objects than expected by an RFID tag reader," i.e., an illegal object without an RFID tag is in the area.

Figure 21A:
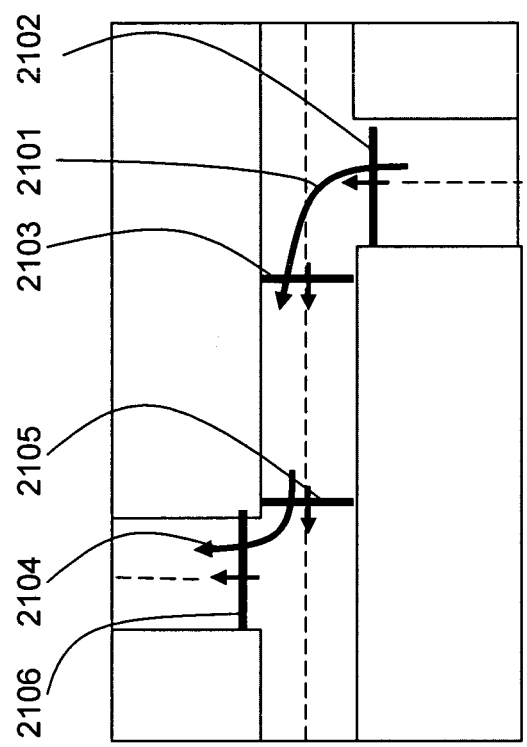
FIGS. 21a and 21b show an exemplary query using multiple levels of combinators, activity detectors, and property queries.
Figure 21B:
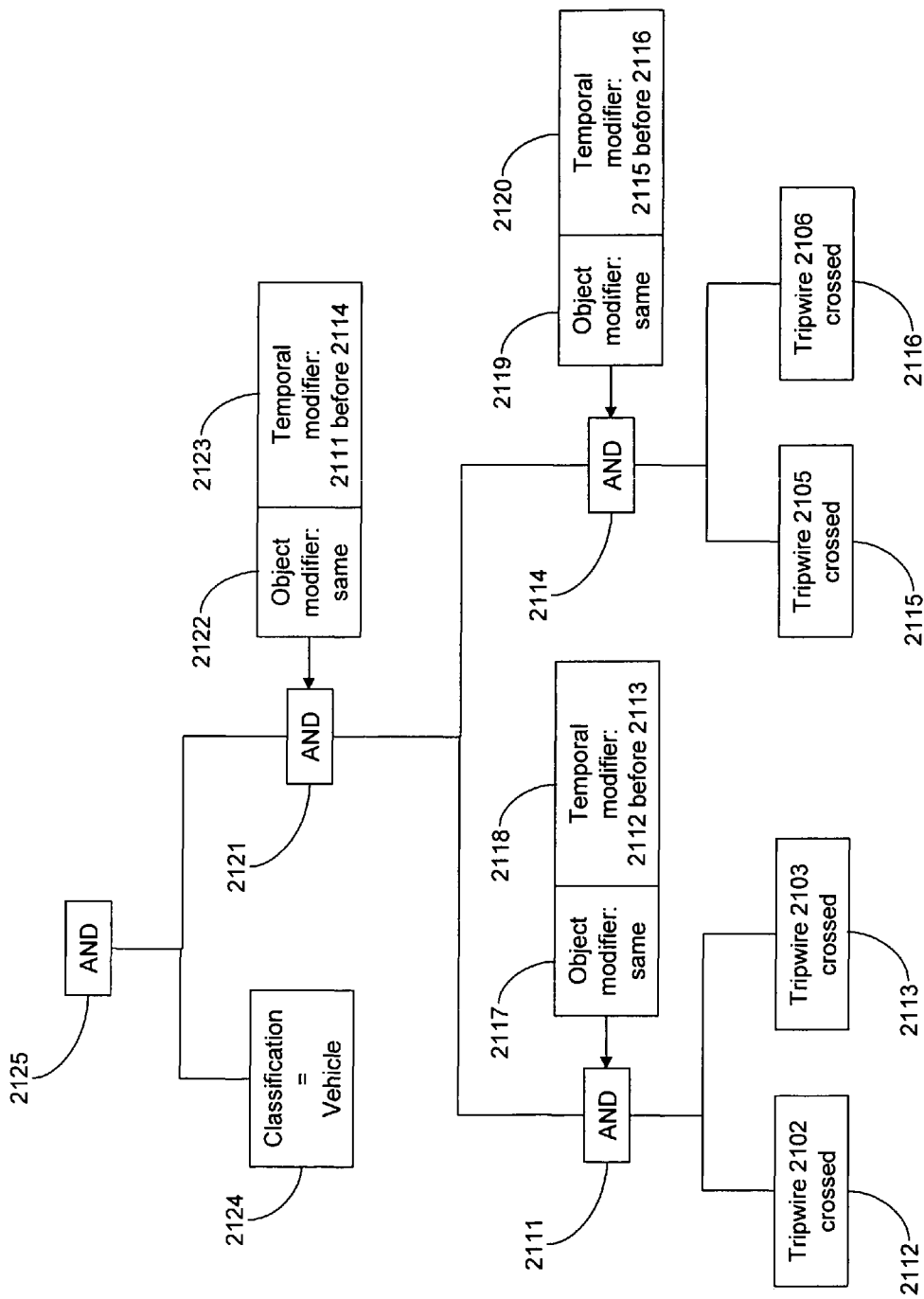

A combinator may combine any number of sub-queries, and it may even combine other combinators, to arbitrary depths. An example, illustrated in FIGS. 21a and 21b, may be a rule to detect if a car turns left 2101 and then turns right 2104. The left turn 2101 may be detected with the directional tripwires 2102 and 2103, while the right turn 2104 with the directional tripwires 2105 and 2106. The left turn may be expressed as the tripwire activity detectors 2112 and 2113, corresponding to tripwires 2102 and 2103, respectively, joined with the "and" combinator 2111 with the object modifier "same" 2117 and temporal modifier "2112 before 2113" 2118. Similarly, the right turn may be expressed as the tripwire activity detectors 2115 and 2116, corresponding to tripwires 2105 and 2106, respectively, joined with the "and" combinator 2114 with the object modifier "same" 2119 and temporal modifier "2115 before 2116" 2120. To detect that the same object turned first left then right, the left turn detector 2111 and the right turn detector 2114 are joined with the "and" combinator 2121 with the object modifier "same" 2122 and temporal modifier "2111 before 2114" 2123. Finally, to ensure that the detected object is a vehicle, a Boolean "and" operator 2125 is used to combine the left-and-right-turn detector 2121 and the property query 2124.

All these detectors may optionally be combined with temporal attributes. Examples of a temporal attribute include: every 15 minutes; between 9:00 pm and 6:30 am; less than 5 minutes; longer than 30 seconds; and over the weekend.

In block 24 of FIG. 2, the video surveillance system is operated. The video surveillance system of the invention operates automatically, detects and archives video primitives of objects in the scene, and detects event occurrences in real time using event discriminators. In addition, action is taken in real time, as appropriate, such as activating alarms, generating reports, and generating output. The reports and output can be displayed and/or stored locally to the system or elsewhere via a network, such as the Internet. FIG. 4 illustrates a flow diagram for operating the video surveillance system.

In block 41, the computer system 11 obtains source video from the video sensors 14 and/or the video recorders 15.

In block 42, video primitives are extracted in real time from the source video. As an option, non-video primitives can be obtained and/or extracted from one or more other sensors 17 and used with the invention. The extraction of video primitives is illustrated with FIG. 5.

Figure 5:
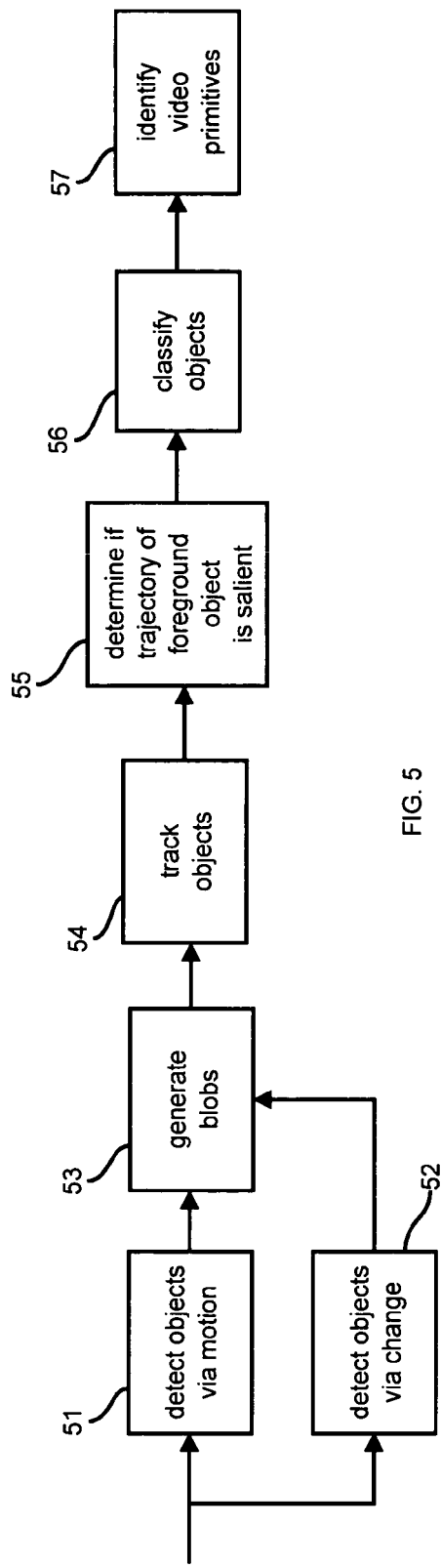
FIG. 5 illustrates a flow diagram for extracting video primitives for the video surveillance system.

FIG. 5 illustrates a flow diagram for extracting video primitives for the video surveillance system. Blocks 51 and 52 operate in parallel and can be performed in any order or concurrently. In block 51, objects are detected via movement. Any motion detection algorithm for detecting movement between frames at the pixel level can be used for this block. As an example, the three frame differencing technique can be used, which is discussed in {1}. The detected objects are forwarded to block 53.

In block 52, objects are detected via change. Any change detection algorithm for detecting changes from a background model can be used for this block. An object is detected in this block if one or more pixels in a frame are deemed to be in the foreground of the frame because the pixels do not conform to a background model of the frame. As an example, a stochastic background modeling technique, such as dynamically adaptive background subtraction, can be used, which is described in {1} and U.S. patent application Ser. No. 09/694,712 filed Oct. 24, 2000. The detected objects are forwarded to block 53.

The motion detection technique of block 51 and the change detection technique of block 52 are complimentary techniques, where each technique advantageously addresses deficiencies in the other technique. As an option, additional and/or alternative detection schemes can be used for the techniques discussed for blocks 51 and 52. Examples of an additional and/or alternative detection scheme include the following: the Pfinder detection scheme for finding people as described in {8}; a skin tone detection scheme; a face detection scheme; and a model-based detection scheme. The results of such additional and/or alternative detection schemes are provided to block 53.

As an option, if the video sensor 14 has motion (e.g., a video camera that sweeps, zooms, and/or translates), an additional block can be inserted before blocks between blocks 51 and 52 to provide input to blocks 51 and 52 for video stabilization. Video stabilization can be achieved by affine or projective global motion compensation. For example, image alignment described in U.S. patent application Ser. No. 09/609,919, filed Jul. 3, 2000, now U.S. Pat. No. 6,738,424, which is incorporated herein by reference, can be used to obtain video stabilization.

In block 53, blobs are generated. In general, a blob is any object in a frame. Examples of a blob include: a moving object, such as a person or a vehicle; and a consumer product, such as a piece of furniture, a clothing item, or a retail shelf item. Blobs are generated using the detected objects from blocks 51 and 52. Any technique for generating blobs can be used for this block. An exemplary technique for generating blobs from motion detection and change detection uses a connected components scheme. For example, the morphology and connected components algorithm can be used, which is described in {1}.

In block 54, blobs are tracked. Any technique for tracking blobs can be used for this block. For example, Kalman filtering or the CONDENSATION algorithm can be used. As another example, a template matching technique, such as described in {1}, can be used. As a further example, a multi-hypothesis Kalman tracker can be used, which is described in {5}. As yet another example, the frame-to-frame tracking technique described in U.S. patent application Ser. No. 09/694,712 filed Oct. 24, 2000, can be used. For the example of a location being a grocery store, examples of objects that can be tracked include moving people, inventory items, and inventory moving appliances, such as shopping carts or trolleys.

As an option, blocks 51-54 can be replaced with any detection and tracking scheme, as is known to those of ordinary skill. An example of such a detection and tracking scheme is described in {11}.

In block 55, each trajectory of the tracked objects is analyzed to determine if the trajectory is salient. If the trajectory is insalient, the trajectory represents an object exhibiting unstable motion or represents an object of unstable size or color, and the corresponding object is rejected and is no longer analyzed by the system. If the trajectory is salient, the trajectory represents an object that is potentially of interest. A trajectory is determined to be salient or insalient by applying a salience measure to the trajectory. Techniques for determining a trajectory to be salient or insalient are described in {13} and {18}.

In block 56, each object is classified. The general type of each object is determined as the classification of the object. Classification can be performed by a number of techniques, and examples of such techniques include using a neural network classifier {14} and using a linear discriminatant classifier {14}. Examples of classification are the same as those discussed for block 23.

In block 57, video primitives are identified using the information from blocks 51-56 and additional processing as necessary. Examples of video primitives identified are the same as those discussed for block 23. As an example, for size, the system can use information obtained from calibration in block 22 as a video primitive. From calibration, the system has sufficient information to determine the approximate size of an object. As another example, the system can use velocity as measured from block 54 as a video primitive.

In block 43, the video primitives from block 42 are archived. The video primitives can be archived in the computer-readable medium 13 or another computer-readable medium. Along with the video primitives, associated frames or video imagery from the source video can be archived. This archiving step is optional; if the system is to be used only for real-time event detection, the archiving step can be skipped.

In block 44, event occurrences are extracted from the video primitives using event discriminators. The video primitives are determined in block 42, and the event discriminators are determined from tasking the system in block 23. The event discriminators are used to filter the video primitives to determine if any event occurrences occurred. For example, an event discriminator can be looking for a "wrong way" event as defined by a person traveling the "wrong way" into an area between 9:00 a.m. and 5:00 p.m. The event discriminator checks all video primitives being generated according to FIG. 5 and determines if any video primitives exist which have the following properties: a timestamp between 9:00 a.m. and 5:00 p.m., a classification of "person" or "group of people", a position inside the area, and a "wrong" direction of motion. The event discriminators may also use other types of primitives, as discussed above, and/or combine video primitives from multiple video sources to detect event occurrences.

Figure 6:
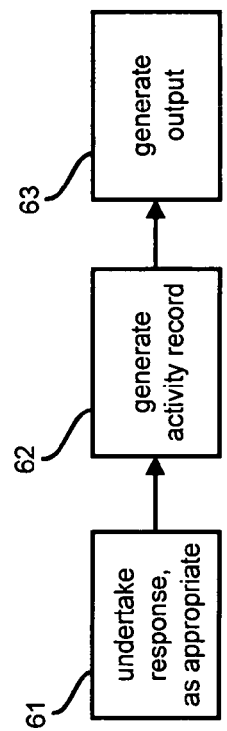
FIG. 6 illustrates a flow diagram for taking action with the video surveillance system.

In block 45, action is taken for each event occurrence extracted in block 44, as appropriate. FIG. 6 illustrates a flow diagram for taking action with the video surveillance system.

In block 61, responses are undertaken as dictated by the event discriminators that detected the event occurrences. The responses, if any, are identified for each event discriminator in block 162.

In block 62, an activity record is generated for each event occurrence that occurred. The activity record includes, for example: details of a trajectory of an object; a time of detection of an object; a position of detection of an object; and a description or definition of the event discriminator that was employed. The activity record can include information, such as video primitives, needed by the event discriminator. The activity record can also include representative video or still imagery of the object(s) and/or area(s) involved in the event occurrence. The activity record is stored on a computer-readable medium.

In block 63, output is generated. The output is based on the event occurrences extracted in block 44 and a direct feed of the source video from block 41. The output is stored on a computer-readable medium, displayed on the computer system 11 or another computer system, or forwarded to another computer system. As the system operates, information regarding event occurrences is collected, and the information can be viewed by the operator at any time, including real time. Examples of formats for receiving the information include: a display on a monitor of a computer system; a hard copy; a computer-readable medium; and an interactive web page.

The output can include a display from the direct feed of the source video from block 41 transmitted either via analog video transmission means or via network video streaming.

For example, the source video can be displayed on a window of the monitor of a computer system or on a closed-circuit monitor. Further, the output can include source video marked up with graphics to highlight the objects and/or areas involved in the event occurrence. If the system is operating in forensic analysis mode, the video may come from the video recorder.

The output can include one or more reports for an operator based on the requirements of the operator and/or the event occurrences. Examples of a report include: the number of event occurrences which occurred; the positions in the scene in which the event occurrence occurred; the times at which the event occurrences occurred, representative imagery of each event occurrence; representative video of each event occurrence; raw statistical data; statistics of event occurrences (e.g., how many, how often, where, and when); and/or human-readable graphical displays.

Figure 14:
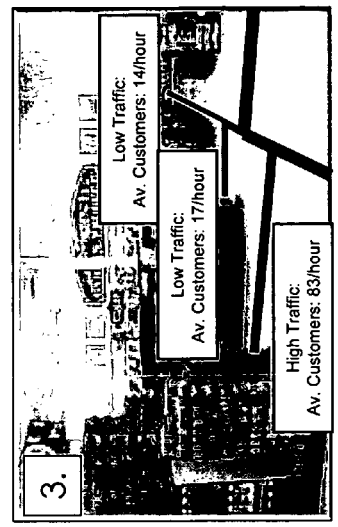
Figure 13:
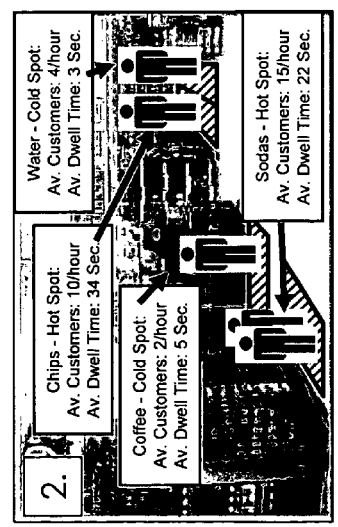
Figure 15:
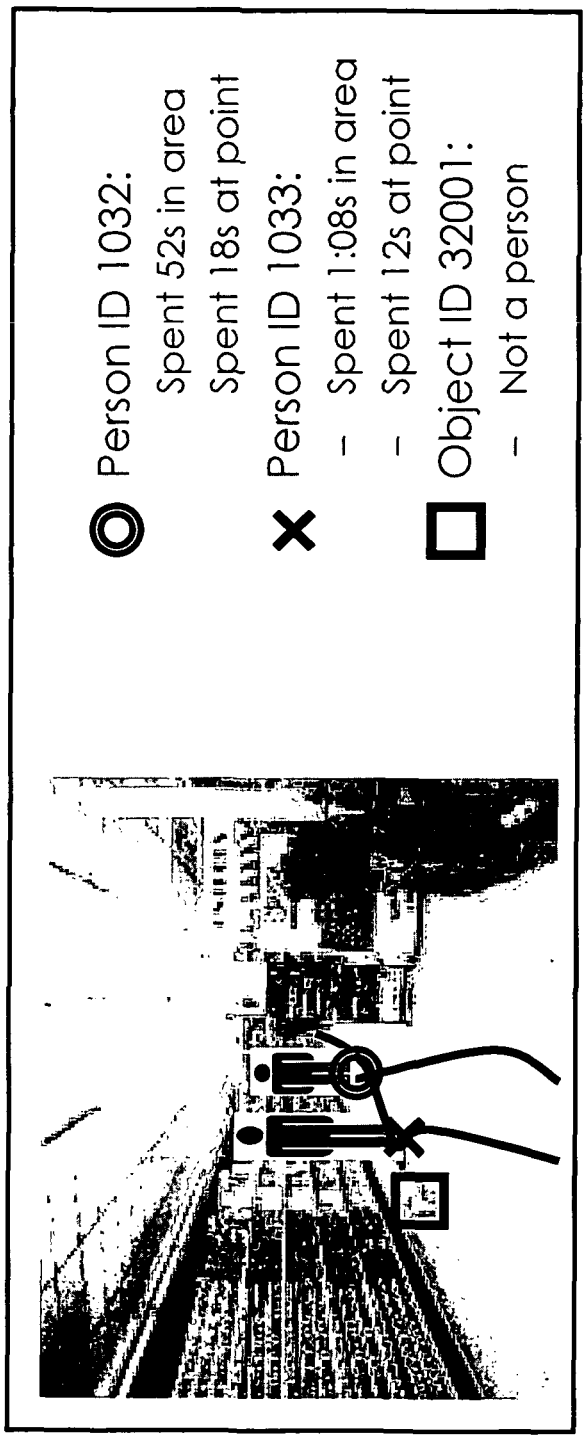

FIGS. 13 and 14 illustrate an exemplary report for the aisle in the grocery store of FIG. 15. In FIGS. 13 and 14, several areas are identified in block 22 and are labeled accordingly in the images. The areas in FIG. 13 match those in FIG. 12, and the areas in FIG. 14 are different ones. The system is tasked to look for people who stop in the area.

In FIG. 13, the exemplary report is an image from a video marked-up to include labels, graphics, statistical information, and an analysis of the statistical information. For example, the area identified as coffee has statistical information of an average number of customers in the area of 2/hour and an average dwell time in the area as 5 seconds. The system determined this area to be a "cold" region, which means there is not much commercial activity through this region. As another example, the area identified as sodas has statistical information of an average number of customers in the area of 15/hour and an average dwell time in the area as 22 seconds. The system determined this area to be a "hot" region, which means there is a large amount of commercial activity in this region.

In FIG. 14, the exemplary report is an image from a video marked-up to include labels, graphics, statistical information, and an analysis of the statistical information. For example, the area at the back of the aisle has average number of customers of 14/hour and is determined to have low traffic. As another example, the area at the front of the aisle has average number of customers of 83/hour and is determined to have high traffic.

For either FIG. 13 or FIG. 14, if the operator desires more information about any particular area or any particular area, a point-and-click interface allows the operator to navigate through representative still and video imagery of regions and/or activities that the system has detected and archived.

FIG. 15 illustrates another exemplary report for an aisle in a grocery store. The exemplary report includes an image from a video marked-up to include labels and trajectory indications and text describing the marked-up image. The system of the example is tasked with searching for a number of areas: length, position, and time of a trajectory of an object; time and location an object was immobile; correlation of trajectories with areas, as specified by the operator; and classification of an object as not a person, one person, two people, and three or more people.

The video image of FIG. 15 is from a time period where the trajectories were recorded. Of the three objects, two objects are each classified as one person, and one object is classified as not a person. Each object is assigned a label, namely Person ID 1032, Person ID 1033, and Object ID 32001. For Person ID 1032, the system determined the person spent 52 seconds in the area and 18 seconds at the position designated by the circle. For Person ID 1033, the system determined the person spent 1 minute and 8 seconds in the area and 12 seconds at the position designated by the circle. The trajectories for Person ID 1032 and Person ID 1033 are included in the marked-up image. For Object ID 32001, the system did not further analyze the object and indicated the position of the object with an X.

Referring back to block 22 in FIG. 2, calibration can be (1) manual, (2) semi-automatic using imagery from a video sensor or a video recorder, or (3) automatic using imagery from a video sensor or a video recorder. If imagery is required, it is assumed that the source video to be analyzed by the computer system 11 is from a video sensor that obtained the source video used for calibration.

For manual calibration, the operator provides to the computer system 11 the orientation and internal parameters for each of the video sensors 14 and the placement of each video sensor 14 with respect to the location. The computer system 11 can optionally maintain a map of the location, and the placement of the video sensors 14 can be indicated on the map. The map can be a two-dimensional or a three-dimensional representation of the environment. In addition, the manual calibration provides the system with sufficient information to determine the approximate size and relative position of an object.

Alternatively, for manual calibration, the operator can mark up a video image from the sensor with a graphic representing the appearance of a known-sized object, such as a person. If the operator can mark up an image in at least two different locations, the system can infer approximate camera calibration information.

For semi-automatic and automatic calibration, no knowledge of the camera parameters or scene geometry is required. From semi-automatic and automatic calibration, a lookup table is generated to approximate the size of an object at various areas in the scene, or the internal and external camera calibration parameters of the camera are inferred.

For semi-automatic calibration, the video surveillance system is calibrated using a video source combined with input from the operator. A single person is placed in the field of view of the video sensor to be semi-automatic calibrated. The computer system 11 receives source video regarding the single person and automatically infers the size of person based on this data. As the number of locations in the field of view of the video sensor that the person is viewed is increased, and as the period of time that the person is viewed in the field of view of the video sensor is increased, the accuracy of the semi-automatic calibration is increased.

Figure 7:
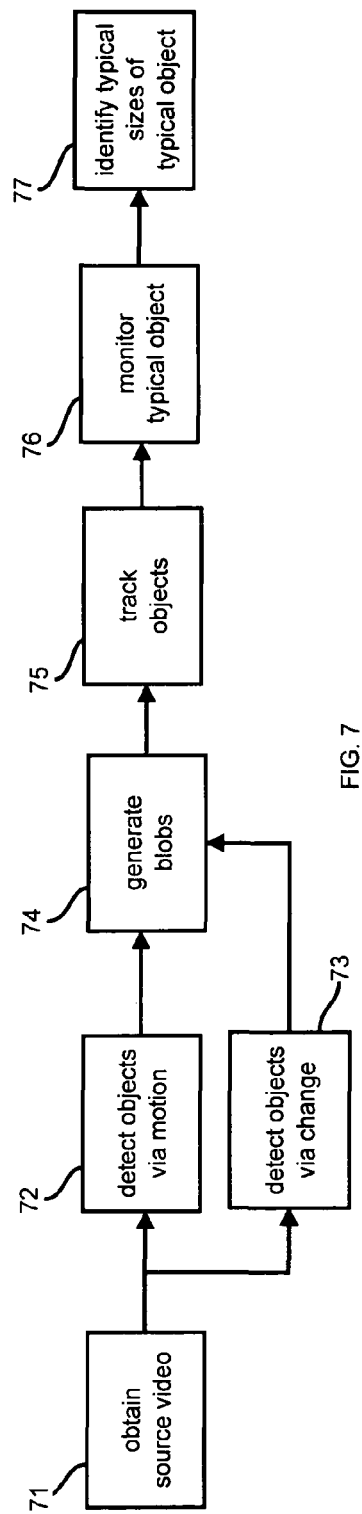
FIG. 7 illustrates a flow diagram for semi-automatic calibration of the video surveillance system.

FIG. 7 illustrates a flow diagram for semi-automatic calibration of the video surveillance system. Block 71 is the same as block 41, except that a typical object moves through the scene at various trajectories. The typical object can have various velocities and be stationary at various positions. For example, the typical object moves as close to the video sensor as possible and then moves as far away from the video sensor as possible. This motion by the typical object can be repeated as necessary.

Blocks 72-75 are the same as blocks 51-54, respectively.

In block 76, the typical object is monitored throughout the scene. It is assumed that the only (or at least the most) stable object being tracked is the calibration object in the scene (i.e., the typical object moving through the scene). The size of the stable object is collected for every point in the scene at which it is observed, and this information is used to generate calibration information.

In block 77, the size of the typical object is identified for different areas throughout the scene. The size of the typical object is used to determine the approximate sizes of similar objects at various areas in the scene. With this information, a lookup table is generated matching typical apparent sizes of the typical object in various areas in the image, or internal and external camera calibration parameters are inferred. As a sample output, a display of stick-sized figures in various areas of the image indicate what the system determined as an appropriate height. Such a stick-sized figure is illustrated in FIG. 11.

For automatic calibration, a learning phase is conducted where the computer system 11 determines information regarding the location in the field of view of each video sensor. During automatic calibration, the computer system 11 receives source video of the location for a representative period of time (e.g., minutes, hours or days) that is sufficient to obtain a statistically significant sampling of objects typical to the scene and thus infer typical apparent sizes and locations.

Figure 8:
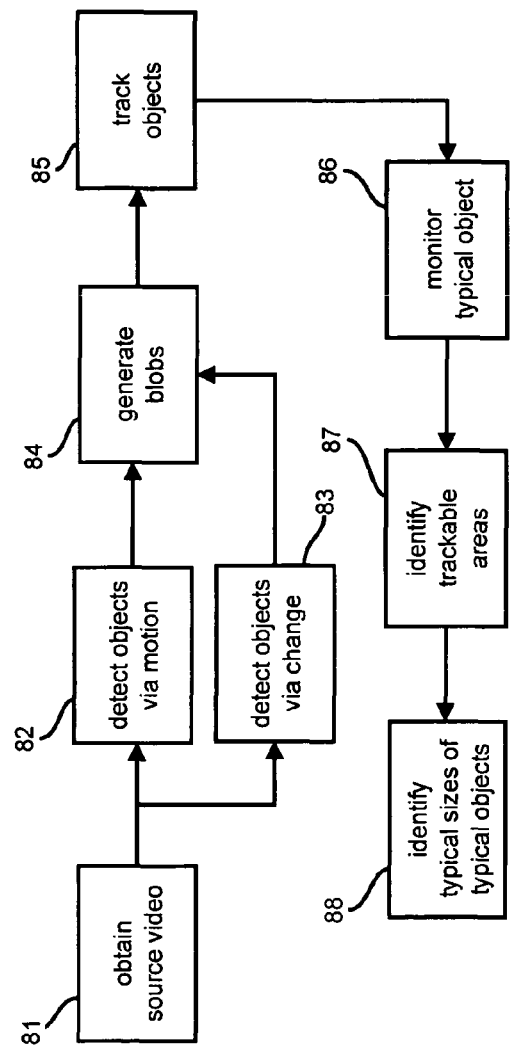
FIG. 8 illustrates a flow diagram for automatic calibration of the video surveillance system.

FIG. 8 illustrates a flow diagram for automatic calibration of the video surveillance system. Blocks 81-86 are the same as blocks 71-76 in FIG. 7.

In block 87, trackable regions in the field of view of the video sensor are identified. A trackable region refers to a region in the field of view of a video sensor where an object can be easily and/or accurately tracked. An untrackable region refers to a region in the field of view of a video sensor where an object is not easily and/or accurately tracked and/or is difficult to track. An untrackable region can be referred to as being an unstable or insalient region. An object may be difficult to track because the object is too small (e.g., smaller than a predetermined threshold), appear for too short of time (e.g., less than a predetermined threshold), or exhibit motion that is not salient (e.g., not purposeful). A trackable region can be identified using, for example, the techniques described in {13}.

FIG. 10 illustrates trackable regions determined for an aisle in a grocery store. The area at the far end of the aisle is determined to be insalient because too many confusers appear in this area. A confuser refers to something in a video that confuses a tracking scheme. Examples of a confuser include: leaves blowing; rain; a partially occluded object; and an object that appears for too short of time to be tracked accurately. In contrast, the area at the near end of the aisle is determined to be salient because good tracks are determined for this area.

In block 88, the sizes of the objects are identified for different areas throughout the scene. The sizes of the objects are used to determine the approximate sizes of similar objects at various areas in the scene. A technique, such as using a histogram or a statistical median, is used to determine the typical apparent height and width of objects as a function of location in the scene. In one part of the image of the scene, typical objects can have a typical apparent height and width. With this information, a lookup table is generated matching typical apparent sizes of objects in various areas in the image, or the internal and external camera calibration parameters can be inferred.

FIG. 11 illustrates identifying typical sizes for typical objects in the aisle of the grocery store from FIG. 10. Typical objects are assumed to be people and are identified by a label accordingly. Typical sizes of people are determined through plots of the average height and average width for the people detected in the salient region. In the example, plot A is determined for the average height of an average person, and plot B is determined for the average width for one person, two people, and three people.

For plot A, the x-axis depicts the height of the blob in pixels, and the y-axis depicts the number of instances of a particular height, as identified on the x-axis, that occur. The peak of the line for plot A corresponds to the most common height of blobs in the designated region in the scene and, for this example, the peak corresponds to the average height of a person standing in the designated region.

Assuming people travel in loosely knit groups, a similar graph to plot A is generated for width as plot B. For plot B, the x-axis depicts the width of the blobs in pixels, and the y-axis depicts the number of instances of a particular width, as identified on the x-axis, that occur. The peaks of the line for plot B correspond to the average width of a number of blobs. Assuming most groups contain only one person, the largest peak corresponds to the most common width, which corresponds to the average width of a single person in the designated region. Similarly, the second largest peak corresponds to the average width of two people in the designated region, and the third largest peak corresponds to the average width of three people in the designated region.

FIG. 9 illustrates an additional flow diagram for the video surveillance system of the invention. In this additional embodiment, the system analyzes archived video primitives with event discriminators to generate additional reports, for example, without needing to review the entire source video. Anytime after a video source has been processed according to the invention, video primitives for the source video are archived in block 43 of FIG. 4. The video content can be reanalyzed with the additional embodiment in a relatively short time because only the video primitives are reviewed and because the video source is not reprocessed. This provides a great efficiency improvement over current state-of-the-art systems because processing video imagery data is extremely computationally expensive, whereas analyzing the small-sized video primitives abstracted from the video is extremely computationally cheap. As an example, the following event discriminator can be generated: "The number of people stopping for more than 10 minutes in area A in the last two months." With the additional embodiment, the last two months of source video does not need to be reviewed. Instead, only the video primitives from the last two months need to be reviewed, which is a significantly more efficient process.

Block 91 is the same as block 23 in FIG. 2.

In block 92, archived video primitives are accessed. The video primitives are archived in block 43 of FIG. 4.

Blocks 93 and 94 are the same as blocks 44 and 45 in FIG. 4.

As an exemplary application, the invention can be used to analyze retail market space by measuring the efficacy of a retail display. Large sums of money are injected into retail displays in an effort to be as eye-catching as possible to promote sales of both the items on display and subsidiary items. The video surveillance system of the invention can be configured to measure the effectiveness of these retail displays.

For this exemplary application, the video surveillance system is set up by orienting the field of view of a video sensor towards the space around the desired retail display. During tasking, the operator selects an area representing the space around the desired retail display. As a discriminator, the operator defines that he or she wishes to monitor people-sized objects that enter the area and either exhibit a measurable reduction in velocity or stop for an appreciable amount of time.

After operating for some period of time, the video surveillance system can provide reports for market analysis. The reports can include: the number of people who slowed down around the retail display; the number of people who stopped at the retail display; the breakdown of people who were interested in the retail display as a function of time, such as how many were interested on weekends and how many were interested in evenings; and video snapshots of the people who showed interest in the retail display. The market research information obtained from the video surveillance system can be combined with sales information from the store and customer records from the store to improve the analysts understanding of the efficacy of the retail display.

The embodiments and examples discussed herein are non-limiting examples.

The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method comprising:
    first, providing a video processing apparatus comprising:
        an event detection system, including
            an input to receive input video information, and
            an event detection device including hardware, the event detection device configured to analyze the input video information and to detect an event based on one or more rules applied to the analyzed video information; and
        an application programming interface framework coupled to the event detection device to permit a separately generated program to interact with the event detection device to define the one or more rules for the event detection device; and
    then, separately providing a user interface configured to permit access by a user to rule language or primitive definitions to create new rules for the event detection device, and configured to provide to the event detection device via the application programming interface the new rules as the one or more rules, wherein the user interface is configured to provide new rules that do not previously exits within the event detection system and thereby provide new functionality to the event detection system.

2. The method of claim 1, wherein the event detection device comprises:
    a video content analysis device including hardware configured to analyze the input video formation to derive a plurality of attributes of an object in the input video information; and
    an event inference device including hardware coupled to said video content analysis device and configured to detect an event based on one or more rules applied to the plurality of derived attributes, the event not being one of the derived attributes.

3. The method of claim 1, further comprising:
    wherein the step of separately providing the user interface comprises providing a user interface configured to communicate the one or more rules to the event detection device via the application programming interface over a network.

4. The method of claim 3, wherein the step of separately providing the user interface comprises providing a user interface configured to access a software development kit to access fully formed rules.

5. The method of claim 3, wherein the step of separately providing the user interface comprises providing a user interface configured to access a software development kit to access rule language.

6. The method of claim 3, wherein the step of separately providing the user interface comprises providing a user interface configured to access a software development kit to access primitive definitions.

7. The method of claim 1, wherein the step of separately providing the user interface comprises providing a user interface configured to permit a user to define a new type of video tripwire.

8. The method of claim 1, wherein the step of separately providing the user interface comprises providing a user interface configured to permit a user to define a new area of interest.

9. The method of claim 1, wherein the step of separately providing the user interface comprises providing a user interface configured to permit a user to define an object classification.

10. The method of claim 1, wherein the step of separately providing the user interface comprises providing a user interface configured to permit a user to create a rule element.

11. The method of claim 1, wherein the video processing apparatus is an element of a video camera.

12. The method of claim 1, wherein the video processing apparatus is housed in a housing separate from the user interface.

13. The method of claim 12, further comprising:
    creating the one or more rules at a location remote from the video processing apparatus.

14. The method of claim 13, further comprising:
    transmitting the one or more rules to the event detection device via the application programming interface over a network.

15. The method of claim 1, wherein the video processing apparatus is configured to receive all rules for the event detection device only via the application programming interface.

16. The method of claim 1, wherein the event detection device generates an alert upon detecting an event based on the one or more rules, and the video processing apparatus is configured to output all alerts only via the application programming interface.

17. The method of claim 1, wherein the application programming interface is coupled to the video input to provide the input video information to the event detection device.

18. A video device comprising:
    an event detection system, including
        an input to receive input video information, and
        an event detection device including hardware, the event detection device configured to analyze the input video information, to detect an event based on one or more rules applied to the analyzed video information; and
        an application programming interface framework coupled to the event detection device to permit a separately generated program to interact with the event detection device to define the one or more rules for the event detection device, the application programming interface configured to provide communication with the event detection device to receive the one or more rules for the event detection device, wherein the application programming interface is configured to communicate with a separately later provided user interface configured to permit access by a user to rule language or primitive definitions to create new rules for the event detection device, wherein the application programming interface framework is configured to receive and to provide to the event detection device the new rules as the one or more rules, wherein the application programming interface is configured to provide new rules that do not previously exist within the event detection system and thereby provide new functionality to the event detection system.

19. The video device of claim 18, further comprising a housing containing the event detection system and the application programming interface, wherein the video device is configured to receive any new user rule from a source exterior to the housing.

20. The video device of claim 18, wherein the event detection device comprises:
a video content analysis device including hardware configured to analyze the input video information to derive a plurality of attributes of an object in the input video information; and
an event inference device including hardware coupled to said video content analysis device and configured to detect an event based on one or more rules applied to the plurality of derived attributes, the event not being one of the derived attributes.

21. The video device of claim 18, further comprising:
a network interface configured to receive the one or more rules over a network and to communicate the received one or more rules to the event detection device via the application programming interface over a network.

22. The video device of claim 21, further comprising the user interface, the user interface being in communication with the event detection system via the network.

23. The video device of claim 22, further comprising a software development kit accessible by the user interface to access the fully formed rules.

24. The video device of claim 22, further comprising a software development kit accessible by the user interface to access the rule language.

25. The video device of claim 22, further comprising a software development kit accessible by the user interface to access the primitive definitions.

26. The video device of claim 22, wherein the user interface is configured to permit a user to define a new type of video tripwire.

27. The video device of claim 22, wherein the user interface is configured to permit a user to define a new area of interest.

28. The video device of claim 22, wherein the user interface is configured to permit a user to define an object classification.

29. The video device of claim 22, wherein the user interface is configured to permit a user to create a rule element.

30. The video device of claim 18, further comprising:
the user interface, the user interface being in communication with the event detection system via the network; and
a housing that houses the event detection system and application programming interface, the housing being separate from the user interface.

31. The video device of claim 18, further comprising:
the user interface, the user interface being in communication with the event detection system via the network; and
a housing remote from the user interface that houses the event detection system and application programming interface.

32. The video device of claim 18, wherein the video device is a video camera and the event detection system and application programming interface are implemented on the video camera.

33. The video device of claim 18, wherein the video device is configured to receive all rules for the event detection device only via the application programming interface.

34. The video device of claim 18, wherein the video device is configured to output all alerts only via the application programming interface.

* * * * *

UNITED STATES PATENT AND TRADEMARK OFFICE
CERTIFICATE OF CORRECTION

PATENT NO.         : 9,892,606 B2
APPLICATION NO.    : 11/167218
DATED              : February 13, 2018
INVENTOR(S)        : Peter L. Venetianer et al.

It is certified that error appears in the above-identified patent and that said Letters Patent is hereby corrected as shown below:

On the Title Page

On page 2, Column 1 change the Related U.S. Application Data from "is a continuation-in-part of application No. 11/057,154, filed on Feb. 15, 2005, now abandoned, which is a continuation-in-part of application No. 09/987,707, filed on Nov. 15, 2001, now abandoned." to "is a continuation-in-part of application No. 11/057,154, filed on Feb. 15, 2005, now abandoned, which is a continuation-in-part of application No. 09/987,707, filed on Nov. 15, 2001, now abandoned, which is a continuation-in-part of application No. 09/694,712, filed on October 24, 2000, now Pat. No. 6,954,498."

Signed and Sealed this
Tenth Day of July, 2018

Andrei Iancu
*Director of the United States Patent and Trademark Office*